(12) United States Patent
Warrick et al.

(10) Patent No.: US 9,172,733 B2
(45) Date of Patent: *Oct. 27, 2015

(54) DYNAMIC ASSIGNMENT OF CENTRAL MEDIA DEVICE SUPPORTING NETWORK-BASED MEDIA SHARING PROTOCOL TO GUEST DEVICE OF HOSPITALITY ESTABLISHMENT FOR MEDIA SHARING PURPOSES

(71) Applicant: Guest Tek Interactive Entertainment Ltd., Calgary (CA)

(72) Inventors: Peter S. Warrick, Calgary (CA); Brendan G. Cassidy, Calgary (CA); Lindsey M. Carriere, Calgary (CA); Michael D. McCarthy, Calgary (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/165,183

(22) Filed: Jan. 27, 2014

(65) Prior Publication Data

US 2014/0143380 A1    May 22, 2014

Related U.S. Application Data

(63) Continuation of application No. 13/923,443, filed on Jun. 21, 2013.

(60) Provisional application No. 61/662,989, filed on Jun. 22, 2012.

(30) Foreign Application Priority Data

Oct. 18, 2012   (CA) ..................................... 2792482
Jun. 19, 2013   (CA) ..................................... 2820654

(51) Int. Cl.
*H04L 29/06*     (2006.01)
*H04L 12/24*     (2006.01)
*H04N 21/436*    (2011.01)

(52) U.S. Cl.
CPC ............ *H04L 65/60* (2013.01); *H04L 41/0816* (2013.01); *H04L 41/0893* (2013.01); *H04L65/1073* (2013.01); *H04L 65/4076* (2013.01); *H04L 65/4084* (2013.01); *H04N 21/43615* (2013.01)

(58) Field of Classification Search
CPC ..... H04L 12/24; H04L 41/0893; H04L 65/00; H04L 41/0816; H04N 21/43615
See application file for complete search history.

(56) References Cited

U.S. PATENT DOCUMENTS 5,309,437 A   5/1994   Perlman et al.
5,420,862 A   5/1995   Perlman
(Continued)

FOREIGN PATENT DOCUMENTS

CA     2714224    11/2010
CA     2714227    11/2010
(Continued)

OTHER PUBLICATIONS

"UPnP Device Architecture 1.0"; Copyright Contributing Members of the UPnP Forum; Oct. 15, 2008; 80 pages.
(Continued)

*Primary Examiner* — David X Yi
*Assistant Examiner* — Hien Doan
(74) *Attorney, Agent, or Firm* — ATMAC Patent Services Ltd.; Andrew T. MacMillan

(57) ABSTRACT

A media system includes a computer network, a media device supporting a network-based media sharing protocol, a plurality of output devices located at a plurality of physical locations within a hospitality establishment, and a system controller. In response to a first event, the system controller assigns the media device to a particular guest device by reconfiguring one or more components of the computer network to enable the particular guest device to utilize the network-based media sharing protocol to share media over the computer network with the media device, and commands an output device located at a physical location associated with the particular guest device to play media corresponding to the media signal outputted by the media device on the output port. In response to a second event, the system controller un-assigns the media device from the particular guest device and commands the output device to stop playing the media.

20 Claims, 24 Drawing Sheets

(56) References Cited

U.S. PATENT DOCUMENTS

| | | |
|---|---|---|
| 5,678,041 A | 10/1997 | Baker et al. |
| 5,708,780 A | 1/1998 | Levergood et al. |
| 5,761,683 A | 6/1998 | Logan et al. |
| 5,781,550 A | 7/1998 | Templin et al. |
| 5,802,320 A | 9/1998 | Baehr et al. |
| 5,805,803 A | 9/1998 | Birrell et al. |
| 5,812,776 A | 9/1998 | Gifford |
| 5,848,233 A | 12/1998 | Radia et al. |
| 5,901,287 A | 5/1999 | Bull et al. |
| 5,950,195 A | 9/1999 | Stockwell et al. |
| 5,958,015 A | 9/1999 | Dascalu |
| 6,092,196 A | 7/2000 | Reiche |
| 6,098,172 A | 8/2000 | Coss et al. |
| 6,112,212 A | 8/2000 | Heitler |
| 6,130,892 A | 10/2000 | Short et al. |
| 6,170,012 B1 | 1/2001 | Coss et al. |
| 6,622,307 B1 | 9/2003 | Ho |
| 6,636,894 B1 | 10/2003 | Short et al. |
| 6,779,118 B1 | 8/2004 | Ikudome et al. |
| 6,868,399 B1 | 3/2005 | Short et al. |
| 7,020,082 B2 | 3/2006 | Bhagavath et al. |
| 7,061,393 B2 | 6/2006 | Buckingham et al. |
| 7,194,554 B1 | 3/2007 | Short et al. |
| 7,606,873 B2 | 10/2009 | Taylor et al. |
| 7,689,716 B2 | 3/2010 | Short et al. |
| 7,698,432 B2 | 4/2010 | Short et al. |
| 7,752,334 B2 | 7/2010 | Paunikar et al. |
| 8,045,557 B1 | 10/2011 | Sun et al. |
| 8,156,246 B2 | 4/2012 | Short et al. |
| 8,244,886 B2 | 8/2012 | Short et al. |
| 8,266,266 B2 | 9/2012 | Short et al. |
| 8,266,269 B2 | 9/2012 | Short et al. |
| 8,356,251 B2 | 1/2013 | Strober |
| 2003/0048757 A1 | 3/2003 | Accarie et al. |
| 2003/0067554 A1 | 4/2003 | Klarfeld et al. |
| 2003/0169714 A1 | 9/2003 | Nakjima |
| 2004/0116115 A1 | 6/2004 | Ertel |
| 2005/0091539 A1 | 4/2005 | Wang et al. |
| 2005/0125835 A1 | 6/2005 | Wei |
| 2005/0207340 A1 | 9/2005 | O'Neill |
| 2005/0283791 A1 | 12/2005 | McCarthy et al. |
| 2006/0112171 A1 | 5/2006 | Rader |
| 2006/0195884 A1 | 8/2006 | van Zoest et al. |
| 2006/0277576 A1 | 12/2006 | Acharya et al. |
| 2007/0174873 A1 | 7/2007 | Griggs |
| 2007/0176739 A1 | 8/2007 | Raheman |
| 2007/0198532 A1* | 8/2007 | Krikorian et al. ............... 707/10 |
| 2007/0199019 A1 | 8/2007 | Angiolillo et al. |
| 2007/0299976 A1 | 12/2007 | Zafar et al. |
| 2008/0089277 A1 | 4/2008 | Alexander et al. |
| 2008/0200154 A1 | 8/2008 | Maharajh et al. |
| 2008/0271109 A1 | 10/2008 | Singh et al. |
| 2008/0279117 A1 | 11/2008 | Brisco et al. |
| 2009/0025055 A1 | 1/2009 | White et al. |
| 2009/0059962 A1 | 3/2009 | Schmidt et al. |
| 2009/0070831 A1 | 3/2009 | Bardehle et al. |
| 2009/0083805 A1 | 3/2009 | Sizelove et al. |
| 2009/0125971 A1 | 5/2009 | Belz et al. |
| 2010/0082681 A1 | 4/2010 | Adimatyam et al. |
| 2010/0082784 A1* | 4/2010 | Rosenblatt et al. ........... 709/222 |
| 2010/0100725 A1 | 4/2010 | Ozzie et al. |
| 2010/0189129 A1 | 7/2010 | Hinosugi et al. |
| 2010/0191551 A1 | 7/2010 | Drance et al. |
| 2010/0269135 A1 | 10/2010 | Hulse et al. |
| 2010/0332615 A1* | 12/2010 | Short et al. .................... 709/217 |
| 2011/0099598 A1 | 4/2011 | Shin et al. |
| 2011/0298596 A1 | 12/2011 | Warrick |
| 2011/0302607 A1 | 12/2011 | Warrick et al. |
| 2011/0314497 A1 | 12/2011 | Warrick et al. |
| 2011/0314502 A1 | 12/2011 | Levy et al. |
| 2012/0011531 A1 | 1/2012 | Levy et al. |
| 2012/0011551 A1 | 1/2012 | Levy et al. |
| 2012/0185586 A1 | 7/2012 | Olshansky |
| 2012/0208496 A1 | 8/2012 | Raleigh |
| 2012/0246553 A1 | 9/2012 | Ong |
| 2013/0031478 A1 | 1/2013 | Strober |
| 2013/0055324 A1 | 2/2013 | Ostlund |

FOREIGN PATENT DOCUMENTS

| | | |
|---|---|---|
| CA | 2707202 | 12/2010 |
| CA | 2709651 | 12/2010 |
| CA | 2775782 | 7/2012 |
| CA | 2775804 | 7/2012 |
| CA | 2788573 | 11/2012 |
| WO | 2001031861 A9 | 5/2001 |
| WO | 2005065166 A2 | 7/2005 |
| WO | 2006033841 A2 | 3/2006 |
| WO | 2011005710 A2 | 1/2011 |
| WO | 2011005710 A3 | 4/2011 |
| WO | 2011049784 A2 | 4/2011 |
| WO | 2013049730 A1 | 4/2013 |

OTHER PUBLICATIONS

"OneView Internet Version 6.2", Release Notes, Guest Tek Interactive Entertainment Ltd., Sep. 15, 2011.
Execptional Innovation, "life|ware", dated Sep. 2009, downloaded from http://www.exceptionalinnovation.com/downloads/product-sheets/Lifeware.pdf on May 17, 2011.
Execptional Innovation, "life|ware for iPhone and iPod touch", dated Sep. 2009, downloaded from http://www.exceptionalinnovation.com/products/documents/lifeware-iphone.pdf on May 17, 2011.
Execptional Innovation, "life|controller", dated Sep. 2009, downloaded from http://www.exceptionalinnovation.com/downloads/product-sheets/Lifecontroller.pdf on May 17, 2011.
Execptional Innovation, "Solutions Hospitality", downloaded from http://www.exceptionalinnovation.com/solutions/commercial/hospitality.php on May 17, 2011.
Execptional Innovation, "INNCOM Partners with EYE to Offer Advanced, Integrated Hotel Technology Solutions", dated Oct. 27, 2009, downloaded from http://www.exceptionalinnovation.com/downloads/releases/2009/inncom-eI-20091027.pdf on May 17, 2011.
Joyce Essig, "Crestron and Intelity Partner on Industry-Changing Hospitality Solution", Jun. 22, 2009.
Danielle Storm, "Intelity Offers ICE in Software-Only Connect Version", Oct. 12, 2009.
George Koroneos, "5 Guest Room Tech Trends", Posted Date: Feb. 11, 2010.
Carrie Coolidge, "The Plaza in New York Offers iPads in all Guest Rooms and Suites (with Video)", Feb. 3, 2011.
Terry Gardner, "High-tech travel shortcuts", Feb. 21, 2011.
Hospitality—Creston Electronics, Inc. (Printed in USA; Doc. 4745A Jul. 2009).
Stephani Lewis, iPASS Open Mobile Client, Nov. 20, 2009.
Worldmate, "WorldMate Live", undated, downloaded from http://www.worldmate.com/features/mobile-itinerary.php on Aug. 9, 2010.
iBAHN; "iBAHN Strikes a Chord in Music City with Installation of IPTV in Omni Nashville Hotel"; Jun. 25, 2013; download from: http://www.ibahn.com/en-us/index.php?cid=1624&detail=y&story=1702; 3 pages.
iBAHN; "Where Broadband Meets Broadcast"; downloaded from: http://www.ibahn.com/en-us/index.php?cid=1631 on Jul. 10, 2013; 2 pages.
iBAHN; "iBAHN Hotel App"; Updated: Aug. 20, 2012; downloaded from: https://itunes.apple.com/ca/app/ibahn-hotel-app/id518998671?mt=8; 2 pages.
Quadriga; "Quadriga previews new Personal Media Netowrk (TM) at HITEC 2012"; Jun. 25, 2012; 4 pages.
Quadriga; "Quadriga's Personal Media Network(TM) wins HTNG's Most Innovative Technology Award 2012"; Mar. 4, 2013; 3 pages.
Andreas Fasbender et al.; "Phone-controlled Delivery of NGN Services into Residential Environments"; The Second International Conference on Next Generation Mobile Applications, Services, and Technologies; © 2008 IEEE; 8 pages.

* cited by examiner

Exemplary gateway rules ~232

| Client ID (400) | Source VLAN (402) | Source device (404) | Destination VLAN (406) | Destination device (408) | Action (410) |
|---|---|---|---|---|---|
| 1 | VLAN-guest | 192.168.0.23 (Guest device 118) | VLAN-media | 10.0.0.140 (TV 121 in room 101) | Pass |
| 1 | VLAN-media | 10.0.0.140 (TV 121 in room 101) | VLAN-guest | 192.168.1.23 (Guest device 118) | Pass |
| 1 | VLAN-guest | 192.168.0.23 (Guest device 118) | VLAN-media | 10.0.0.141 (TV 122 in room 101) | Pass |
| 1 | VLAN-media | 10.0.0.141 (TV 122 in room 101) | VLAN-guest | 192.168.1.23 (Guest device 118) | Pass |
| 1 | VLAN-guest | 192.168.0.23 (Guest device 118) | VLAN-media | 10.0.0.142 (STB 123 in room 101) | Pass |
| 1 | VLAN-media | 10.0.0.142 (STB 123 in room 101) | VLAN-guest | 192.168.1.23 (Guest device 118) | Pass |
| 2 | VLAN-guest | 192.168.0.55 (Guest device 120) | VLAN-media | 10.0.0.143 (TV 124 in room 105) | Pass |
| 2 | VLAN-media | 10.0.0.143 (TV 124 in room 105) | VLAN-guest | 192.168.1.55 (Guest device 120) | Pass |
| ⋮ | ⋮ | ⋮ | ⋮ | ⋮ | ⋮ |
|  | VLAN-guest | * | VLAN-media | * | Drop |
|  | VLAN-media | * | VLAN-guest | * | Drop |

Exemplary Proxy rules

234

| Guest device ID (IP/MAC address) | Client ID | Destination in-room media device for proxy |
|---|---|---|
| 192.168.0.23 (Guest device 118) | 1 | 10.0.0.140 (TV 121 in room 101) |
| 192.168.0.55 (Guest device 120) | 2 | 10.0.0.143 (TV 124 in room 105) |
| ⋮ | ⋮ | ⋮ |

Exemplary in-room device table

| Room ID | In-room media device(s) | Type | Device address (URL, IP, MAC, etc) |
|---|---|---|---|
| Room (101) | 1st TV (121) | Airplay | 10.0.0.140 |
|  | 2nd TV (122) | Airplay | 10.0.0.141 |
|  | STB (123) | - | 10.0.0.142 |
| Room (105) | TV (124) | AllShare | 10.0.0.143 |
| Room (107) | TV | AllShare & Airplay | 10.0.0.144 |
| ⋮ | ⋮ | ⋮ | ⋮ |

FIG. 9

Reservation-specific network settings — 1200

General settings

| | |
|---|---|
| Reservation ID | 3421 |
| Description | Medical conference |
| 1206 — Start time | 2011/11/02 10:00 [Adjust] |
| 1208 — End time | 2011/11/02 21:00 [Adjust] |
| 1210 — Location(s) | 1. Meeting room A [Remove]<br>2. Meeting room B [Remove]<br>3. Guest room 101 [Remove]<br>[Add new room] |
| SSID | "Medical_peer_conference" |
| Require login | ● Yes  ○ No |
| Login portal | http://login23.globalsuite.com |
| Meeting passcode | M783A |
| Walled garden site(s) | http://hotelhomepage.example.com<br>http://reservations.example.com |
| Bandwidth limits (Mbit/s) | Cap [30]   Rate [10] |
| User isolation | ● Yes  ○ No |
| Required # of public IP(s) | [1] |

Registered device settings

| Device name (1228) | Device ID (1230) | Auto login | Stream enable (1234) | Mbit/s limits Cap | Mbit/s limits Rate | Public IP |
|---|---|---|---|---|---|---|
| 1240 — Mobile phone | 00:08:C7:1B:8C:02 | ☒ | ☒ | | | |
| 1242 — Tablet computer | 09:a1:47:12:efg:31 | ☒ | ☒ | 5 | 5 | 69.46.103.131 |

[Add new device]

[Save]  [Cancel]

FIG. 12

Modify user profile settings for: Josh Wookey

Guest devices associated with this account:

| User device | MAC address (Device ID) | |
|---|---|---|
| Mobile phone | 00-E4-A1-32-C3-39 | (Remove) |
| Corporate laptop | 20-B0-D0-86-BB-F9 | (Remove) |
| Tablet computer | 71-FE-D0-26-A1-03 | (Remove) |

(Add new device)

Loyalty program membership numbers associated with this account:

| Hospitality establishment (Site ID) | Loyalty program # (User ID) | User type (Access entitlement) | |
|---|---|---|---|
| Galactic Hotel (4) | 122-32-2345 | Regular | (Remove) |
| Centennial Airlines (35) | ABF334401 | Regular | (Remove) |
| Beaches Resort (135) | 5E3DA7 | VIP | (Remove) |
| Waterfront park (139) | 4391 | Regular | (Remove) |
| Terminal bus lines (144) | 2010-01-01-39 | Regular (upgrade) | (Remove) |

(Add new location)

( Save )  ( Cancel )

FIG. 15

Exemplary passkey-to-room table

| Passkey | Currently registered room(s) |
|---|---|
| 123456 | Room 101 |
| 435421 | Room 105 |
| ⋮ | ⋮ |

FIG. 18

Exemplary central passkey-to-location table

| Connect code passkey 2100 | | Establishment (ID) and guest area 2102 | |
|---|---|---|---|
| Hotel locator (2 digits) | Room locator (4 digits) | Hospitality establishment | Currently registered room(s) |
| C3 | EF2B | Galactic Hotel (4) | Room 101 |
| | FD00 | | Room 105 |
| | 9E9C | | Room 107 |
| | F5A4 | | Room 109 |
| | ⋮ | | ⋮ |
| 27 | 498C | Beaches Resort (135) | Room 101 |
| | 86CC | | Room 103 |
| | D4A9 | | Room 105 |
| | ⋮ | | ⋮ |
| 43 | 384A | Centennial Airlines (35) | Seat 101 |
| | 5957 | | Seat 105 |
| | 596E | | Seat 107 |
| | ⋮ | | ⋮ |
| ⋮ | ⋮ | ⋮ | ⋮ |

FIG. 21

DYNAMIC ASSIGNMENT OF CENTRAL MEDIA DEVICE SUPPORTING NETWORK-BASED MEDIA SHARING PROTOCOL TO GUEST DEVICE OF HOSPITALITY ESTABLISHMENT FOR MEDIA SHARING PURPOSES

CROSS-REFERENCE TO RELATED APPLICATIONS

This application is a continuation of U.S. patent application Ser. No. 13/923,443 filed Jun. 21, 2013; which claims the benefit of priority of Canadian Patent Application No. 2,820,654 filed Jun. 19, 2013, Canadian Patent Application No. 2,792,482 filed Oct. 18, 2012, and U.S. Provisional Application No. 61/662,989 filed Jun. 22, 2012. All of the above referenced applications are incorporated herein by reference.

BACKGROUND OF THE INVENTION (1) Field of the Invention

The invention pertains generally to media and entertainment systems utilized at hospitality establishments such as hotels and resorts. More specifically, the invention relates to dynamically assigning a central media device supporting a network-based media sharing protocol on a computer network of a hospitality establishment to a particular guest device for media sharing purposes. The particular guest device is thereby enabled to share media content with the central media device and the shared media content is automatically played back on an output device located at a physical location associated with the particular guest device within the hospitality establishment.

(2) Description of the Related Art

Guests often bring personal electronic devices with them when they stay at hotels, and these devices typically have stored therein pictures, movies, music, and other media content. One problem encountered by guests is how to utilize the capabilities of the hotel's media system to play media content stored on the guest's personal device. For example, a guest may wish to play vacation videos stored on their personal device on the big-screen television (TV) and high-fidelity audio system provided in their hotel room.

Published Canadian Patent No. 2,707,202 filed on Jun. 17, 2010 and corresponding Published U.S. Patent Application No. 2011/0314497 filed on Jun. 10, 2011 disclose methods of integrating guest content from a guest's personal device with a hospitality media system. In an exemplary embodiment, a user of a room connects a guest device to the media system and has guest content available on the guest device cataloged by the media system to form a guest content list. The guest content is automatically associated with the user's assigned room, and the user can thereafter utilize any of the in-room media devices located within that room to perform media system functions utilizing content selected from the guest content list.

Some electronic devices brought to hospitality establishments by guests natively support one or more network-based media sharing protocols such as AirPlay® by Apple® Inc., DLNA® by the Digital Living Network Alliance®, AllShare® by Samsung® Inc., etc. It would be beneficial if the guest could stream content from their personal device to in-room media devices of the hotel's media and entertainment system using these protocols similar to how they can stream content to their home TV via a local area network (LAN) installed in their home.

Most hotels do not have separate computer networks installed in each guest room. Instead, most hotels have a single media network to which all TVs and other in-room media devices within the hotel are connected in order to play media content from a central streaming server. Because existing network-based media sharing protocols (e.g., AirPlay®, DLNA®, AllShare®, etc.) are designed for the residential industry, if a guest device supporting one of these protocols were allowed to be connected to the hotel's media network, it would automatically discover and be able to share media content with all compatible media devices available in the hotel. Such behavior is unacceptable in the hospitality industry because this would allow a guest device to stream personal media content to any TV in any room of the hotel.

BRIEF SUMMARY OF THE INVENTION

In an exemplary embodiment of the invention, a hospitality establishment's computer network by default prevents communication between guest devices and a central collection of one or more media devices (e.g., a plurality of AppleTVs®) each supporting a network-based media sharing protocol (e.g., AirPlay®). This may be done by isolating the guest devices on a first virtual area network (VLAN) and the media devices on a second VLAN. In response to the occurrence of a first trigger event related to a particular guest device, a compatible one of the central media devices that is not currently assigned to another guest device is assigned to the particular guest device for media sharing purposes. The first trigger event may correspond to the particular guest device attempting to share media content on the computer network utilizing the network-based media sharing protocol after the particular guest device has logged in to the hotel's HSIA system or otherwise authenticated that it is being operated by a valid guest of one of the hotel rooms. When assigning the available media device to the particular guest device, a system controller dynamically reconfigures one or more components of the computer network such as a media proxy and/or gateway to enable the particular guest device to utilize the network-based media sharing protocol to share media over the computer network with the media device assigned to the particular guest device. The particular guest device can thus discover and share media with the assigned media device but cannot discover or otherwise communicate with the other central media devices that are not assigned to the guest device. The system controller further transmits command(s) to one or more output devices such as a set-top box (STB) and/or television located in a guest room of the hotel associated with the particular guest device to play media as outputted by the media device assigned to the guest device. In this way, a guest of the hotel can use their personal guest device (e.g., mobile phone or netbook computer) to share media with a dynamically assigned central media device over the computer network utilizing the network-based media sharing protocol, and the guest can see and/or hear the shared media being played back on one or more output devices in their hotel room.

Although the central media device may be utilized by a plurality of different guest devices, in some beneficial embodiments it is only assigned to one particular guest device at a time and only output devices at the physical location associated with that particular guest device are enabled by the system controller to playback the shared media from the assigned media device. Guest privacy is thereby ensured because another guest cannot view the media shared by the particular guest device on output devices in a different hotel room, and the particular guest device cannot cause media to playback in another hotel room that is not associated with the particular guest device.

In response to a second, later event occurrence such as the particular guest device finishing sharing a movie with its assigned central media device, the system controller un-assigns the media device from the particular guest device and reconfigures components of the computer network to prevent the particular guest device from sharing media with the media device. The system controller further commands the in-room output device(s) to stop playing the media output of the media device. The central media device thereby becomes available to be assigned to a new guest device for media sharing purposes in another guest room, and the in-room output devices associated with the previous guest device are prevented from playing back shared media from the new guest device.

An advantage of the above embodiment is that a guest device is temporarily able to stream media content to the output devices of the guest's assigned room over the hotel's computer network via a central media device while still being prevented from streaming media content to other rooms of the hotel. Assignment of the central media device may be limited to the time duration while the guest device is being operated by a registered guest of the room. By sharing the central collection of one or media device in an on-demand fashion, it is not necessary for the hotel to purchase and provide one media device supporting a particular network-based media sharing protocol for each room. Instead, a relatively lower number of media devices may be centrally installed and then shared as required to support a large number of users. For example, if there are a total of ten centrally located media devices supporting a network-based media sharing protocol available at the hotel, up to ten guests may concurrently share media utilizing the network-based sharing protocol for playback on in-room output devices. The system controller may track statistics to allow an administrator to consider purchasing and/or installing a greater number of media devices if the current number is not enough to meet typical or peak demand. Other network-based functions in addition to (or instead of) streaming can also be supported between the guest device and an assigned media device in a similar way.

According to an exemplary embodiment of the invention there is disclosed a media system including a computer network and a media device supporting a network-based media sharing protocol coupled to the computer network. The media device is for receiving shared media content over the computer network utilizing the network-based media sharing protocol, and for providing a media signal corresponding to the shared media content on an output port. An output device is coupled to the output port of the media device. The system further includes a system controller coupled to the computer network. A plurality of guest devices each supporting the network-based media sharing protocol and storing media content are coupled to computer network. The computer network is configured to by default prevent all of the guest devices from utilizing the network-based media sharing protocol to share media content with the media device. The system controller is configured to, in response to a first event occurrence, assign the media device to a particular guest device by reconfiguring one or more components of the computer network to enable the particular guest device to utilize the network-based media sharing protocol to share media stored on the particular guest device over the computer network with the media device, and to command the output device to play media corresponding to the media signal outputted by the media device. The system controller is configured to, in response to a second, later event occurrence, un-assign the media device from the particular guest device by reconfiguring the one or more components of the computer network to prevent the particular guest device from utilizing the network-based media sharing protocol to share the media stored on the particular guest device over the computer network with the media device, and command the output device to stop playing the media corresponding to the media signal outputted by the media device.

According to an exemplary embodiment of the invention there is disclosed a media system including a computer network and a media device supporting a network-based media sharing protocol coupled to the computer network. The media device is for receiving shared media content over the computer network utilizing the network-based media sharing protocol, and for providing a media signal corresponding to the shared media content on an output port. The system further includes an output device coupled to the output port of the media device, and a system controller coupled to the computer network. The computer network allows a plurality of guest devices supporting the network-based media sharing protocol to be coupled thereto, and the computer network by default prevents all of the guest devices from utilizing the network-based media sharing protocol to share media content with the media device. In response to a first event occurrence, the system controller assigns the media device to a particular guest device by reconfiguring one or more components of the computer network to enable the particular guest device to utilize the network-based media sharing protocol to share media stored on the particular guest device over the computer network with the media device. The system controller further commands the output device to play media corresponding to the media signal outputted by the media device. In response to a second, later event occurrence, the system controller un-assigns the media device from the particular guest device by reconfiguring the one or more components of the computer network to prevent the particular guest device from utilizing the network-based media sharing protocol to share the media stored on the particular guest device over the computer network with the media device, and commands the output device to stop playing the media corresponding to the media signal outputted by the media device.

According to another exemplary embodiment of the invention there is disclosed a method of sharing media content in a media system having a media device supporting a network-based media sharing protocol coupled to a computer network. The media device is for receiving shared media content over the computer network utilizing the network-based media sharing protocol and providing a media signal corresponding to the shared media content on an output port. The system further includes an output device coupled to the output port of the media device, and the computer network allows a plurality of guest devices supporting the network-based media sharing protocol to be coupled thereto. The method includes by default preventing all of the guest devices from utilizing the network-based media sharing protocol to share media content with the media device. The method further includes, in response to a first event occurrence, assigning the media device to a particular guest device by reconfiguring one or more components of the computer network to enable the particular guest device to utilize the network-based media sharing protocol to share media stored on the particular guest device over the computer network with the media device. The method further includes commanding the output device to play media corresponding to the media signal outputted by the media device. The method further includes, in response to a second, later event occurrence, un-assigning the media device from the particular guest device by reconfiguring the one or more components of the computer network to prevent the particular guest device from utilizing the network-based media sharing protocol to share the media stored on the particular guest device over the computer network with the media device, and commanding the output device to stop playing the media corresponding to the media signal outputted by the media device.

According to another exemplary embodiment of the invention there is disclosed a non-transitory computer-readable medium comprising computer executable instructions that when executed by one or more computers cause the one or more computers to perform the above method of sharing media content.

According to another exemplary embodiment of the invention there is disclosed an apparatus for sharing media content in a media system having a media device supporting a network-based media sharing protocol coupled to a computer network. The media device is for receiving shared media content over the computer network utilizing the network-based media sharing protocol and providing a media signal corresponding to the shared media content on an output port. The system further includes an output device coupled to the output port of the media device. The computer network allows a plurality of guest devices supporting the network-based media sharing protocol to be coupled thereto. The apparatus includes means for by default preventing all of the guest devices from utilizing the network-based media sharing protocol to share media content with the media device. The apparatus further includes means for, in response to a first event occurrence, assigning the media device to a particular guest device by reconfiguring one or more components of the computer network to enable the particular guest device to utilize the network-based media sharing protocol to share media stored on the particular guest device over the computer network with the media device; and commanding the output device to play media corresponding to the media signal outputted by the media device. The apparatus further includes means for, in response to a second, later event occurrence, un-assigning the media device from the particular guest device by reconfiguring the one or more components of the computer network to prevent the particular guest device from utilizing the network-based media sharing protocol to share the media stored on the particular guest device over the computer network with the media device; and commanding the output device to stop playing the media corresponding to the media signal outputted by the media device.

According to another exemplary embodiment of the invention there is disclosed an apparatus for sharing media content in a media system having a media device supporting a network-based media sharing protocol coupled to a computer network. The media device is for receiving shared media content over the computer network utilizing the network-based media sharing protocol and providing a media signal corresponding to the shared media content on an output port. The system further includes an output device coupled to the output port of the media device. The computer network allows a plurality of guest devices supporting the network-based media sharing protocol to be coupled thereto. The apparatus includes one or more processors configured to by default prevent all of the guest devices from utilizing the network-based media sharing protocol to share media content with the media device. The one or more processors are further configured to, in response to a first event occurrence, assign the media device to a particular guest device by reconfiguring one or more components of the computer network to enable the particular guest device to utilize the network-based media sharing protocol to share media stored on the particular guest device over the computer network with the media device; and command the output device to play media corresponding to the media signal outputted by the media device. The one or more processors are further configured to, in response to a second, later event occurrence, un-assign the media device from the particular guest device by reconfiguring the one or more components of the computer network to prevent the particular guest device from utilizing the network-based media sharing protocol to share the media stored on the particular guest device over the computer network with the media device; and command the output device to stop playing the media corresponding to the media signal outputted by the media device.

These and other advantages and embodiments of the present invention will no doubt become apparent to those of ordinary skill in the art after reading the following detailed description of the preferred embodiment that is illustrated in the various figures and drawings.

BRIEF DESCRIPTION OF THE DRAWINGS

The invention will be described in greater detail with reference to the accompanying drawings which represent preferred embodiments thereof:

FIG. 4 shows an example of the gateway rules that are in-place to support inter-VLAN communication for the guest devices illustrated in FIG. 1.

FIG. 6 illustrates an example of proxy rules for supporting in-room media sharing by the guest devices illustrated in FIG. 1.

FIG. 9 shows an example of an in-room media device table mapping each of the in-room media devices to a respective guest area of the hotel.

FIG. 12 shows an example of a user interface (UI) screen for inputting information into the reservation table of FIG. 2 according to an exemplary embodiment.

FIG. 15 illustrates a user interface (UI) screen provided by the user profile server of FIG. 1 allowing a specific user to modify their information in a user profile database.

FIG. 18 shows an example of a passkey-to-room table utilized to associate guest devices with particular guest areas and/or particular media devices of the hotel.

FIG. 21 shows an example of a central-passkey-to-location table utilized to associate guest devices with particular guest areas and/or particular media devices at one of a plurality of different hospitality establishments according to an exemplary embodiment.

DETAILED DESCRIPTION

Figure 1:
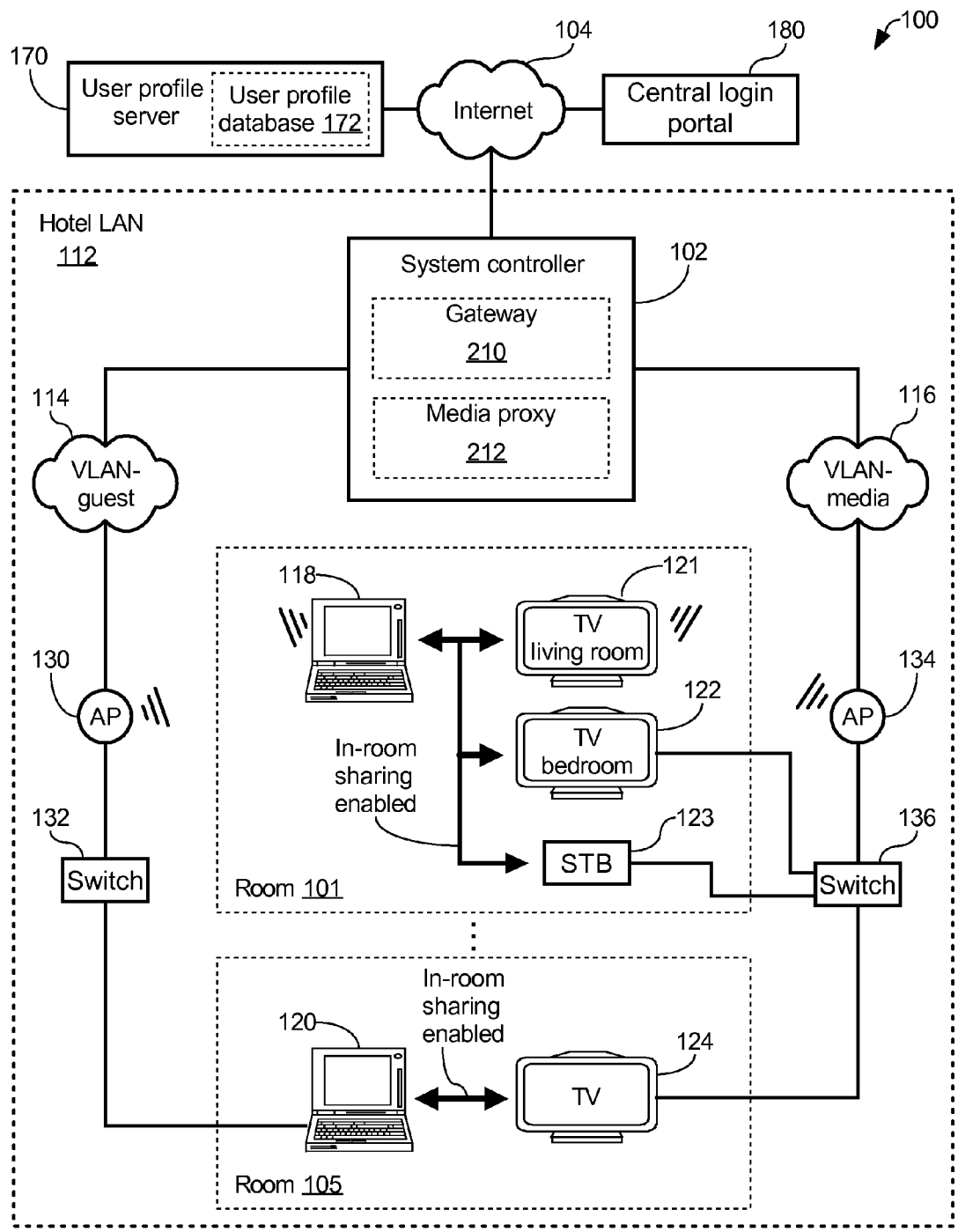
FIG. 1 shows a block diagram of a media system according to an exemplary embodiment of the invention.

FIG. 1 shows a block diagram of a media system 100 according to an exemplary embodiment of the invention. A system controller 102 is coupled between the Internet 104 and a computer network 112 of a hospitality establishment. In this embodiment, the hospitality establishment is a lodging establishment such as a hotel, and the computer network is a local area network (LAN) 112 installed at the hotel. The system controller 102 dynamically controls the ability of guest devices 118, 120 at the hotel to share media content with in-room media devices 121, 122, 123, 124 over the hotel's LAN 112.

The guest devices 118, 120 in this embodiment are personal electronic devices (e.g., mobile phones, laptop computers, netbook computers, tablet computers, digital cameras, etc.) operated by guests of the hotel. Each guest device 118, 120 supports at least one network-based media sharing protocol, for example, AirPlay® by Apple® Inc., DLNA Certification® by the Digital Living Network Alliance®, AllShare® by Samsung® Inc., etc. The media devices 121, 122, 123, 124 are guest-facing audio-visual (AV) entertainment devices such as televisions (TVs), set-top boxes (STBs), and speakers distributed throughout different guest areas (e.g., rooms) of the hotel. The media devices 121, 122, 123, 124 provide media functions such as audio and/or video playback of TV shows, music, feature length movies, and other media content, and may or may not also support the same network-based streaming protocol(s) as the guest devices 118, 120.

The guest areas illustrated in this example include two exemplary guest rooms 101, 105. Each of these guest rooms 101, 105 has at least one of the hotel's media devices 121, 122, 123, 124 accessible therefrom. A first guest room 101 in this example is a suite and includes a first TV 121 in a living room, a second TV 122 in a bedroom, and a central set-top box (STB) 123. A second guest room 105 in this example is a standard guest room and includes a single in-room TV 124. Although only two guest rooms 101, 105 are shown in this example for simplicity, other types and numbers of guest areas within the hotel such as lobby areas, other guest rooms, pool areas, meeting rooms, shopping areas, etc. may also be included in other embodiments. Further, although only four in-room media devices 121, 122, 123, 124 are shown in this example, other types and numbers of media devices including projectors, gaming consoles, speaker systems, proprietary entertainment devices such as AppleTV®, digital signs, etc. may also be distributed throughout the various guest areas of the hospitality establishment in other embodiments.

In this embodiment, the hotel's LAN 112 is logically divided into two separate virtual local area networks (VLANs), namely, VLAN-guest 114 being associated with a first subnet and VLAN-media 116 being associated with a second, different subnet. VLAN-guest 114 is used to isolate network traffic from the various guest devices 118, 120. Wireless access points (APs) 130 and switches 132 accessible to guest devices 118, 120 are pre-configured to place network traffic from all guest devices 118, 120 on the subnet associated with VLAN-guest 114. In contrast, VLAN-media 116 is used to isolate network traffic from the various media devices 121, 122, 123, 124. The switches 136 and APs 134 to which the in-room media devices 121, 122, 123, 124 are coupled are pre-configured to place network traffic from these media devices 121, 122, 123, 124 on the subnet associated with VLAN-media 116. A single AP or switch may also service both VLANs 114, 116 such as a single AP/switch that provides network connectivity to guest devices on VLAN-guest 114 and to media devices on VLAN-media 116.

As shown in FIG. 1, the system controller 102 is coupled between VLAN-guest 114 and VLAN-media 116 on the hotel's LAN 112. The system controller 102 in this embodiment includes a gateway 210 and a media proxy 212. The gateway 210 and media proxy 212 are utilized for dynamically enabling each of the guest devices 118, 120 to share media with a subset of the in-room media devices 121, 122, 123, 124 at the hotel for limited times in response to the occurrence of certain triggering events.

By default, the various network components of the hotel's LAN 112 including the switches 132, 136; APs 130, 134; the gateway 210; and the media proxy 212 are configured to prevent guest devices 118, 120 from utilizing their built-in network-based media sharing protocol(s) to share media content with all of the in-room media devices 121, 122, 123, 124 at the hotel. In particular, the switches 132, 136 and APs 13, 134 do not allow inter-VLAN communications and instead pass all inter-VLAN network traffic (from one of the VLANs 114, 116 to the other of the VLANs 114, 116) to the gateway 210. The gateway 210 by default drops all inter-VLAN communication. Additionally, the media proxy 212 by default does not reroute media shared by the guest devices 118, 120 to any of the hotel's in-room media devices 121, 122, 123, 124.

Gateway 210 acts as the default gateway on hotel LAN 112 and controls network traffic according to a number of dynamically updatable rules. These rules specifically authorize certain guest devices 118, 120 to communicate over hotel LAN 112 with various subsets of the in-room media devices 121, 122, 123, 124. For each guest device 118, 120, the system controller 102 selects the subset for which in-room media sharing is to be enabled. In this embodiment, the subset of media devices selected for a particular guest device 118, 120 only includes the in-room media devices of the room of the hotel that is associated with the IP address of the guest device 118, 120.

Taking guest device 118 (associated with room 101 in FIG. 1) as an example, guest device 118 is dynamically enabled by the gateway 210 to communicate with only the in-room media devices 121, 122, 123 of room 101. In this way, guest device 118 can utilize its natively supported network-based media sharing protocol(s) to share media over the hotel LAN 112 with compatible in-room media devices 121, 122, 123 of guest room 101 that also support the same protocol, but not with compatible media devices 124 of other rooms of the hotel such as room 105.

The media proxy 212 acts as a media server supporting at least one network-based sharing protocol to which guest devices 118, 120 at the hotel may connect and share media content. By default the media proxy 212 does not reroute shared media from unauthorized guest devices to any media devices 121, 122, 123, 124 at the hotel. Media content shared by unauthorized guest devices is simply dropped by the media proxy 212 (e.g., passed to a null interface).

For authorized guest devices the media proxy 212 dynamically reroutes and optionally converts shared media content to one or more of the subset of authorized in-room media devices for that guest device 118, 120. Taking guest device 120 (associated with room 105 in FIG. 1) as an example, guest device 120 is enabled by the media proxy 212 to utilize a network-based media sharing protocol supported by both the media proxy 212 and guest device 120 to share media over hotel LAN 112 with in-room media device 124 of guest room 105 regardless of whether the in-room media device 124 of room 105 also supports the same network-based media sharing protocol. However, guest device 120 is not enabled to utilize the network-based media sharing protocol to share media with media devices 121, 122, 123 of other rooms of the hotel such as room 101. Such unauthorized sharing is prevented because the media proxy 212 will not reroute shared media from this guest device 120 to other media devices that are not associated with room 105.

In the following description of a preferred embodiment, the system controller 102 includes both the gateway 210 and media proxy 212. One reason to include both is because some network-based media sharing protocols are better supported by the use of the media proxy 212 while others are better supported by use of the gateway 210. For example, when utilizing certain network-based media sharing protocols (e.g., DLNA®) that do not require multicast discovery messages in both directions (i.e., from guest device to media device and also from media device to guest device), the gateway 210 facilitates a guest device and a compatible media device within the guest device's authorized subset to directly communicate using unicast transmissions. After assisting a guest device to discover such a compatible media device in its authorized subset, gateway 210 operates similar to a conventional gateway passing traffic from the guest device on the subnet associated with VLAN-guest 114 to the media device on the subnet associated with VLAN-media 116 and vice versa. In this way, when both a guest device 118, 120 and an in-room media device 121, 122, 123, 124 in the authorized subset for that guest device support the same network-based streaming protocol (which preferably does not require bi-directional multicast transmissions), these devices can communicate directly over the hotel LAN 112 subject to the dynamically programmed rules of the gateway 210. Very little load is placed on system controller 102 to perform such allowing and blocking operations.

In contrast, other media sharing protocols such as those that do require bi-directional multicast communications (e.g., AirPlay®) are better facilitated by media proxy 212 acting as a single media server to which all guest devices 118, 120 may connect and share media. In this way, the media proxy 212 is able to multicast announce its availability to all guest devices 118, 120 at the hotel in response to a multicast query from a guest device 118, 120 at the hotel. All guest devices 118, 120 at the hotel receive the multicast announcement from the media proxy 212 and are able to connect to the media proxy 212 using a supported network-based media sharing protocol. Each guest device 118, 120 at the hotel "thinks" it is communicating with a compatible media device such as a TV even though it is actually communicating with the central media proxy 212. When a particular guest device 118, 120 begins to share content with the media proxy 212, behind the scenes the media proxy 212 reroutes (and optionally converts to a compatible protocol/format) the shared media and streams it to the appropriate room's TV or another media device at the hotel. The particular destination media device is one that is within the authorized subset for the guest device and is set according to dynamically configured proxy rules.

Not only does the media proxy 212 in this embodiment facilitate the use of protocols requiring bi-directional multicast communications by preventing all guest devices 118,120 at the hotel from receiving individual multicast announcements from all in-room media devices 121, 122, 123, 124 (and vice versa), the media proxy 212 can also be utilized to allow a guest device 118, 120 to share media utilizing a particular network-based media sharing protocol with an in-room media device 121, 122, 123, 124 that does not support that particular network-based media sharing protocol. The protocols utilized by the guest device and the in-room media device are not required to be the same because the media proxy 212 can dynamically convert (e.g., decrypt, reformat, transcode, re-encrypt, etc.) the shared media and then stream it to the proper destination media device using any suitable streaming technique supported by the destination media device.

Figure 2:
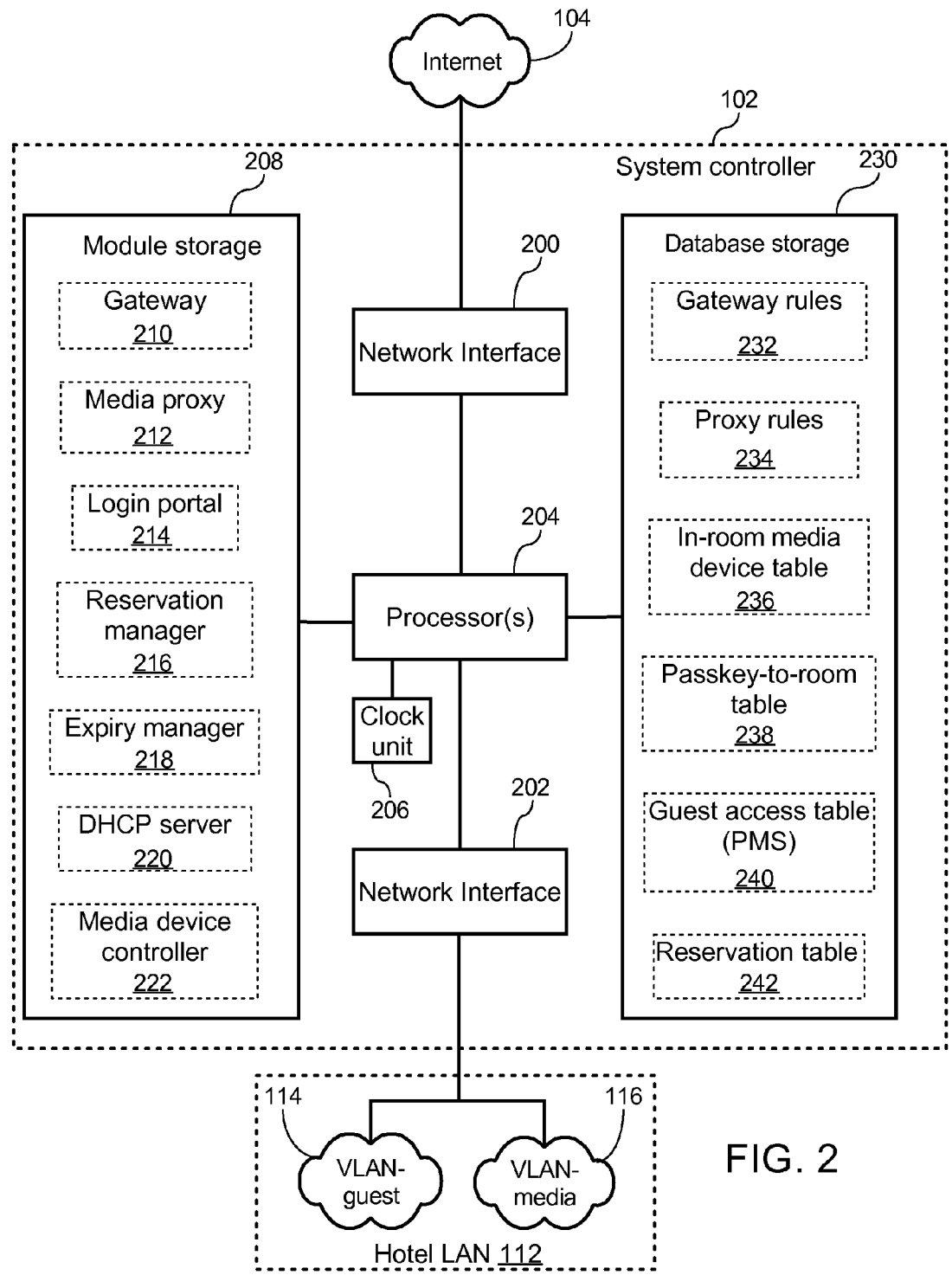
FIG. 2 shows an exemplary block diagram of the system controller of FIG. 1.

FIG. 2 shows an exemplary block diagram of the system controller 102 of FIG. 1. In this embodiment, the system controller 102 is a computer server running a number of software modules 210, 212, 214, 216, 218, 220, 222, which are stored in a storage device 208 such as a hard disk or other tangible, non-transitory computer readable medium. A database containing a number of tables of data 232, 234, 236, 238, 240, 242 utilized in conjunction with the software modules 210, 212, 214, 216, 218, 220, 222 is stored in another storage device 230.

The system controller 102 further includes a first network interface 200 coupled to the Internet 104, a second network interface 202 coupled to the hotel LAN 112, a clock unit 206 such as a real-time clock chip for tracking time, and one or more processors 204 coupled to the storage devices 208, 230, network interfaces 200, 202, and the clock unit 206. In the following description, the plural form of the word "processors" will be utilized as it is common for a CPU of a computer server to have multiple processors (sometimes also referred to as cores); however, it is to be understood that a single processor 204 may also be operable to perform the disclosed functionality in other embodiments.

In this embodiment, the modules 210, 212, 214, 216, 218, 220, 222 represent software modules executed by the processors 204 to cause the system controller 102 to perform a variety of functions at the hotel. The gateway 210 and the media proxy 212 were already briefly described with reference to FIG. 1. The reservation manager 216 reconfigures the gateway 210 and/or media proxy 212 to enable media sharing between a guest device 118 registered in a hotel reservation and media devices within a hotel room associated with the reservation. The login portal 214 is a webserver to which guest devices 118, 120 at the hotel may connect in order to sign-up for in-room media content sharing and other services at the hotel such as high speed Internet access (HSIA). The expiry manager 216 is responsible for deactivating in-room media sharing support when a guest device 118, 120 is no longer authorized to share content with a subset of the hotel's in-room media devices. The DHCP server 220 provides network settings such as the IP address of the gateway 210 as the default gateway to guest devices 118, 120 when the guest devices 118, 120 are first coupled to hotel LAN 112. Finally, the media device controller 222 is operable to send commands that change the behavior of the various in-room media devices 121, 122, 123, 124 at the hotel such as to display a temporally unique passkey currently associated with each hotel room.

In another embodiment, rather than software modules executed by processors 204, the modules 210, 212, 214, 216, 218, 220, 222 of FIG. 1 represent hardware modules and may be implemented either internal or external to system controller 102. Combinations of software and hardware modules may also be utilized in other embodiments.

The database tables 232, 234, 236, 238, 240, 242 are utilized by the processors 204 when performing the various functions of modules 210, 212, 214, 216, 218, 220, 222. In this embodiment, the gateway rules 232 contain dynamically updatable network traffic processing rules utilized by gateway 210. The proxy rules 234 contain dynamically updatable associations between guest devices and media devices for which shared media will be rerouted by the proxy 212. The in-room media device table 236 maps each of the in-room media devices 121, 122, 123, 124 with one or more respective rooms 101, 105. The passkey-to-room table 238 maps each of a plurality of unique passkeys to one or more respective rooms 101, 105. The guest access table 240 corresponds to the hotel's property management system (PMS) and stores details of guests at the hotel including room assignments and scheduled check-out times. The reservation table 324 stores details of reservations at the hotel such as individual guest room reservations and meeting/conference room reservations.

Further details of how the system controller 102 operates in various exemplary embodiments are provided in the following.

Figure 3:
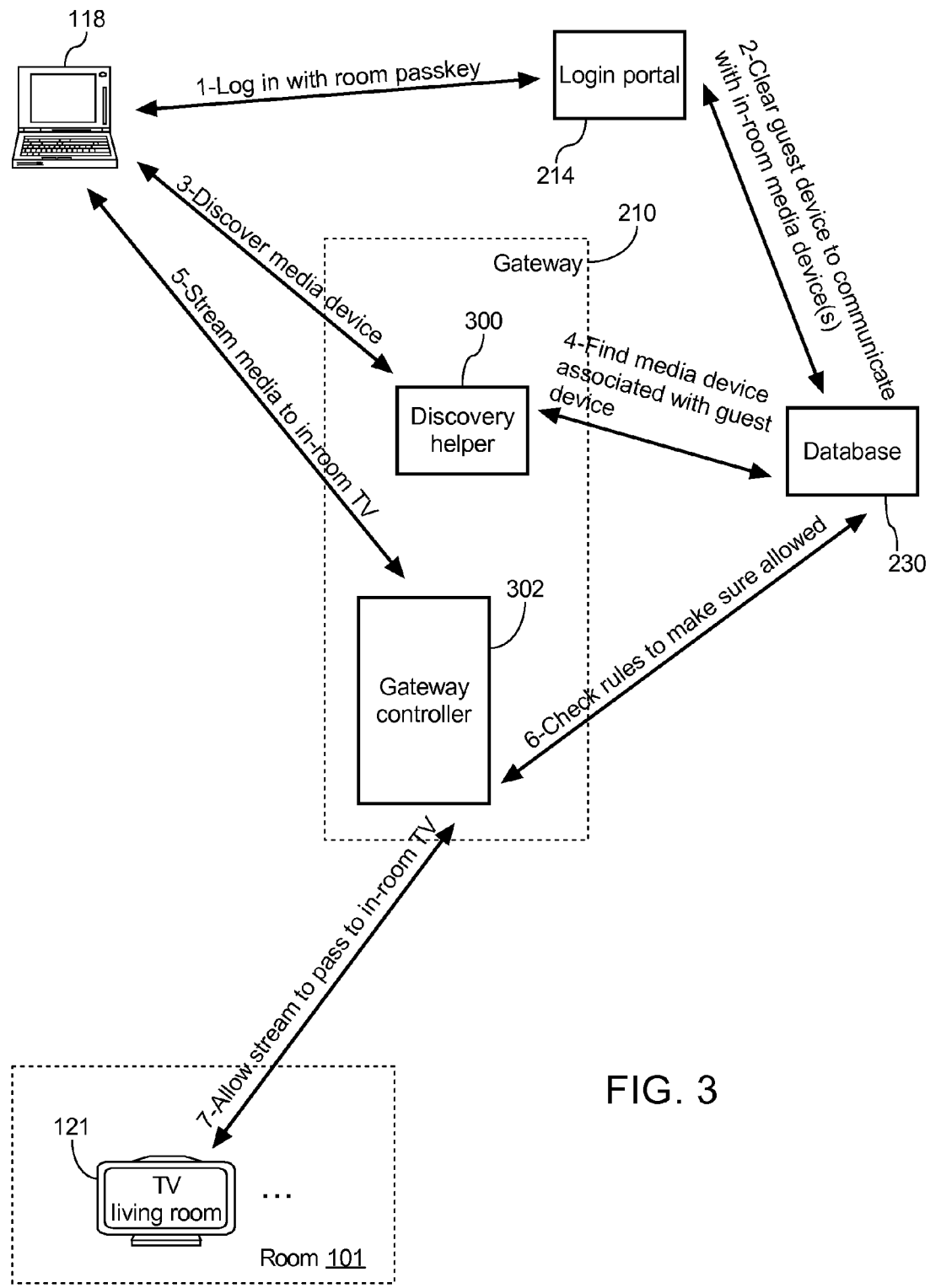
FIG. 3 illustrates how a guest device is enabled by the gateway of FIG. 1 to stream content to the in-room TV of a guest room according to an exemplary embodiment.

FIG. 3 illustrates how guest device 118 is enabled by gateway 210 to stream content to the in-room TV 121 of guest room 101 according to an exemplary embodiment. The double arrow lines in FIG. 3 generally illustrate interactions between modules and devices of the system 100 in FIG. 1. The interactions are not restricted to the exact order shown, and, in other embodiments, shown interactions may be omitted or other intermediate interactions added. The interactions in this embodiment include the following:

1. Guest device 118 triggers the activation of the in-room media sharing feature at the hotel by providing a unique room passkey (associated with only room 101) to the hotel's login portal 214 during a log in process. This passkey may have been provided to the guest by the media device controller 222 causing the in-room TV 121 to display to the guest the passkey as a "connect code" (see FIGS. 17 and 18, described in further detail later).

2. The login portal 214 checks the passkey-to-room table 236 in the database 230 to determine which hotel room is associated with the received passkey, and then clears the MAC and/or IP address of guest device 118 for communication with the MAC and/or IP address of each of the in-room media devices 121, 122, 123 of room 101 because this is the room found associated with the received passkey in this example. The IP/MAC addresses of the in-room devices 121, 122, 123 of room 101 are loaded from the in-room media device table 236. Guest device 118 is only cleared for communication with this subset of the media devices at the hotel (i.e., only cleared for communication with TV 121, TV 122, and STB 123 in FIG. 1). By default, the gateway 210 will drop network traffic from guest device 118 to other media devices at the hotel such as to TV 124 in room 105. The rules needed to configure the gateway 210 to filter network traffic in this manner are dynamically stored by the login portal 214 in the gateway rules 232.

3. Guest device 118 sends a multicast discovery message looking for an available media device on LAN 112 that supports a particular network-based sharing protocol. By using client isolation and port isolation techniques, the APs 130 and switches 132 on VLAN-guest ensure that only the system controller 102 receives the discovery message. Gateway 210 also preferably blocks the discovery message from being passed to the in-room media devices 121, 122, 123, 124 on VLAN-media 116. The purpose (in combination with the discover helper 300, described next) is to avoid spamming all in-room media devices 121, 122, 123, 124 at the hotel with the multicast discovery query from guest device 118.

4. Discovery helper 300 of gateway 210 queries the in-room media device table 236 in database 230 to find which (if any) of the authorized subset of media devices for guest device 118 also supports the same network-based sharing protocol as the guest device is currently utilizing. For example, if guest device 118 is searching for a DLNA® compatible media device, discovery helper 300 queries in-room media device table 236 to see which of TV 121, TV 122, and STB 123 in room 101 (associated with guest device 118) supports DLNA®. Assuming TV 121 supports the same protocol, the discovery helper 300 replies unicast to guest device 118 on behalf of TV 121 and provides guest device 118 with the IP address of TV 121 to use for future direct communications to TV 121.

5. Guest device 118 requests a connection with the IP address of TV 121 in order to begin streaming media content to TV 121. Because TV 121 is on a different subnet than guest device 118, all unicast traffic from guest device 118 to TV 121 is sent via gateway 210.

6. A gateway controller 302 of gateway 210 receives the unicast network traffic from the source address of guest device 118 to the destination address of TV 121. The gateway controller 302 checks the gateway rules 232 to determine whether traffic matching this combination of destination and source addresses is to be passed or dropped.

7. Because in this example guest device 118 and TV 121 are authorized to communicate with each other according to the gateway rules 232, the gateway controller 302 passes the unicast traffic received from guest device 118 for delivery on the subnet associated with VLAN-media 116. Replies from TV 121 to guest device 118 are also passed from VLAN-media 116 to VLAN-guest 114 in a similar manner. Guest device 118 is now in direct bi-directional unicast communication with TV 121 over hotel LAN 112 via gateway 210, and any functions available by the network-based media streaming protocol supported by both guest device 118 and TV 121 may be performed. For example, guest device 118 may share media content for playback on TV 121 or may mirror its desktop output onto TV 121.

FIG. 4 shows an example of the gateway rules 232 that are in-place to support exemplary inter-VLAN communication for guest devices 118, 120 in FIG. 1. In this embodiment, the gateway rules 232 are organized in a table format and the gateway controller 302 searches for a matching rule in an order from top to bottom. The gateway controller 302 applies the specified action for the first matching rule and then processes subsequent network traffic by again searching for a matching rule in the order from top to bottom.

As shown in FIG. 4, a client ID column 400 stores an identifier utilized to correlate each gateway rule with a specific client such as a guest of the hotel. This is useful, for example, when the guest checks out of the hotel to allow the system controller 102 to delete all the gateway rules 232 having the same client ID as the now checked-out guest.

A source VLAN column 402 specifies the VLAN tag indicating the source VLAN from which received network traffic originated. In this embodiment, network traffic having a source VLAN matching VLAN-guest 114 is thereby known to have originated from a guest device 118, 120 such as a personal device brought to the hotel by a guest. In contrast, network traffic having a source VLAN matching VLAN-media 116 is known to have originated from an in-room media device 121, 122, 123, 124 of the hotel's media system 100.

The source device column 404 specifies the source Internet protocol (IP) address of the network traffic. In this embodiment, each device, whether guest device 118, 120 or in-room media device 121, 122, 123, 124 has a unique IP address on the hotel LAN 112 assigned, for example, by the DHCP server 220 after that device's initial connection to LAN 112. (Each device further has a unique media access control (MAC) address which could also be utilized in this column 404.)

The destination VLAN column 406 specifies the VLAN tag of the destination VLAN to which the received network traffic is destined. The destination VLAN tag may be specified in the network traffic itself or may be determined on the fly by the gateway 210 according to the destination IP address (see column 408) included in the received network traffic.

The destination device column 408 specifies the destination IP address included in the received network traffic. Again, although source address column 404 and destination address column 408 are focused on IP addresses in this embodiment, MAC addresses, other types of network addresses, and/or other device identifiers may be utilized instead of or in addition to IP addresses in these columns 404, 408 for identifying the source and destination devices.

The action column 410 specifies the action performed by the gateway 210 when the rule matches the received network traffic. For example, the action of "Pass" means the gateway 210 will pass the received network traffic to its specified destination IP address on the destination VLAN/subnet, and the action of "Drop" means the gateway 210 will drop the received network traffic.

A first example rule set 418 corresponds to a communication feature activated for guest device 118, which is operated by a guest of the hotel staying in room 101. In this example, room 101 has three in-room media devices (TV 121, TV 122, and STB 123). The first rule set 418 was dynamically added to rules 232 by the system controller 102 to allow guest device 118 to directly communicate with only this subset of the media devices coupled to LAN 112. In particular, three rules respectively allow network traffic to pass from guest device 118 to each of the three in-room media devices 121, 122, 123. Another three rules respectively allow network traffic to pass from each of the three in-room media devices 121, 122, 123 to guest device 118. If this guest device 118 tries to communicate with other media devices in other hotel rooms, the communication will be dropped (because default rule 430 will apply, see below).

A second example rule set 420 corresponds to a communication feature activated for guest device 120, which is operated by a guest of the hotel staying in room 105. The second rule set 420 was dynamically added by the system controller 102 to allow guest device 120 to communicate with the single in-room TV 124 of room 105. If guest device 120 tries to communicate with other media devices in other hotel rooms, the communication will be dropped (because rule set 430 will apply, see below).

At the end of the gateway rules 232, default rule set 430 is a static rule always present in rules 232 to isolate the VLANs 114, 16 from each other by preventing (e.g., action of "Drop" in column 410) inter-VLAN communication when none of the above rules apply. Default rule set 430 prevents all unauthorized guest devices from communicating with in-room media devices and also prevents the two authorized guest devices 118 and 120 in this example from communicating with media devices of other rooms.

The gateway rules 232 illustrated in FIG. 4 show the rules when communication features for the first and second guest devices 118, 120 are activated. In this embodiment, each of the communication features is only active for a limited time period. In order to deactivate the communication feature enabling the first guest device 118 to communicate with the media devices 121, 122, 123 in room 101 when its time period has expired, the system controller 102 dynamically removes the first rule set 418 from the gateway/firewall rules. Communication between the first guest device 118 and the media devices 121, 122, 123 in this room 101 is thereby prevented due to the above-described VLAN isolation in combination with default rule 430. Likewise, to deactivate the communication feature enabling the second guest device 120 to communicate with the media device 124 in room 105, the system controller 102 dynamically removes rule set 420 from the gateway rules 232.

In an example usage scenario, after a new guest checks into the first hotel room 101, the system controller 102 dynamically configures the gateway/gateway rules 232 such as by adding inter-VLAN rule set 418 so that the network address of the guest's personal device 118 is cleared for access to the network addresses of the various media devices 121, 122, 123 in the guest's registered room 101. Because communication is enabled between guest device 118 and the in-room media devices 121, 122, 123 of room 101, media functions such as direct streaming of media content between these devices is supported. However, the media devices in other rooms of the hotel (e.g., TV 124 in guest room 105) remain inaccessible to guest device 118. In particular, there is no inter-VLAN communication rule set allowing communication between the IP/MAC address of guest device 118 and the IP/MAC addresses of the other media devices of the hotel such as TV 124.

At the guest's scheduled checkout time (or after another predetermined expiry event such as the guest of room 101 performing an early checkout), the system controller 102 dynamically reconfigures the gateway rules 232 to prevent guest device 118 from communicating with the in-room media devices 121, 122, 123 in room 101. This may involve removing all gateway rules 232 having the IP address(es) of the guest device(es) 118 associated with the guest that has now checked out of room 101, i.e., by removing inter-VLAN rule set 418. In this way, guest device 118 will be unable to communicate with any of the in-room media devices 121, 122, 123 in room 101 after its operator has checked out of that room 101.

In some embodiments the guest may continue to utilize their guest device 118 on the hotel's computer network 112 to access the Internet 102 for a period of time after the in-room media sharing between guest device 118 and the in-room media devices 121, 122, 123 has been deactivated. For example, there may be additional gateway rules 232 (not shown) that enable Internet access for specific guest devices 118, 120, and these Internet access rules may be removed for a particular guest device 118, 120 at a later time than the above-described inter-VLAN rule sets 418, 420 for the particular guest device 118, 120. This is beneficial to give the now-checked-out guest extra Internet access time while still preventing that user from disrupting the television viewing experience of a new guest staying room 101.

Figure 5:
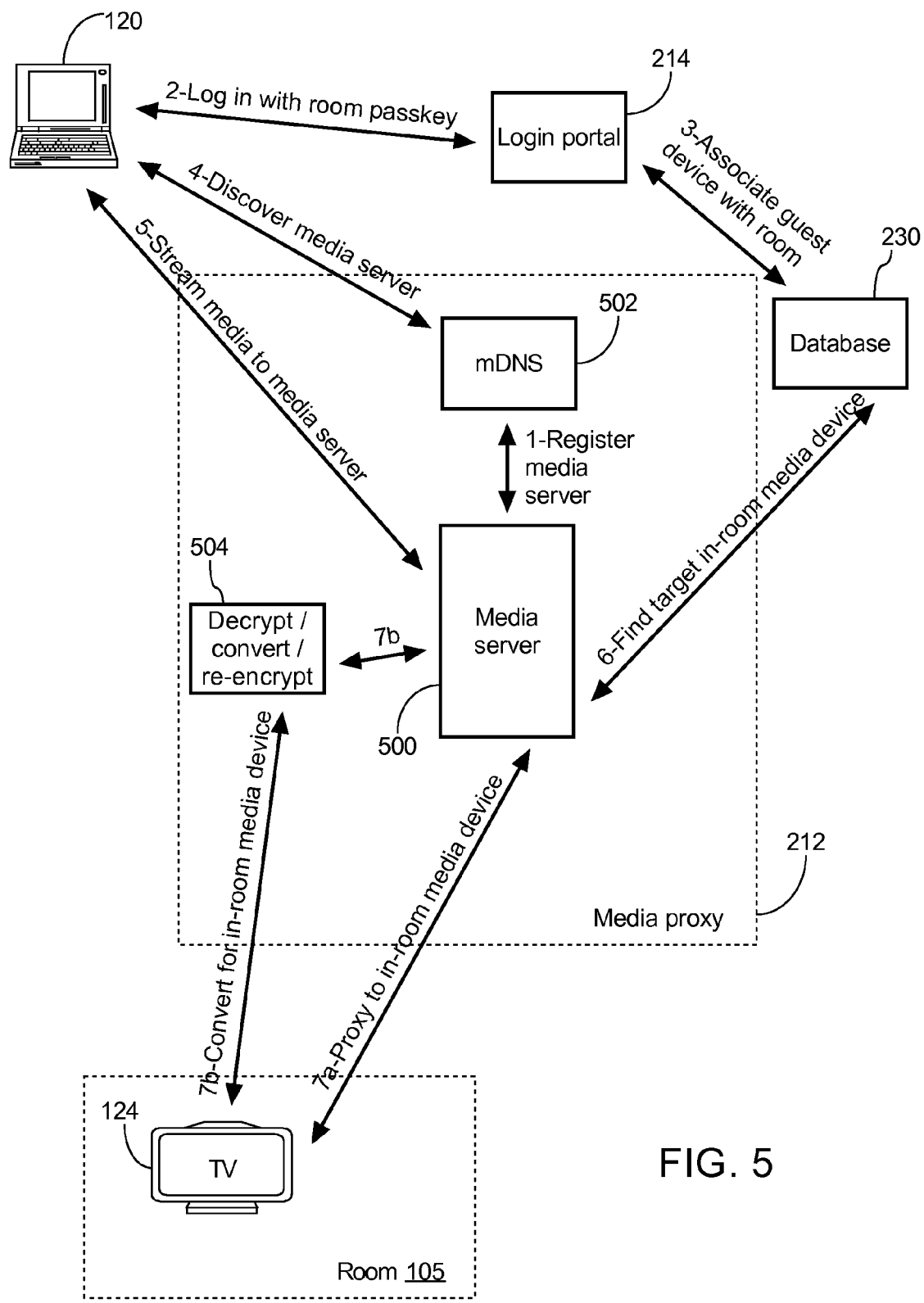
FIG. 5 illustrates how a guest device is enabled by the media proxy of FIG. 1 to stream content to the in-room TV of a guest room according to an exemplary embodiment.

FIG. 5 illustrates how guest device 120 is enabled by media proxy 212 to stream content to the in-room TV 124 of guest room 105 according to an exemplary embodiment. The double arrow lines in FIG. 5 generally illustrate interactions between modules and devices of the system 100 in FIG. 1. The interactions are not restricted to the exact order shown, and, in other embodiments, shown interactions may be omitted or other intermediate interactions added. The interactions in this embodiment include the following:

1. Upon system 100 start-up or reboot, a media server 500 within the media proxy 212 registers itself with a multicast domain name server (mDNS) 502 on LAN 112. The function of mDNS 502 is to multicast reply to multicast queries received from guest devices 118, 120 at the hotel. The multicast response provided by the mDNS 502 provides the registered IP address utilized by the media server 500 as an available media device at the hotel. Other discovery helper modules (not shown) may similarly be included in other embodiments to facilitate discovery of the media server 500 by guest devices using protocols other than mDNS.
2. During the login process guest device 120 provides a unique room passkey (associated with only room 105 in this example) to the hotel's login portal 214. This step is similar to the corresponding step 1 of FIG. 3.
3. The login portal 214 checks the passkey-to-room table 236 in the database 230 to determine which hotel room is associated with the received passkey, and then associates the MAC and/or IP address of guest device 120 with the MAC and/or IP address of the in-room TV 124 of room 101 because this is the only media device of the room found associated with the received passkey in this example. The IP/MAC addresses of the in-room TV 124 of room 105 is loaded from the in-room media device table 236. The media proxy is configured to reroute shared media from guest device 120 to the in-room TV 124 in room 105. The rules needed to configure the media proxy 212 to reroute shared media in this manner are dynamically stored by the login portal 214 in the proxy rules 234.
4. Guest device 120 sends a multicast mDNS discovery message looking for an available media device that supports a particular network-based sharing protocol on hotel LAN 112. The mDNS 502 receives the discovery message and replies with a multicast announcement on VLAN-guest providing the address of the media server 500 as media device supporting the requested network-based sharing protocol (assuming the media server 500 does support this protocol). In a preferred embodiment, the multicast queries and replies are only sent on VLAN-guest 114 and do not cross over to VLAN-media 116 to avoid spamming all in-room media devices 121, 122, 123, 124. For example, when guest device 120 multicasts an mDNS query for AirPlay®-compatible media devices, the only response guest device 120 receives is from the mDNS 502 providing the IP address of media server 500 as an AirPlay compatible media device. Likewise, guest device 120 may also receive multicast responses that mDNS 502 sends when replying to other guest devices' mDNS queries on hotel LAN 112. However, in a preferred embodiment, client isolation and port isolation techniques are employed by APs 130 and switches 134 providing VLAN-guest 114 so that multicast transmissions by guest device 118, 120 are only received by the system controller 101 and are not received by other guest devices 118, 120.
5. Guest device 120 opens a connection with the IP address of the media sever 500 and begins to stream media content utilizing the network-based media sharing protocol. Again taking AirPlay® as an example, the media server 500 may be listening for AirPlay® connections on IP/UDP ports 7000 (AirPlay video), 7100 (Mirroring), 3689 (DAAP, metadata, remote control), 49152 (RAOP, music), 7010/7011 (network timing protocol), 80 (web requests), 443 (encrypted web requests), etc.
6. The media server checks the proxy rules 234 to determine which in-room media device(s) is (are) associated with the incoming shared media and checks the in-room media device table 236 to determine whether the associated media device(s) support(s) the network-based media sharing protocol being utilized by the guest device.
7. A—When the associated media device (e.g., TV 124) supports the same network-based media sharing protocol as is being utilized by guest device 120, the media server 500 opens a connection with that media device and redirects the stream received from guest device 120 to TV 124. Any connections made by TV 124 back to the media server 500 related to this stream are redirected back to guest device 120 in a similar manner. In this way, the media proxy 212 operates as a transparent proxy between guest device 120 and TV 124. This interaction is shown in FIG. 5 with the double arrow line labelled "7a".
7. B—Alternatively, when the associated media device (e.g., TV 124) does not support the same network-based media sharing protocol as is being utilized by guest device 120, the media server 500 passes the stream to a decrypt/convert/re-encrypt module 504 to convert the shared media to be compatible with the associated media device (e.g., TV 124). The converted media is thereafter sent to TV 124 by the media proxy 212 utilizing a method compatible with TV 124. In this way, the media proxy 212 operates as a format converter between guest device 120 and TV 124. This interaction is shown in FIG. 5 with the double arrow lines labelled "7b".

In addition to rerouting a streaming connection from guest device 120 to TV 124, the media proxy 212 may also reroute another type of connection made from TV 124 back to guest device 120. This secondary connection may be useful in some applications such as desktop mirroring as it can be utilized to keep clocks of the two devices 120, 124 in sync, for example. The media server 500 listens for this reverse connection request from TV 124 and looks up guest device 120 associated with TV 124 based on the source IP of TV 124 and the prior open connections on port 7000 already made. Alternatively, the media server 500 re-queries data stored in the database 230 (e.g., proxy rules 234), which associates TV 124 with guest device 120.

FIG. 6 illustrates an example of proxy rules 234 for supporting in-room media sharing by the guest devices 118 and 120 illustrated in FIG. 1. The proxy rules 320 in this embodiment are a mapping of the IP address of a guest device on LAN 112 to the IP address of a particular media device with which the guest device is authorized to share media (i.e., one of the authorized subset of media devices selected for that guest device).

A guest device identifier (ID) column 600 stores the IP address of the guest device (similar to column 404 of FIG. 4) and a client ID column 602 stores the client number associated with the guest device (similar to column 400 of FIG. 4). A destination in-room media device column 604 stores the particular media device to which media content shared by the guest device will be rerouted by the media proxy 212. The particular media device stored in column 604 is one of the media devices in the authorized subset selected for the guest device.

For rooms that have more than one media device such as room 101 in FIG. 1, the guest may be enabled to select the desired destination media device from the subset of media devices 121, 122, 123 in the guest's room. For example, the guest may make a selection at the login portal 214 or using a predetermined hotel application running on guest device 118 either during the login process or afterwards to cause the media proxy 212 to reroute shared media to a different media device of the guest's assigned room. When the guest chooses a new in-room media device at the login portal 214, for example, the login portal 214 updates the destination media device associated with the guest device in column 604 of the proxy rules 234. Again, the possible destination media devices are limited to only the subset of media devices that are associated with the guest device, i.e., the in-room media devices of the guest's assigned room. The guest cannot choose a media device outside of this authorized subset such as a TV in another, unrelated guest's room.

Multiple in-room media devices (selected from the authorized subset associated with the guest device) may also be stored in column 604. In this situation, the media proxy 212 will simultaneously reroute media shared by the guest device to multiple in-room media devices. This is useful to allow the guest to stream music or video content to all TVs and speakers in their registered hotel suite, for example.

The particular destination in-room media device(s) in column 604 may also be automatically selected and/or changed by the system controller 102 in response to activity by the guest such as by powering on a particular media device within the suite. When only a single media device is powered on, that media device may be automatically selected for storage in column 604.

The following description of the system controller 102 in this embodiment will continue to assume that both the gateway 210 and media proxy 212 are included in the system controller 102 as this is a preferred embodiment when some but not all of the in-room media devices 121, 122, 123, 124 at the hotel natively supports a network-based media sharing protocol. However, it is to be understood that, in other embodiments, only one of the gateway 210 or the media proxy 212 is included.

In the case where only one of gateway 210 or media proxy 212 is to be included in system 100, the decision of which to include can be made according design decisions and trade-offs appropriate to the target application. For example, when all of the in-room media devices 121, 122, 123, 124 natively support at least one network-based sharing protocols (e.g., AirPlay®, DLAN®, AllShare®, etc.) and the hospitality establishment only wishes to support these protocols, either gateway 210 or media proxy 212 can be used alone to enable media sharing using these protocols by guest devices 118, 120 at the hotel while also limiting each guest device 118, 120 to only share media content with a subset of the media devices (e.g., only media devices included in the room associated with the guest device 118, 120). Alternatively, if none of the in-room media devices 121, 122, 123, 124 at the hotel natively supports a network-based media sharing protocol that is desired to be supported by the hotel, then only the media proxy 212 may be included in the system controller 102 as the media proxy 212 will always be utilized to convert shared media using the desired protocol and then stream it to the in-room media device using another type of streaming protocol such as a Moving Picture Experts Group (MPEG) and/or Real Time Streaming Protocol (RTSP).

Although separate VLANs 114, 116 are utilized in the above exemplary embodiments to ensure guest devices 118, 120 are by default unable to communicate and share content with in-room media devices 121, 122, 123, 124, a similar result can also be achieved using other types of network segments. Each guest device 118, 120 may be placed on a first network segment and all media devices 121, 122, 123, 124 may be placed on one or more separate network segments. A gateway, proxy, network address translator, firewall, router, or any other network control component having dynamically updatable control rules may be placed between the different network segments similar to how gateway 210 controls traffic between VLAN-guest 114 and VLAN-media 116, and how media proxy 212 controls the rerouting of shared media between guest devices 118, 120 on VLAN-guest 114 and media devices 121, 122, 123, 124 on VLAN-media 116 in the above example. Other methods of blocking network traffic by default such as port isolation or other suitable control functions performed by a network component may be employed instead or in addition to VLAN isolation in these and other embodiments.

Figure 7:
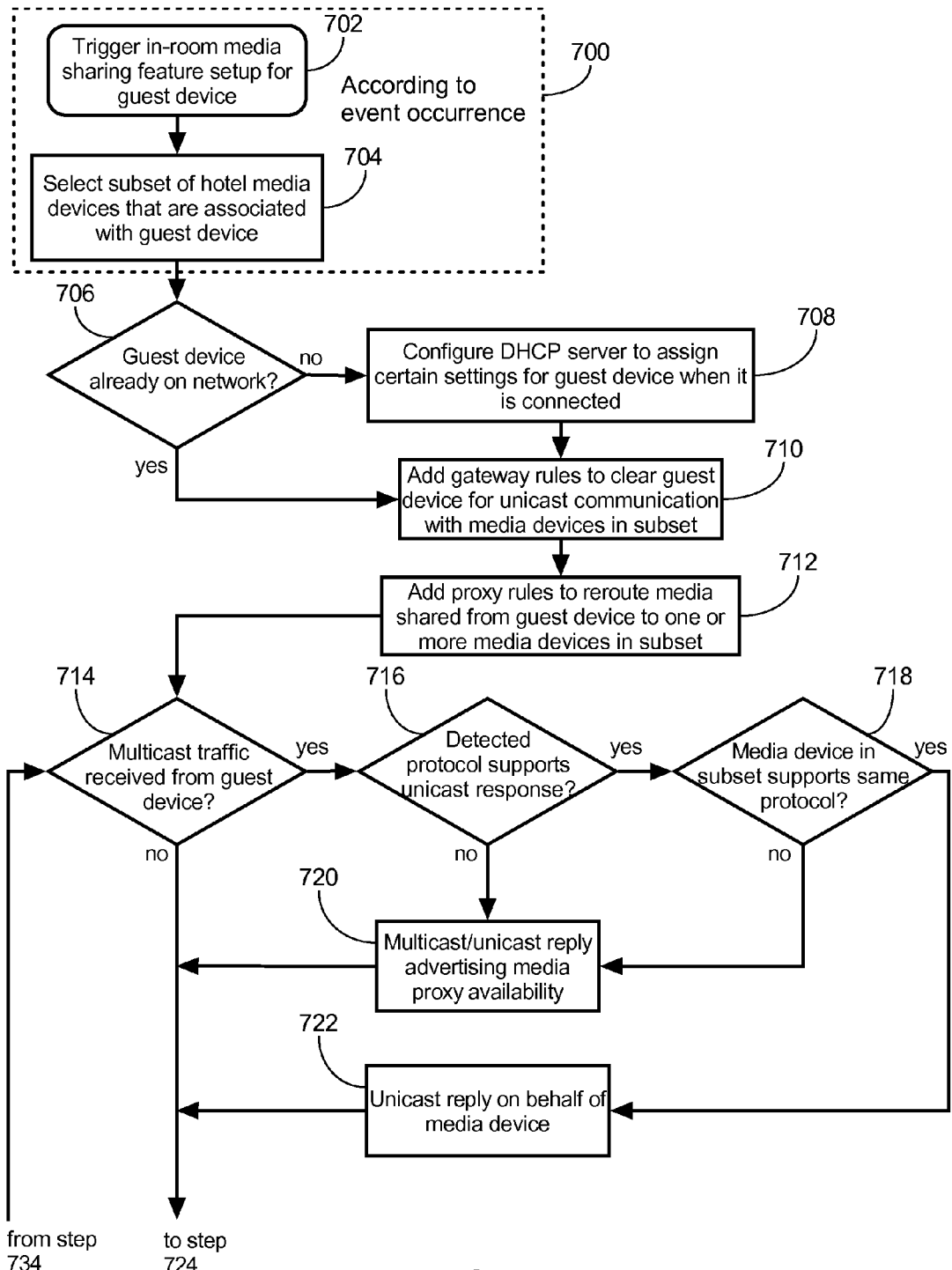
FIG. 7 and FIG. 8 together illustrate a flowchart describing actions performed by the system controller of FIG. 1 to dynamically enable a guest device supporting a network-based media sharing protocol to share media content over a computer network with a subset of the media devices connected to the computer network according to an exemplary embodiment.
Figure 8:
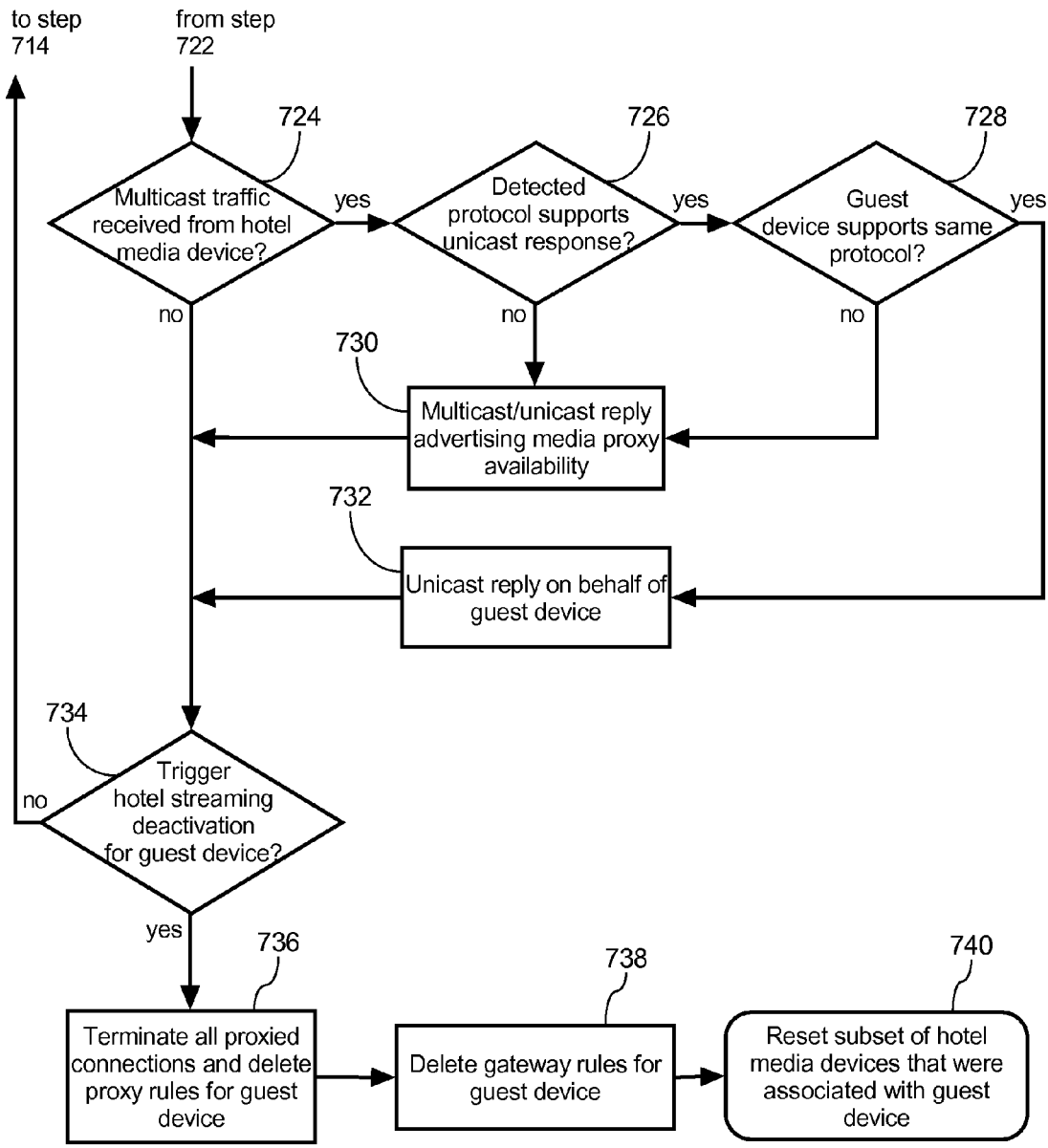

FIG. 7 and FIG. 8 together illustrate a flowchart describing actions performed by the system controller 102 to dynamically enable a guest device supporting a network-based media sharing protocol to share media content over a computer network with a subset of the media devices connected to the computer network according to an exemplary embodiment. The steps of the flowchart in FIG. 7 and FIG. 8 are not restricted to the exact order shown, and, in other embodiments, shown steps may be omitted or other intermediate steps added. In this embodiment, the processors 204 execute one or more of the modules 210, 212, 214, 216, 218, 220, 222 in order to cause the system controller 102 to perform the illustrated steps.

As shown by an initial group of steps labelled 700 in FIG. 7, the process beings in response to an event occurrence (step 702) and involves selecting a subset of the media devices on LAN 112 according to the particular type of event occurrence (step 704).

An example of an event occurrence that may trigger the process at step 702 is when a guest of the hotel logs in to the hotel from their guest device at the webserver provided by the login portal 214. The login process may involve the guest simply agreeing to terms and conditions, or may be more substantial such as when the guest is required to verify their identify and make or authorize a payment.

Other event occurrences may also start the process at step 702 of FIG. 7. For example, rather than starting the process upon guest login, the process may start in response to detecting a media content streaming/discovery attempt by a guest device associated with (or detected to be within) a particular guest room. This may occur after the login and room association of the guest device such as after the guest has logged in for HSIA at the hotel. A benefit of this embodiment is that if the guest device never attempts to stream media content to an in-room media device then no resources are wasted by system controller 102 setting up gateway rules 232 and proxy rules 234.

At step 704, the reservation manager 216 and/or login portal 214 select a subset of the hotel's media devices 121, 122, 123, 124 for which media sharing is to be enabled for the guest device. In the following embodiment the selected subset is assumed to be only the media devices accessible from a particular guest area (e.g., room number) of the hotel found associated with the guest device. For example, when the process of FIG. 7 is triggered to activate in-room media sharing for guest device 118 in FIG. 1, guest device 118 is found to be associated with room 101 and therefore the reservation manager 216 and/or login portal 214 select the subset for which in-room media sharing is to be enabled for this guest device 118 to be TV 121, TV 122, and STB 123. Other desired subsets may be utilized in other embodiments.

FIG. 9 shows an example of the in-room media device table 236 mapping each of the in-room media devices 121, 122, 123, 124 to a respective guest area 101, 105 of the hotel. At step 704, the reservation manager 216 and login portal 214 access the in-room device table 318 to determine the network addresses of the in-room media devices of the particular guest area found associated with the guest device.

The room ID column 900 stores an identifier of each guest area within the hospitality establishment. In this example, the guest areas are represented by their room numbers 101, 105. In other applications, the guest areas may include seat numbers of an airline or cabin numbers on a cruise ship for example. English names with room numbers are shown in brackets in the example of FIG. 9 but in practical implementations the room IDs may be any unique identifier of the guest area.

An in-room media devices column 902 stores the various media devices that are associated with the room ID listed in column 900. Some guest areas may have more than one associated media device. For example, guest room 101 in this example has TV 121, TV 122 and STB 123. Other guest areas may have a single media device such as room 105 having only a single TV 124 in this example.

A type column 904 stores the network-based media sharing protocol(s) supported by each of the media devices shown in column 902. In this example, there are two types of network-based media sharing protocols utilized by media devices in the hotel: AirPlay® by Apple® Inc., and AllShare® by Samsung® Inc. In the first hotel room 101, two AirPlay® certified devices are installed; whereas, in the second hotel room 105, an AllShare® certified device is installed. Some media devices may support multiple network-based media sharing protocols such as the TV in exemplary guest room "107", which supports both AirPlay® and AllShare®. Other streaming protocols may also be supported by media devices in other implementations; for instance, digital living network alliance (DLNA®) certified media devices may be included in other rooms. Furthermore, some media devices such as STB 123 may not support any network-based media sharing protocols and may instead only be capable of receiving MPEG or real time streaming protocol (RTSP) streams from media proxy 212 (similar to how video-on-demand (VOD) is sent to these devices by other servers of the hospitality media system 100); these media devices have a "-" in column 904 in this example.

In some embodiments, the type column 904 is beneficially utilized to by the reservation manager 216 and/or login portal 214 to assign the guest to a room having in-room media devices that support the same type of media sharing protocol(s) supported by the guest's personal guest device(s). For example, the guest may specify in their hotel reservation that they wish to be assigned to a guest room having AirPlay® media devices to take advantage of that streaming protocol natively supported by the guest's mobile phone. Rather than requiring the guest to manually select the type of media device in a reservation, the selection may instead be done automatically such as when the reservation manager 216 stores a history of previous guest devices brought to the hotel by the guest and automatically assigns the guest to a room having compatible media devices. Assigning the guest to a room having compatible media devices reduces the load required by the media proxy 212 to enable media sharing (e.g., media proxy 212 can redirect connections), and/or allows the gateway 210 to enable media sharing by passing unicast communications.

In some embodiments, the system controller 102 automatically populates the list of in-room media devices 236, for example, by listening to multicast announcements from in-room devices 121, 122, 123, 124 in order to detect which media sharing protocols are supported and the IP addresses of the media devices 121, 122, 123, 124. Switch port mapping queries can be utilized by the system controller 102 to trace network traffic back to its source and determine in which hotel room 101, 105 each media devices 121, 122, 123, 124 is located.

Returning again to the description of step 704, in a first example when a guest staying in room 101 logs in for HSIA at the hotel's login portal 214, the login portal 214 detects the IP address of the guest's device 118 and determines the IP addresses of the in-room media devices 121, 122, 123 associated with room 101 from the in-room device table 318. In another example when the guest has made a reservation and is assigned room 105, the reservation manager 216 loads the MAC address of the guest's personal device 120 from the reservation details and determines the IP/MAC addresses of the media device 124 in the assigned room 105 from the in-room media device table 236.

At step 706, the system controller 102 checks whether the guest device is already on the hotel's LAN 114. The may be done by pinging the IP address of the guest device or checking DHCP logs to determine if a particular MAC address has been assigned an IP address. Depending upon the event occurrence that triggered the process at step 702, sometimes the system controller 102 may enable the sharing feature for a guest device before it has arrived at the hotel, for example, at the start time of a reservation. When the guest device is not already on LAN 114, control proceeds to step 708 to setup the DHCP server 220 to assigned a specific IP to the guest device upon its arrival. Alternatively, when the guest device is already on LAN 114, its IP address is already known and therefore control proceeds to step 710 to enable media sharing for the guest device.

At step 708, the login portal 214 and/or reservation manager 216 setup rules in the DHCP server 220 to ensure the guest device will be assigned particular network settings such as a particular IP address when it is connected to LAN 112. Control then proceeds to step 710 to enable sharing for the particular IP address that is now preconfigured to be assigned to the guest device.

At step 710, the login portal 214 and/or reservation manager 216 update the gateway rules 232 to thereby allow unicast communications between the guest device and each of the in-room media devices in the subset determined at step 704. For example assuming the particular guest room associated with guest device 118 is room 101, at step 404 the reservation manager 216 or login portal 214 dynamically adds gateway rules 232 such as inter-VLAN communication rule set 418 in FIG. 4, which allows communication between the IP address of guest device 118 and each of the IP addresses of the in-room media devices 121, 122, 123 of room 101. The IP addresses of the media devices associated with the location are loaded from the in-room media device table 236 (see FIG. 9). The IP addresses of the guest device is either known from its received network traffic or may be known in advance by the system controller 102 configuring the DHCP server 220 at the hotel to assign a specific IP address to the guest device identified by a predetermined MAC address listed in the reservation—see previously described step 708 and column 830 of FIG. 8, described in more detail later.

At step 712, the login portal 214 and/or reservation manager 216 update the proxy rules 234 to reroute media shared from the guest device to one or more of the media devices in the subset determined at step 704. As previously mentioned, the selection of the particular destination media device(s) in column 604 can be made according to commands received from the guest device or may be done automatically by the system controller 102 according to activity by the guest device or one of the media devices in the subset.

At step 714, when the system controller 102 receives multicast network traffic from the guest device, control proceeds to step 714; otherwise, control proceeds to step 722. An example of typical multicast network traffic that will be received from the guest device is a query for media devices on LAN 112 that support a particular media sharing protocol.

At step 716, the gateway 210 and media proxy 212 examine the multicast network traffic to detect the requested media sharing protocol. This may also be done according to the destination address and/or port(s) specified by the multicast network traffic or according to content of the traffic. When the detected media sharing protocol supports unicast responses to the multicast query, control proceeds to step 718; alternatively, when the media sharing protocol does not support unicast responses to the multicast query, control proceeds to step 720.

An example of a network-based media sharing protocol that supports unicast responses to multicast queries is DLNA®. DLNA® employs Universal Plug and Play (UPnP) for media management, discovery and control. Universal plug and play (UPnP) capable guest devices send discovery messages to the multicast address 239.255.255.250 on port 1900 via the User Datagram Protocol (UDP) protocol. Because other UPnP devices are required to reply to these discovery messages with a unicast response, when the discovery helper 300 of gateway 210 receives a multicast UPnP discovery message from the guest device on this port and multicast address, control proceeds to step 718.

An example of a network-based media sharing protocol that does not support unicast responses to multicast queries is AirPlay®. AirPlay® employs mDNS for discovery. AirPlay® capable guest devices send discovery queries to the multicast address 224.0.0.251 on port 5353 via the UDP protocol. Because responses to the mDNS discovery query are generally required (with some exceptions) to be a multicast UDP response also to multicast address 224.0.0.251 on port 5353, when the mDNS 502 of media proxy 212 receives an mDNS discovery message from the guest device on this port and multicast address, control proceeds to step 720.

At step 718, the discovery helper 300 searches the in-room media device table 236 to determine whether any of the media devices in the subset for this guest device (determined at step 704) supports the same media sharing protocol. For example, when the incoming discovery query is for the DLNA® media sharing protocol, the discovery helper 300 checks whether the guest room associated with the guest device includes at least one DLNA® compatible media device. When yes, control proceeds to step 722; otherwise, control proceeds to step 720.

At step 720, the media proxy 212 sends a multicast or unicast reply to the guest device announcing the availability of the media server 500 as a compatible media device on hotel LAN 112. For protocols that require a multicast reply such as mDNS, all guest devices 118, 120 on hotel LAN 112 receive the multicast reply and are made aware that the media server 500 is available to use the supported media sharing protocol. For protocols that accept or require a unicast reply such as UPnP, only the particular guest device that sent the original multicast query received at step 714 will receive the reply. Multicast replies may be sent by the mDNS 502 when replying to an mDNS query received from the guest device. When the media proxy 212 is also going to support other protocols that don't utilize mDNS, the media proxy 212 may further include one or more additional modules (not shown) to send either unicast or multicast replies according to the other protocols. For example, another discovery helper module (not shown) may be included within media proxy 212 to send unicast or multicast replies to the guest device on behalf of the media server 500. Alternatively, media server 500 itself may listen for multicast queries and send a unicast or multicast reply providing its own IP address.

At step 722, the discovery helper 300 of gateway 210 sends a unicast reply to the guest device on behalf of each of the compatible media devices in the subset associated with the guest device. Each unicast reply provides the guest device with the IP address of one (or more) of the compatible media devices. In this way, the discovery helper 300 facilitates the guest device to discover the IP addresses of the compatible in-room media devices within its subset without spamming all media devices in the hotel (such as media devices in other room) with the multicast discovery message from the guest device. This is beneficial to reduce unnecessary network traffic and prevent each media device from hearing multicast messages from guest devices that are not authorized to stream media to that media device.

The discovery helper 300 may also send a notification (e.g., a "heads-up" message) to the compatible in-room media devices after unicast replying to the guest device on behalf of these devices. The purpose of the heads-up message is to alert these media devices so they are ready to receive future unicast communications directly from the guest device. Some protocols may require this due to the media device not actually receiving the initial discovery request.

Steps 724, 726, 728, 730, 732 of FIG. 8 generally correspond to steps 714, 716, 718, 720, 722 of FIG. 7, except that now the multicast network traffic is received from a media device 121, 122, 123, 124 at the hotel that is within the authorized subset for the guest device. In steps 730 and 732, the response is sent back to the media device. Handling multicast network traffic from hotel media devices as is done in steps 724, 726, 728, 730, 732 is beneficial to facilitate discovery and allow media sharing to flow in the opposite direction. For example, rather than a guest device being utilized to stream personal vacation videos to the in-room TV, a guest may instead utilize the in-room STB (or another type of in-room media device) to stream video-on-demand (VOD) or other hotel content to the guest device, which acts as the output device. This might allow a guest to continue watching a movie on their guest device while in restaurant or pool area of the hotel. In another example, several guest devices may be associated with a single conference room and a conference presenter may utilize a media device within the room to share a presentation with all guest devices. Only in-room media devices within the authorized subset for a guest device (determined at step 704) will be able to share content with the guest device in this manner. If such functionality is not desired, steps 724, 726, 728, 730, 732 may be removed and multicast discovery queries from the hotel media devices 121, 122, 123, 124 may be dropped by the system controller 102 (i.e., not passed from VLAN-media 116 to VLAN-guest 114).

At step 734, the system controller 102 determines whether the media sharing feature between the guest device and the in-room media devices in its authorized subset should be deactivated.

Figure 10:
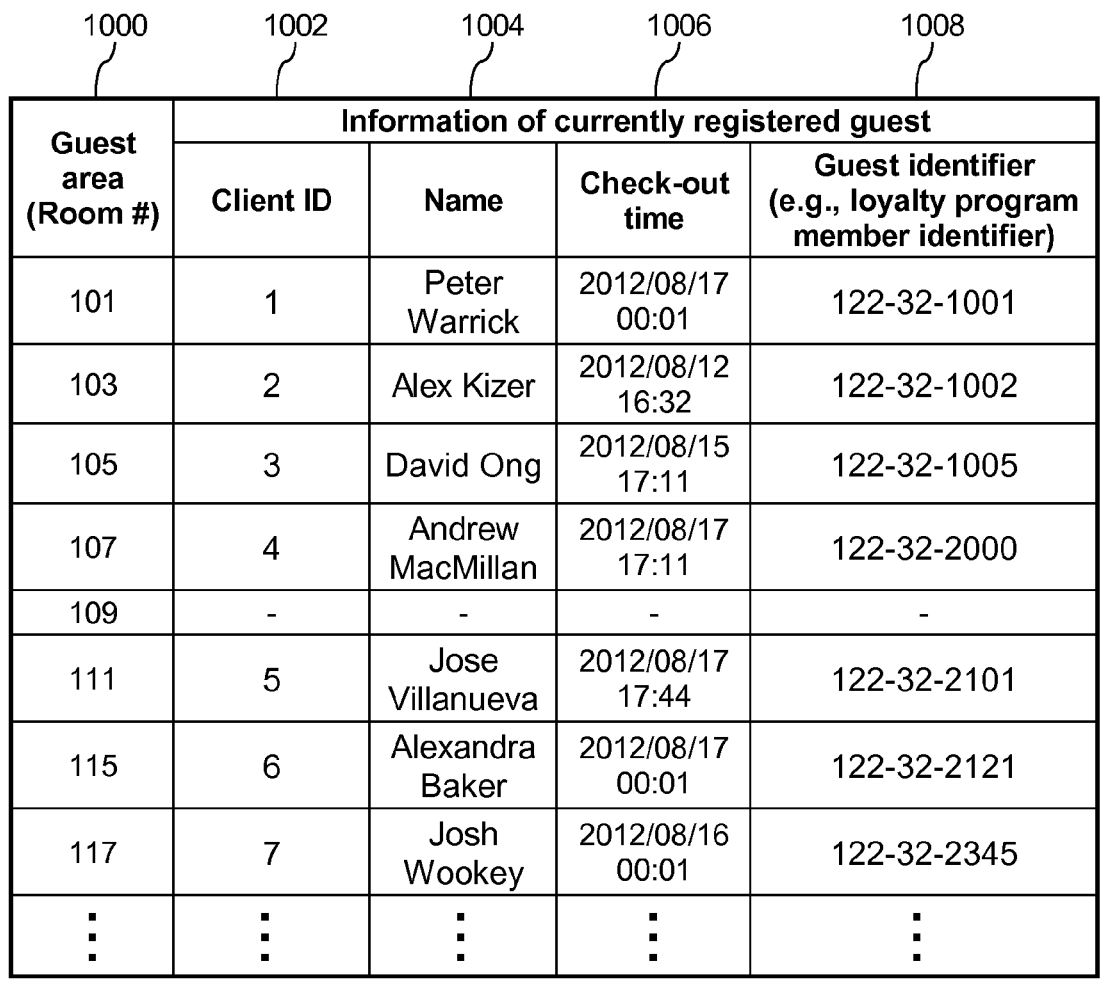
FIG. 10 illustrates an example of a guest access table provided by a property management system (PMS) handling room assignment at the hotel.

FIG. 10 illustrates an example of the guest access table 240. In this example, the guest access table 240 is provided by a property management system (PMS) handling the room assignment at the hotel 101. A room number column 1000 indicates a particular guest area in the hotel, a client identifier (ID) column 1002 indicates a serial number of the guest staying in that room utilized to cross reference with column 400 of the gateway rules 232 and column 602 of the proxy rules 320, a name column 1004 indicates the name of the current guest, a check-out time column 1006 indicates the scheduled expiry time of the guest's stay in the room, and a guest identifier (ID) column 1008 indicates an identifier of the current guest such as the loyalty program membership identifier used by the guest at the hotel 101. Vacant rooms have a dash ("-") stored in the above columns in this example.

Returning to the description of step 734, in an exemplary embodiment the expiry manager 218 searches the guest access table 240 to determine whether the check-out time (column 1006) has been reached for a particular client ID (column 1000). When yes, control proceeds to steps 736; otherwise, control returns to step 714. In some implementations, an interrupt is produced when a client's expiry time is reached in column 1004 (or another event occurs such as an earlier check-out message received from the PMS) to cause control to automatically proceed to step 736.

At step 736, the expiry manager 218 updates the proxy rules 234 to deactivate media proxying for the guest device. This is done by the expiry manager 218 deleting rows of the proxy rules 234 having the same client ID in column 602 as the now expired client ID from column 1002 of FIG. 10 (determined at step 734). The expiry manager 218 further causes the media proxy to terminate all connections and other streams that are related to this guest device. For example, if guest device 118 was currently utilizing the media proxy to stream media content to TV 121, the stream is terminated at this step.

At step 738, the expiry manager 218 updates the gateway rules 232 to deactivate the communication feature between the guest device and the in-room media devices in the subset associated with the guest device. This may be done by the expiry manager 218 deleting the inter-VLAN rule set having the same client ID in column 400 as the expired client ID from column 1002 of FIG. 10 (as determined at step 734). For example, when client ID "1" is determined to have expired at step 406, the expiry manager 218 deletes all the gateway rules 232 having client ID "1" in column 400 of the gateway rules 232, which includes all the rules indicated as rule set 418 in the example of FIG. 4.

At step 740, the media device controller 222 resets the in-room media devices in the subset associated with the now expired guest device back to their default states. This is done by sending a reset command via the computer network 112 to reset these media devices, for example, resetting the in-room media devices 121, 122, 123 of room 101 after the guest of room 101 has checked out. The purpose of this step is to ensure that if the media device(s) was/were actively streaming content (or performing other network-based media functions) under the control of the now expired guest device at the time the communication feature was disabled at step 408, that it/they will not continually try to reconnect with the now inaccessible guest device. The media devices are instead reset back to a clean state ready for the next guest.

Other embodiments of the above described system 100 are also possible. For example, in another embodiment the gateway 210 is pre-configured to pass all broadcast/multicast traffic between VLAN-guest 114 and VLAN-media 116. Although the unrestricted passing of broadcast/multicast traffic does open up a security risk in that it is possible for the first guest device 118, for example, to communicate utilizing broadcast/multicast network traffic with any media device in the hotel (including media devices in other rooms such as TV 124), the risk is minimal if the media devices are known in advance to always require unicast communication to support the network-based media functions such as media content streaming.

In these embodiments, to stream media content, guest device 118 first queries the LAN 112 for a compatible streaming device by transmitting a broadcast/multicast user datagram protocol (UDP) message such as an mDNS query message. The gateway 210 receives the query on VLAN-guest 114 and passes it to VLAN-media 116. After the gateway 210 passes the query to VLAN-media 116, all compatible TVs in the hotel receive the message and attempt to reply with either unicast or broadcast/multicast replies providing their assigned IP addresses on hotel LAN 112. The previously described gateway rules 232 prevent all but the in-room media devices in room 101 from successfully replying to the first guest device 118 utilizing unicast communications from VLAN-media 116 to VLAN-guest 114.

In the event that one or more media devices in the hotel reply using a broadcast/multicast message (e.g., an mDNS reply), the gateway 210 will pass the reply from VLAN-media 116 to VLAN-guest 114. As a result, guest device 118 receives the reply. However, when guest device 118 thereafter attempts to open a unicast transmission control protocol (TCP) connection with that media device to finalize the discovery process and/or begin streaming media content, the inter-VLAN communication rule set 418 will only allow the unicast connection if the destination device is one of the in-room media devices 121, 122, 123 in room 101. The default rule 430 blocks all other unicast communication attempts. In this way, guest device 118 can only establish unicast communications with the subset of in-room media devices 121, 122, 123 in room 101 even though it may discover other media devices in the hotel (e.g., discover TV 124 by sending/receiving broadcast/multicast traffic to/from TV 124). This embodiment may be useful when it is known in advance that the in-room media devices within the hospitality establishment will not play media or take any other actions that might disturb the media experience of the current guest of the room as a result of receiving only broadcast/unicast network traffic.

In other embodiments, by default gateway 210 blocks all multicast messages from VLAN-media 116 from passing to VLAN-guest 114. When a particular guest device makes a multicast query for compatible media devices on LAN 112, gateway 210 passes the multicast query to VLAN-media 116 and then for a limited time allows multicast replies from only the media devices in the authorized subset for that particular guest device. For example, after guest device 118 makes an mDNS query for AirPlay® compatible devices on LAN 112, the gateway 210 for a limited time passes multicast replies from the subset of in-room media devices 121, 122, 123 in room 101 from VLAN-media 116 to VLAN-guest 114. Multicast replies from other in-room media devices in other rooms (e.g., TV 124 in room 105) continue to be blocked by gateway 210. After a sufficient time duration (e.g., 1 minute), gateway 210 will again block all multicast messages from VLAN-media 116 from passing to VLAN-guest 114. This allows guest device 118 to discover only its authorized subset of the media devices at the hotel.

Although all guest devices 118, 120 at the hotel will receive the multicast replies from in-room media devices 121, 122, 123 in the above example, typically only guest device 118 will be actively searching for media devices at the time these responses are sent. Short time-to-live (TTL) values in the multicast replies can be utilized help prevent caching at unauthorized guest devices (e.g., caching of replies from media device 121, 122, 123 in room 101 at guest device 120 associated with room 105). Additionally, the names of the in-room media devices 121, 122, 123, 124 can be configured to include the room number to help prevent guest confusion in the event that two guest devices 118, 120 at the hotel simultaneously search for media devices.

As described above, the activation of the in-room media sharing feature for a guest device at step 700 of FIG. 7 depends upon the particular trigger event. Examples of event occurrences which may trigger the process of FIG. 7 in include the following:

Event Occurrence Example 1

Start-Time Reached for Reservation Having a Registered Guest Device

Figure 11:
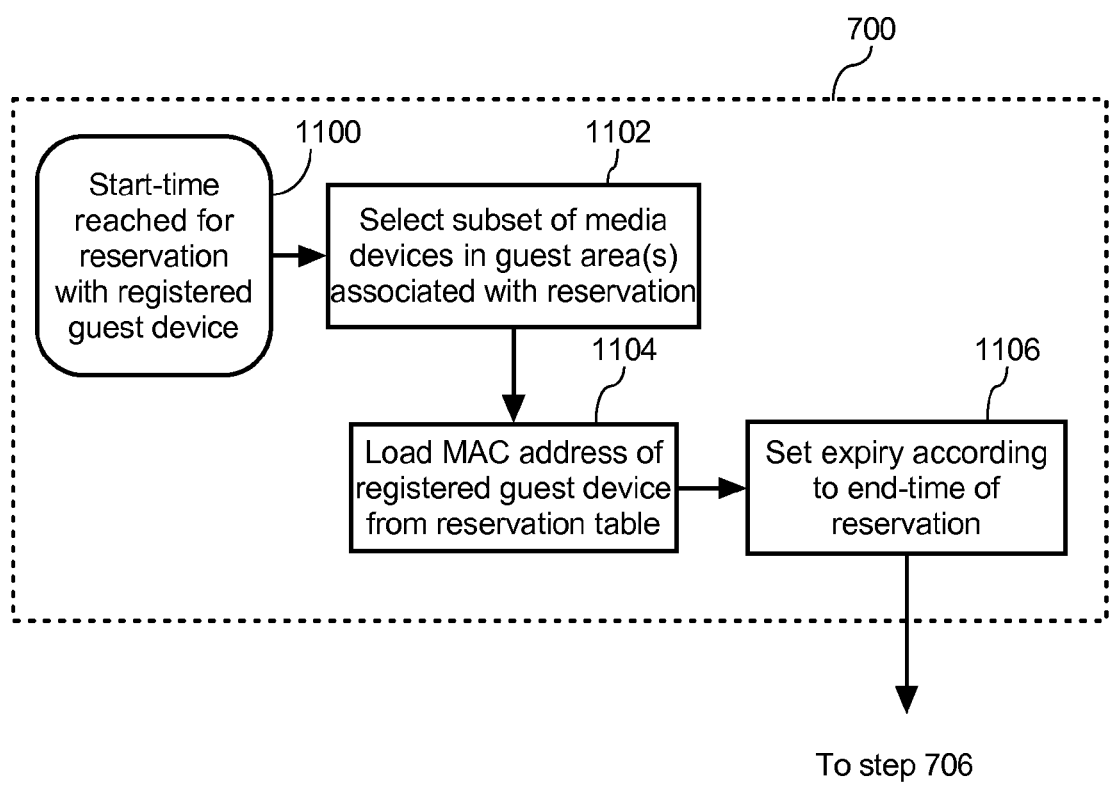
FIG. 11 illustrates a flowchart showing steps taken by a reservation manager when starting the process of FIG. 7 in response to reaching the start-time of a reservation having a registered guest device.

FIG. 11 illustrates a flowchart showing steps taken by the reservation manager 216 when starting the process of FIG. 7 in response to reaching the start-time of a reservation having a registered guest device. The steps of the flowchart in FIG. 11 are not restricted to the exact order shown, and, in other embodiments, shown steps may be omitted or other intermediate steps added. In this embodiment, the processors 204 execute the reservation manager module 216 in order to cause the system controller 102 to perform the illustrated steps.

At step 1100, the process begins when the start time of a reservation having a registered guest device is reached.

FIG. 12 shows an example of a UI screen 800 for inputting information into the reservation table 242 according to an exemplary embodiment. A guest making a hotel reservation, either an event reservation as shown in FIG. 12 or an individual guest room reservation in another example, can register specific guest devices such as a mobile phone 1240 and tablet computer 1242. Column 1234 allows the guest making the reservation to indicate that in-room media sharing from these registered devices 1240, 1242 is to be automatically enabled. The reservation manager 216 monitors the current time as tracked by the clock unit 206 in order to determine when the start time 1206 of the reservation 1200 is reached. When the start time 1206 is reached, the process of FIG. 11 begins at step 1100.

At step 1102, the reservation manager 216 loads the location(s) 1210 of the reservation from the reservation table 242. For example, in the event reservation of FIG. 7, the location 1210 of the event is the "Meeting room A", "Meeting room B", and "Guest room 101". Although meeting and guest room locations are utilized in this event, other types of guest areas may be applicable in other embodiments. For example, the location(s) 1210 loaded from the reservation 1200 at this step may correspond to any guest areas such as meeting rooms, guest rooms, seat numbers, media device locations, etc. at the hospitality establishment. The location 1210 may also be automatically assigned by the reservation manager 216 when the start time 1206 is reached rather than being specified in advance. The selected subset of the hotel's media devices for which these registered guest devices are to be enabled to share media are all the in-room media devices associated with location 1210.

At step 1104, the reservation manager 216 loads the MAC addresses of the registered guest devices 1240, 1242 from column 1230 of the reservation 1200. These values were previously stored in the reservation 800 by the event organizer when they setup the event reservation. Alternatively, these values may be added or changed by the event organizer at any time during the event.

At step 1106, the reservation manager 216 determines the expiry time for the communication feature for the registered devices 1240, 1242. The registration manager 216 automatically activates sharing with the in-room media devices for the duration of the reservation 1200. The expiry time determined at step 1106 corresponds to the end time 1208.

Event Occurrence Example 2

Figure 13:
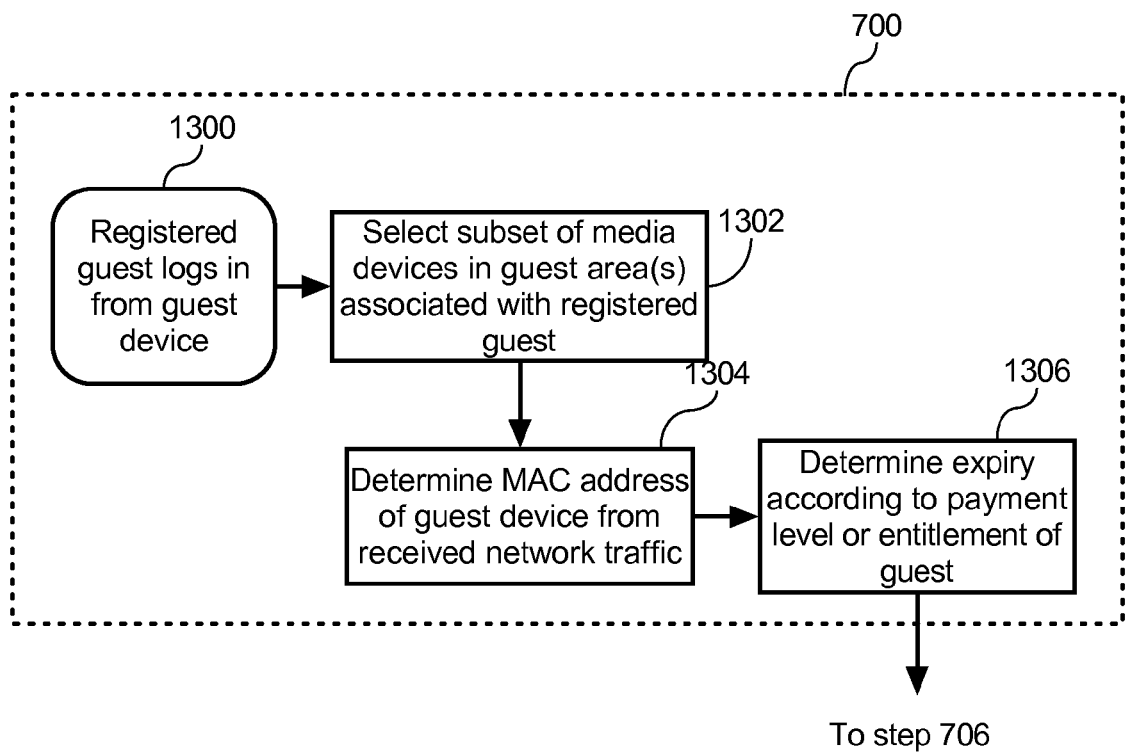
FIG. 13 illustrates a flowchart showing steps taken by a login portal when starting the process of FIG. 7 upon a registered guest logging in (e.g., signing up) at the hotel's web-based login portal.

A Registered Guest is Authenticated During the Login Process from a Particular Guest Device FIG. 13 illustrates a flowchart showing steps taken by the login portal 214 when starting the process of FIG. 7 upon a registered guest logging in (e.g., signing up) at the hotel's web-based login portal. The steps of the flowchart in FIG. 13 are not restricted to the exact order shown, and, in other embodiments, shown steps may be omitted or other intermediate steps added. In this embodiment, the processors 204 execute the login portal 214 in order to cause the system controller 102 to perform the illustrated steps.

At step 1300, the process to activate the communication feature for a guest device begins when the guest device is utilized by a guest at the hotel to log in or sign up for services at the webserver provided by the login portal 214. As previously described, either a web browser or other predetermined application running on the guest device may interact with the login portal 214 over the hotel LAN 112.

At step 1302, the login portal 214 determines the room number (or other guest area identifier) associated with the guest device. In one example, during the login process the guest is required to enter personal details such as their last name and room number. From this information, the login portal 214 queries the hotel's property management system (PMS) or another room assignment database (see example of guest access table 240 in FIG. 10) to verify the guest's identify and confirm the guest is registered for the specified guest room. In another configuration, the login portal 214 may determine the source room number of the guest device by tracing network traffic received from the guest device back to a source access-node such as a particular switch port on the LAN 112, which is mapped to a particular guest room according to a network map. This embodiment is particularly advantageous when the guest device is connected to LAN 112 via a wired connection. The selected subset of the hotel's media devices for which the guest device is to be enabled to share media are all the in-room media devices associated with determined room number.

At step 1304, the login portal 214 determines the MAC or IP address of the guest device by examining the headers of the network traffic received from the guest device.

At step 1306, the login portal 214 determines the expiry time for the communication feature for the guest device. In some embodiments, each registered guest may have the communication feature activated for a predetermined time duration such as one day. The time duration may also be cut off earlier such as when the guest checks out of the hotel. Alternatively, the expiry time may correspond to the guest's scheduled check-out time for the room as specified in column 1006 of FIG. 6. In other embodiments, the guest may purchase an amount of streaming time or an amount of data and the expiry will cut off when the paid for time or data amount is reached. The expiry time may also correspond to the end time 1206 of the guest's reservation and be determined similar as previously described for step 1106.

Event Occurrence Example 3

Network Traffic from an Unrecognized Guest Device is Detected on Hotel LAN 112

Figure 14:
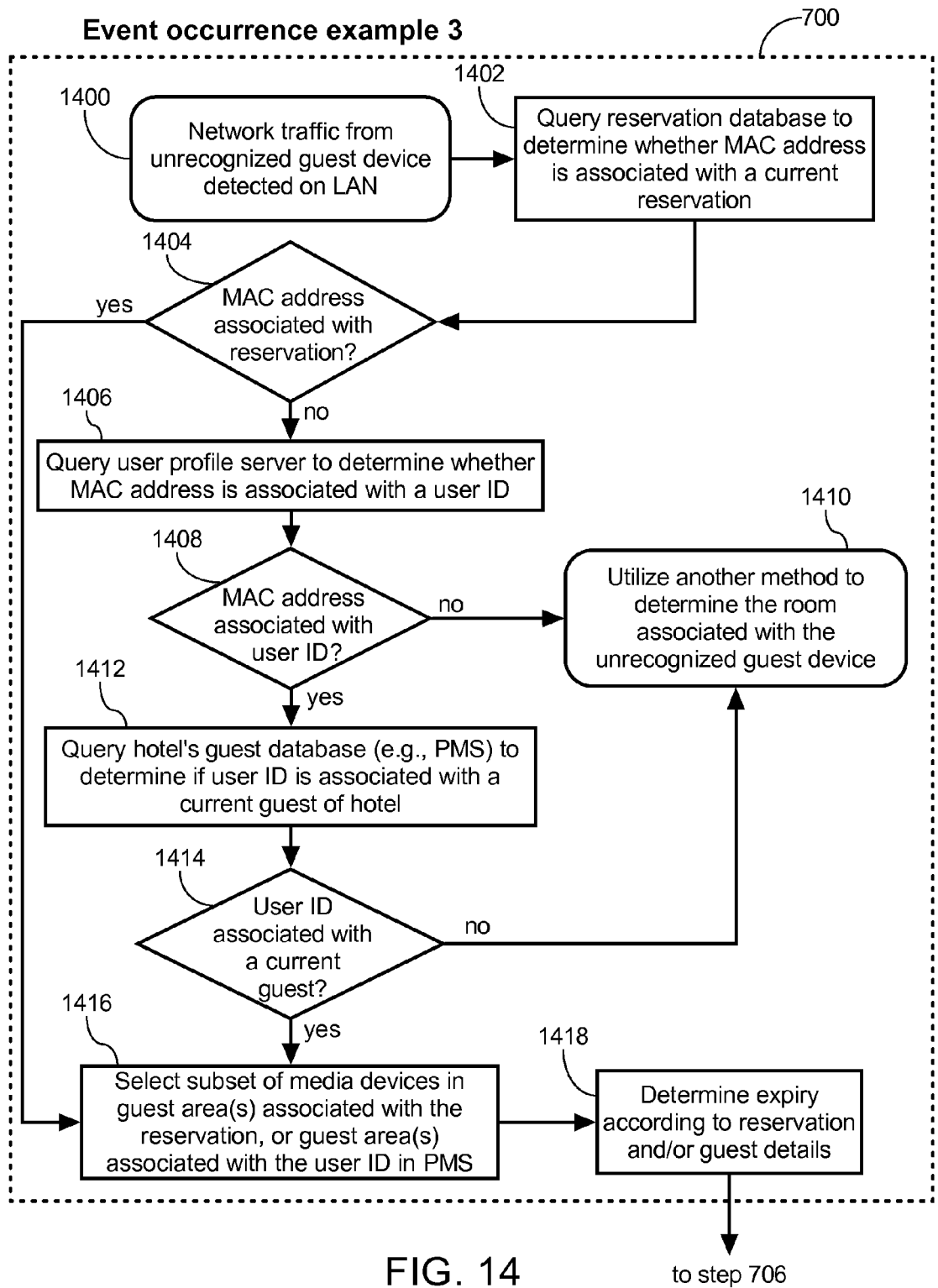
FIG. 14 illustrates a flowchart showing steps taken by a login portal when starting the process of FIG. 7 upon detecting network traffic from an unrecognized guest device on the hotel local area network (LAN).

FIG. 14 illustrates a flowchart showing steps taken by the login portal 214 when starting the process of FIG. 7 upon detecting network traffic from an unrecognized guest device on the hotel LAN 112. The steps of the flowchart in FIG. 14 are not restricted to the exact order shown, and, in other embodiments, shown steps may be omitted or other intermediate steps added. In this embodiment, the processors 204 execute the login portal 214 and the reservation manager 216 in order to cause the system controller 102 to perform the illustrated steps.

At step 1400, the process begins by receiving network traffic from an unrecognized guest device. The unrecognized guest device from which the network traffic is received at this step is considered unrecognized because it has not already been authorized for in-room sharing or communication with one or more in-room media devices. In a preferred embodiment, the network traffic includes DHCP requests that are broadcast by new guest devices as they are first coupled to the hotel LAN 112, for example, DHCP discover/offer/request/ acknowledgement etc.

At step 1402, the reservation manger 216 queries the reservation table 242 to determine whether the MAC address of the unrecognized guest device included in the received network traffic corresponds to a registered device for which the stream enable setting 834 has been selected in a current reservation at the hotel. The field "CHADDR" (Client Hardware Address) in the DHCP message indicates the MAC address of the newly connected guest device. A current reservation is one that has reached its start time 1206 but not yet reached its end time 1208.

At step 1404, when the MAC address does correspond to a registered device for which stream enable 1234 has been selected in a current reservation at the hotel, the reservation details are retrieved and control proceeds to step 1416; otherwise, control proceeds to step 1406.

At step 1406, the login portal 214 queries a user profile server 170 to determine whether the user profile database 172 stored therein includes a user identifier (ID) that is associated with the MAC address of the unrecognized guest device. As shown in FIG. 1, the user profile database 172 in this embodiment is remote to the hotel and stored at a central user profile server 170. Therefore, this step may be performed by the processors 204 sending and receiving network packets to/from the user profile server 170 via the network interface 200 and the Internet 104.

FIG. 15 illustrates a user interface (UI) screen 1500 provided by the user profile server 170 allowing a specific user to modify their information in the user profile database 172. Each user may have any number of guest devices associated with their user profile account. Device names are listed in column 1502 with each user device's corresponding device identifier (e.g., MAC address) shown in column 1504. These fields are editable by the user, and the user may add new user devices or remove user devices to their user profile at any time.

The UI screen 1500 further allows each user to modify the user identifiers associated with their account. As shown in FIG. 15, the user identifiers associated with the account in this example are all the various loyalty program membership numbers utilized by the user at different hospitality establishments. Each hospitality establishment is listed in column 1510 with the user's corresponding loyalty program member identifier and user type listed in columns 1512 and 1514, respectively. In some embodiments, the user may be able to freely adjust the loyalty numbers in column 1512, but may need to perform an upgrade process by clicking an "upgrade" button 1520 in order to upgrade to higher user type at a particular hospitality establishment in column 1514. The upgrade process may involve a monetary payment.

The user profile database 172 associates each of a plurality of different user identifiers (IDs) in column 1512 with one or more device identifiers (e.g., MAC addresses in this embodiment) in column 1504. A collection of different user IDs may be associated with multiple MAC addresses such as when a single user has various loyalty program member identifiers at different hospitality establishments and owns multiple guest devices. For example, the exemplary user in FIG. 15 belongs to five different hospitality loyalty programs and has three MAC addresses corresponding to three different guest devices (i.e., laptop computer, mobile phone, and tablet computer). Additionally, a single MAC address may be associated with multiple user IDs, for example, the MAC address of the laptop computer may also be associated with other user profile accounts such as when multiple users share a corporate loaner laptop provided as needed to different employees for travel.

In some embodiments, each hospitality establishment has a unique site identifier (column 1510 of FIG. 15) and this site identifier may be utilized by the login portal 214 at that hospitality establishment when querying the user profile database 172 in order to obtain the loyalty program member identifier associated with the MAC address at the specific hospitality establishment where the MAC address was detected.

For example, when the user is staying at the "Galactic Hotel (4)", the MAC address of the user's laptop ("20-B0-D0-86-BB-F9") is determined to be associated with user identifier "122-32-2345". Alternatively, when the user is staying at the "Beaches Resort (135)", the same MAC address of the user's laptop ("20-B0-D0-86-BB-F9") is determined to be associated with a different user identifier "5E3DA7". The user may thereby travel to different hospitality establishments having different types of the loyalty program member identifiers, and the user's various guest devices can still be correlated to the user's respective user identifier as employed at each of the different hospitality establishments.

At step 1408, when the received MAC address is not associated with any user identifiers (IDs) in the user profile database 172, control proceeds to step 1410. Otherwise, when the received MAC address is associated with one or more user identifiers (IDs) in the user profile database 172, the particular user identifiers (IDs) are retrieved from the user profile database and control proceeds to step 1412.

At step 1410, because the MAC address is not registered in a current reservation and/or is not correlated to a current guest of the hotel, the login portal 214 utilizes another method of identifying a guest area associated with the unrecognized guest device such as automatic room detection by tracing network traffic or having the guest input their room number during a sign-up procedure at the login portal 214, for example. The guest may also be required to input their name and/or a loyalty program, which identifies the guest and allows the associated guest room to be determined.

At step 1412, the login portal 214 queries the guest access table 240 (e.g., PMS database) to determine whether a current guest of the hospitality establishment is associated with any of the particular user identifiers (IDs) found associated with the detected MAC address.

In a preferred embodiment, the user identifiers (IDs) stored in column 1512 of FIG. 15 and the guest identifiers in column 1008 of FIG. 10 are loyalty program member identifiers utilized by the user. A unique user ID is assigned to each guest participating in the hotel's loyalty program such by issuing the guest with a membership card having the user identifier printed thereon. When a guest makes a reservation or when checking into the hotel, the guest provides the hotel with the user's personal user identifier (e.g., loyalty program member identifier), which is thereafter stored in column 1008 of the guest access table 240 as the guest identifier currently associated with the assigned room. Discounts, points and/or other benefits may be offered to loyalty program members to encourage guests to register their loyalty numbers upon reservation and/or check-in at the hotel.

At step 1414, when a current guest of the hotel is associated with one of the particular user identifiers, control proceeds to step 1416 to continue the process. Otherwise, when no current guest of the hotel is associated with any of the particular user identifiers determined at step 1406, the users associated with these user identifiers (IDs) are not current guests of the hotel. Therefore, control returns to step 1410 to attempt to utilize another method of identifying a guest area associated with the unrecognized guest device.

At step 1416, the unrecognized guest device is automatically determined to be associated with the guest area found registered to the guest of the hotel at step 1414. Assuming the guest is the exemplary user of FIG. 11 and the hotel is the "Galactic Hotel (4)", the MAC address "20-B0-D0-86-BB-F9" of an unrecognized laptop will be found associated with guest identifier "122-32-2345" in the user profile database 172. Therefore, the login portal 214 determines the unrecognized laptop computer to be associated with guest room "117" because this is the guest area associated with guest identifier "122-32-2345" in the guest access table 240 (see column 1008 in FIG. 10). The selected subset of the hotel's media devices for which the guest device is to be enabled to share media are all the in-room media devices associated with determined room number.

Event Occurrence Example 4

A Location-Specific Passkey is Received from a Guest Device

Figure 16:
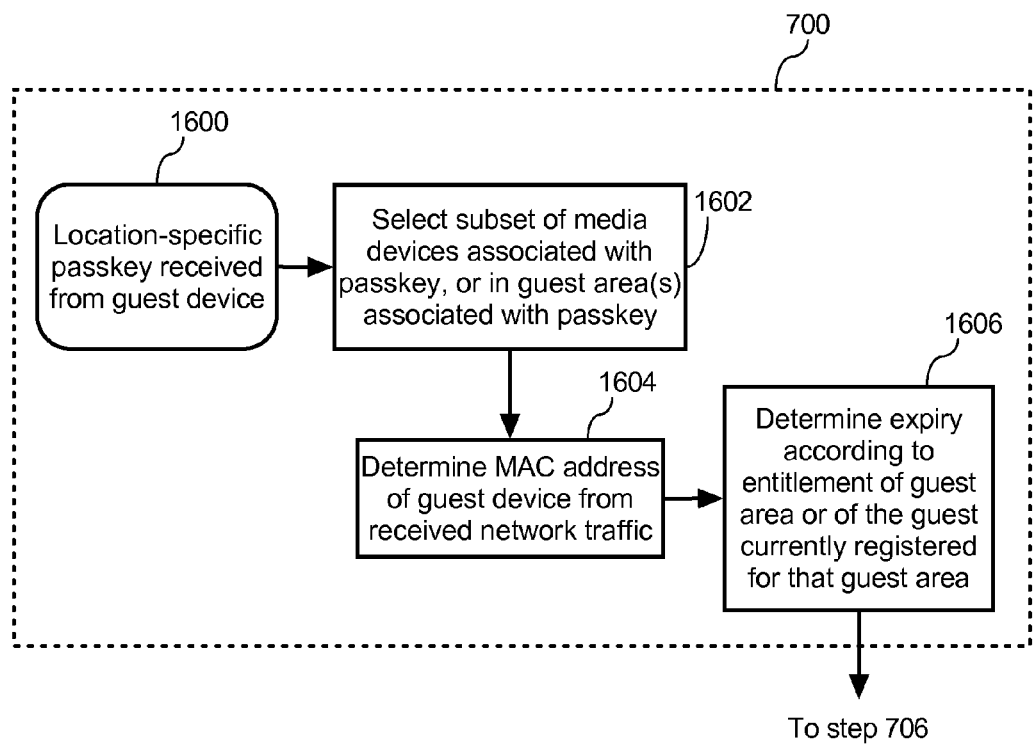
FIG. 16 illustrates a flowchart showing steps taken by a login portal when starting the process of FIG. 7 upon receiving a location-specific passkey from a guest device on the hotel local area network (LAN).

FIG. 16 illustrates a flowchart showing steps taken by the login portal 214 when starting the process of FIG. 7 upon receiving a location-specific passkey from a guest device on the hotel LAN 112. The steps of the flowchart in FIG. 16 are not restricted to the exact order shown, and, in other embodiments, shown steps may be omitted or other intermediate steps added. In this embodiment, the processors 204 execute the login portal 214 in order to cause the system controller 102 to perform the illustrated steps.

At step 1600, the process to activate the communication feature for a guest device begins when a passkey is received from a guest device over the computer network 112.

Figure 17:
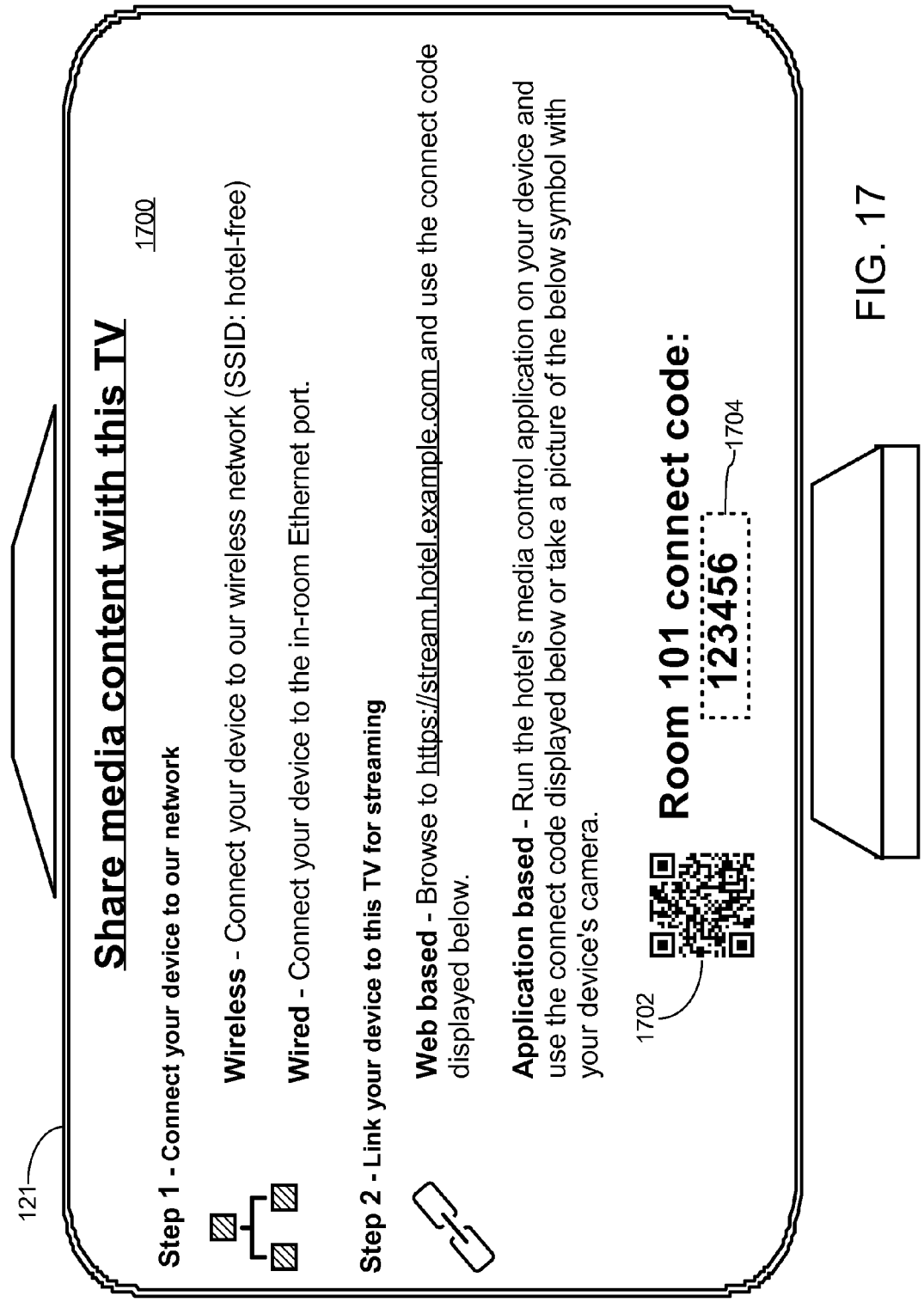
FIG. 17 shows an example of a user interface (UI) screen generated by the media device controller of FIG. 2 and displayed on a TV in a guest room to provide the guest staying in the room with the location-specific passkey.

FIG. 17 shows an example of a UI screen 1700 generated by the media device controller 222 and displayed on the first in-room TV 121 in guest room 101. The same or similar UI screen 1700 may also be displayed by the other media devices 122, 123 of the first guest room 101. UI screen 1700 provides a unique passkey (displayed as connect code 1704 in FIG. 17) for the user to send back to the login portal 214 in order to associate their personal guest device 118 with room 101. The unique passkey may also be displayed in a scannable format 1702 such as a QR Code® (QR Code is registered trademark of DENSO WAVE INCORPORATED), which is easily scanned by a web cam or other scanning mechanism provided on the guest's device 118. This saves the user from having to type in the connect code 1704 before their guest device sends it to the login portal 214.

FIG. 18 shows an example of the passkey-to-room table 238. This table 238 is utilized by the login portal 214 and the media device controller 222 to associate guest devices 118, 120 with particular guest areas (e.g., guest room 101, 105) and/or particular media devices 121, 122, 123, 124 without requiring the hotel to have advance knowledge of the user or the guest device 118, 120.

The passkeys in column 1800 are linked to currently registered rooms in column 1802. Upon arrival in the room, the user may select a "Share media with this TV" menu option using the TV remote control. This will cause the TV to display UI screen 1700 (see FIG. 17), and the unique passkey stored in column 1802 for the room is displayed (e.g., by TV 121) as the scannable connect code 1702 and the numerical connect code 1704 for that room. The room's unique passkey stored in column 1800 may be randomly changed by the media device controller 222 in response to the room check-out time being reached or other events such as expiry of user access. In this way, each new guest in the room 101 will see different connect codes 1702, 1704 displayed on UI screen 1700.

Figure 19:
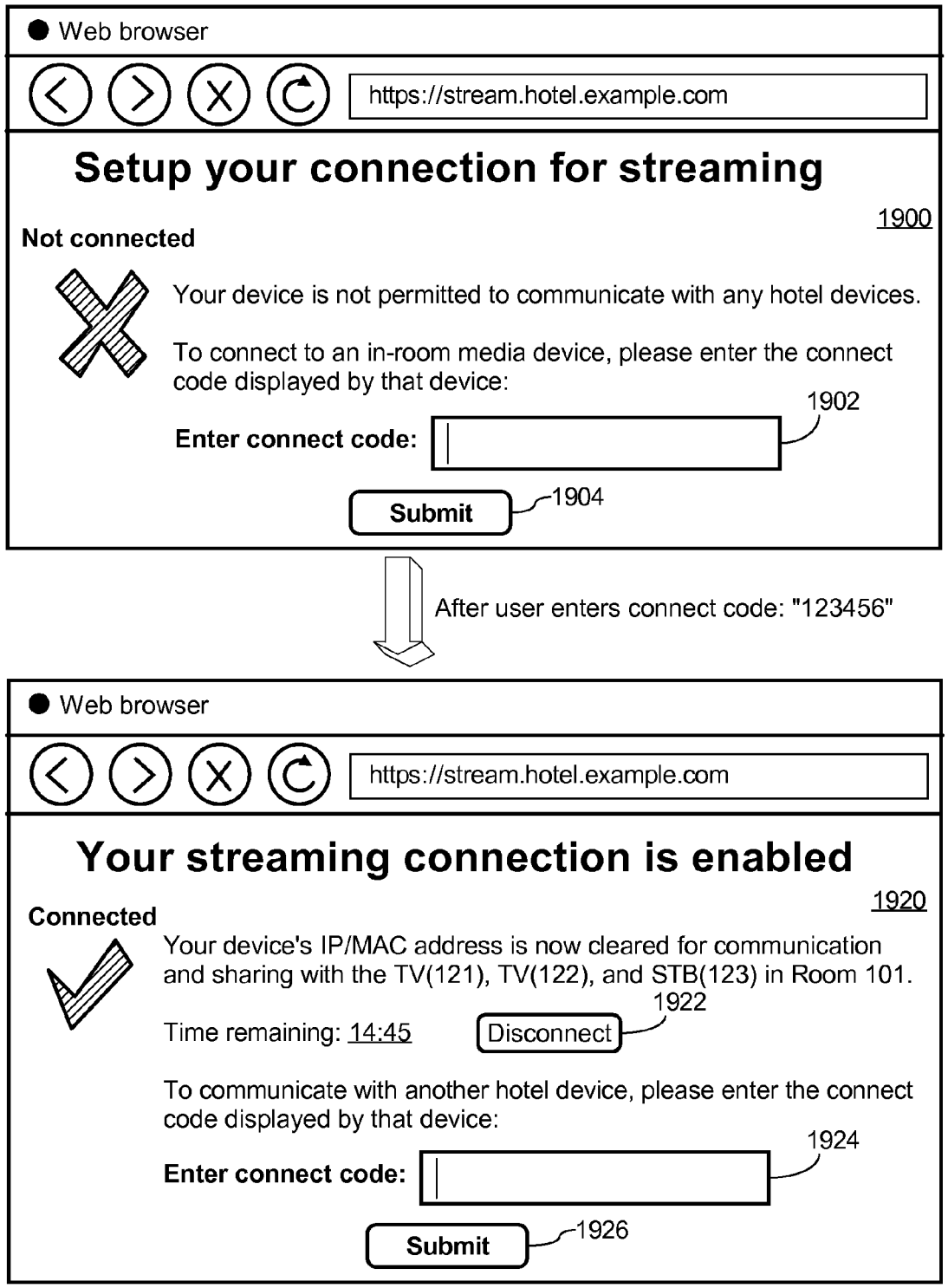
FIG. 19 shows examples of user interface (UI) screens generated by a login portal and displayed in a web browser or predetermined application of a guest device to allow the user of the guest device to enable in-room media content streaming according to a location-specific passkey.

FIG. 19 shows two examples of UI screens 1900, 1920 generated by the login portal 214 and displayed in a web browser or predetermined application of guest device 118 to allow the user of guest device 118 to enable in-room media content streaming according to an exemplary embodiment.

Before media sharing is activated for the guest device, a guest in room 101 reads the instructions displayed by UI screen 1700 (FIG. 17) on the in-room TV 121. The guest then utilizes their guest device 118 to connect to the hotel's login portal 214. For example, the guest may wirelessly associate their guest device 118 to AP 130 and then be automatically redirected or forwarded to the URL/IP address of the login portal 214 using any suitable redirection technique. Alternatively, the user may manually navigate to a specified URL (e.g., "https//stream.hotel.example.com") or IP address, or open a predetermined application on guest device 118 that connects to the login portal 214 at the hotel automatically.

Once connected to the login portal 214, the web browser or other predetermined application running on guest device 118 displays UI screen 1900 (top screen of FIG. 19), and the user types the connect code 1704 displayed by TV 121 into field 1902 (or scans connect code 1702 using a web cam or other scanner on guest device 118). Once the connect code is entered, the user presses the submit button 1904.

The entered passkey is then sent to the login portal 214 via the hotel's LAN 112, and the process of FIG. 16 begins at step 1600.

At step 1602, the login portal 214 determines the room number or other guest area of the hotel that is associated with the received passkey. This is done by the login portal 214 searching passkey-to-room table 238 to find the room or rooms of the hotel in column 1802 that are associated with the received passkey. The selected subset of the hotel's media devices for which the guest device is to be enabled to share media are all the in-room media devices associated with determined room number.

In other embodiments, the received passkey is a media-device-specific passkey that is displayed by the media device controller 222 on a display device associated with a particular media device. A table similar to that shown in FIG. 18 is stored to associate unique passkeys to each media device. A guest can thereby walk up to any particular media device at a hospitality establishment, use their guest device to send the passkey displayed by the media device to the login portal 214, and thereby have the communication feature and/or media sharing feature activated between their guest device and the media device so that they can stream content to or perform other network-based functions with the media device. In these embodiments, the selected subset of the hotel's media devices for which the guest device is to be enabled to share media is the media device(s) that is (are) associated with the received passkey.

At step 1604, the login portal 214 determines the MAC or IP address of the guest device by examining the headers of the network traffic received from the guest device.

At step 1606, the login portal 214 determines the expiry time for the communication feature for the guest device. In some embodiments, the expiry time may be determined according to the room type associated with the received passkey. For example, a presidential suite may be receive a longer period of time before expiry than a basic room. In other embodiments, a payment may also be received or added to the guest's or room's folio as a part of the process performed by the user at the login portal 214. The expiry time may also correspond to the end time 1208 of the room's reservation 1200.

After the media sharing feature has been enabled by the login portal 214 in response to receiving exemplary connect code "123456" from guest device 118, the user sees UI screen 1920 (bottom screen of FIG. 19). UI screen 1920 indicates to the user that their personal guest device 118 is now cleared for communication with all of the in-room media devices 121, 122, 123 associated with room 101. The time remaining indicates when the expiry manager will deactivate the sharing ability. If the user presses the disconnect button 1922, the login portal 214 will delete the inter-VLAN rule set 418 immediately and also delete any corresponding proxy rules 234. The disconnect button 1922 may be useful when the user is charged per unit time for streaming to allow the user to stop the charges accumulating when streaming is no longer needed.

In this example, because only the registered guest of room 101 (or their friends etc.) can enter room 101 to see the displayed connect code 1702, 1704, upon receipt of the passkey for room 101 from a guest device 118, the login portal 214 knows guest device 118 is being utilized by an authorized guest of room 101.

However, physical security of guest areas is not a requirement and in other embodiments one or more media devices such as TVs may be located in a public guest area of the hotel such as the lobby or a shopping area. The media device controller 222 associates a unique passkey with each public TV and causes the unique passkey to be displayed on its respective TV as a connect code. Any user may thereafter have their personal guest device cleared for communication with that TV by using their personal guest device to send the displayed connect code back to the login portal 214. This may be useful to allow current and former guests waiting in the hotel lobby to stream personal content on a larger screen available for guest usage in the lobby, for example. A similar benefit is also available in other public locations such as waiting areas in airports, bus terminals, shopping centers, etc.

In yet other embodiments, the passkey displayed to the user on the media device further specifies the hospitality establishment in addition to a particular guest area (or media devices) at that hospitality establishment. For example, FIG. 21 shows an example of a central-passkey-to-location table utilized to associate guest devices with particular guest areas and/or particular media devices at one of a plurality of different hospitality establishments according to an exemplary embodiment. This embodiment is beneficial to allow the six hexadecimal digit passkey entered by the guest on their guest device 118, 120 to be sent back to a central login portal 180 via the Internet 104. The guest device 118, 120 is therefore not required to be connected to the hotel LAN 112 and may instead connect to the Internet via another network such as a wireless 3G/4G cell phone provider network (not shown) offered by a telecom provider within range of the hospitality establishment. Because the central login portal 180 is accessible with a public IP address on the Internet 104, a guest device can therefore access the central login portal 180 via any network connected to the Internet 104.

A method of correlating a guest device to a destination according to an exemplary embodiment includes generating a passkey that uniquely identifies both a particular hospitality establishment selected from a plurality of different hospitality establishments and a location or media device within the particular hospitality establishment. The passkey generation may be performed at either the central login portal 180, the local login portal 214, or a combination of both. The method further includes displaying the passkey to a guest utilizing a media device at the particular hospitality establishment, and then receiving the passkey from a guest device at a central location via the Internet. For instance, the passkey can be displayed on an in-room TV similar to that illustrated in FIG. 17 and then received from the guest's devices after manual input by the user or after taking a picture of the code by the guest device. The method further includes determining the particular hospitality establishment according to the passkey received from the guest device (e.g., by matching the first two digits specifying the hotel location in a table such as illustrated in FIG. 21) and associating the guest device with a particular one or more media devices at the particular hospitality establishment according to the passkey (e.g., by matching the remaining four digits specifying the hotel room in a table such as illustrated in FIG. 21).

When utilizing the central login portal 180 of FIG. 21, the flowchart of FIG. 16 can be modified as follows: at step 1602, the central login portal 180 receives a six digit passkey from a guest device over the Internet 104 and determines the hospitality establishment associated with the guest device by looking for a match of the first two digits of the received passkey in the hotel locator column of FIG. 21. Once the hospitality establishment is identified using the first two digits, the central login portal 180 sends details of the guest device 118, 120 to the system controller 102 (i.e. the local login portal 214 running within the system controller 102) at the proper hospitality establishment via the Internet 104. The room number or other guest area of the hotel that is associated with the received passkey is then identified by the local login portal 214 matching the remaining four digits of the received passkey in a similar manner to as described above for FIG. 18. At step 1604, details of the guest device such as its IP address or other guest identifier may be specified in a message to the local login portal 214 from the central login portal 180. As a result, the guest device is correlated to a particular guest area such as a hotel room or a particular media device such as a lobby TV at a specific hospitality establishment.

The guest device may thereafter send commands to the central login portal 180 to control the associated media devices, retrieve status information from the associated media devices, and/or share media content with the associated media devices at that specific hospitality establishment. The central login portal 180 may act as a proxy and pass network traffic between the guest device and the system controller 102 at the specific hospitality establishment, or may simply inform the guest device of the public IP address of the system controller 102 at the specific hospitality establishment in order to hand-off communications and enable the guest device and the system controller 102 to directly communicate with each other.

Returning again to the description of FIG. 1, in some embodiments, the gateway 210 will only pass or take action (e.g., reply to) a multicast/broadcast message from an authorized guest device that has already been authorized to communicate with at least one in-room media device at the hotel.

In an exemplary embodiment, the gateway rules 232 allow both unicast and broadcast/multicast traffic to be transmitted between guest device 118 and the media devices 121, 122, 123. For example, taking rule set 418 in FIG. 4 as an example, when the source IP address is "192.168.0.23", broadcast/multicast traffic from this IP address is forwarded by the gateway 210 to the switch ports that are connected to the any of the destination IP address of the in-room media devices 121, 122, 123 in column 408 for rule set 418, i.e., switch ports connected to "10.0.0.140", "10.0.0.141", and "10.0.0.142". Broadcast traffic in the other direction from these media device IP addresses will also be passed to the switch port and/or AP to which guest device 118 is connected (i.e., the ports of switch 132 connected to IP address "192.168.0.23" and/or the AP 130 to which guest device 118 is wirelessly connected).

In some embodiments, the system controller 102 dynamically configures the gateway/firewall 110 to activate and deactivate port isolation to allow broadcast traffic to pass in the desired manner according to the gateway rules 232. Modification of access control lists (ACLs) may be utilized for this purpose. In other embodiments, the system controller 110 receives all broadcast traffic on the hotel LAN and then forwards it or rebroadcast it to specific destinations according to the gateway rules 232 and/or another list of inter-VLAN connections. In some embodiments, the decrypt/convert/re-encrypt module 504 converts broadcast traffic received from a guest or media device into broadcast or unicast traffic to be delivered to other destinations such as that are designated as supporting different protocols in the in-room device table 236.

In some embodiments, the media proxy 212 pretends to be a media device 121, 122, 123, 124 when communicating with a guest device 118, 120 and likewise pretends to be a guest device 118, 120 when communicating with an in-room media device 121, 122, 123, 124. This may be done by the media proxy 316 spoofing the address (IP, MAC, URL, etc.) of the device that it is pretending to be. Alternatively, the media proxy 316 may utilize a different network address but will reply on behalf of the device it is pretending to be. The decrypt/convert/encrypt module 504 converts the received network traffic into the appropriate format, makes any necessary source/target address modifications, and then transmits the converted network traffic to the appropriate destination device. By the media proxy 212 operating as an intermediary, a guest device 118, 120 and its authorized media devices 121, 122, 123 124 are enabled to share media content with each other over the hotel's computer network (e.g., LAN 112).

Taking an example where guest device 120 is an AirPlay®-compatible device, the media proxy 212 may act as an AirPlay® streaming destination so that guest device 120 detects a compatible AirPlay® streaming destination at the hotel and allows guest device 120 to begin streaming content utilizing the AirPlay® protocol to the media proxy 212. The media proxy 212 then buffers that streamed content and simultaneously begins to stream the buffered content to TV 124 in room 105 utilizing the AllShare® protocol. In this way, the media proxy 212 acts as an AllShare®-compatible streaming device to TV 124. Guest device 120 is thus enabled to stream content to TV 124 in room 105 even though guest device 120 utilizes a different streaming protocol than the room's TV 124. A similar conversion technique may also be applied by the media proxy 212 to convert between other incompatible protocols.

Figure 20:
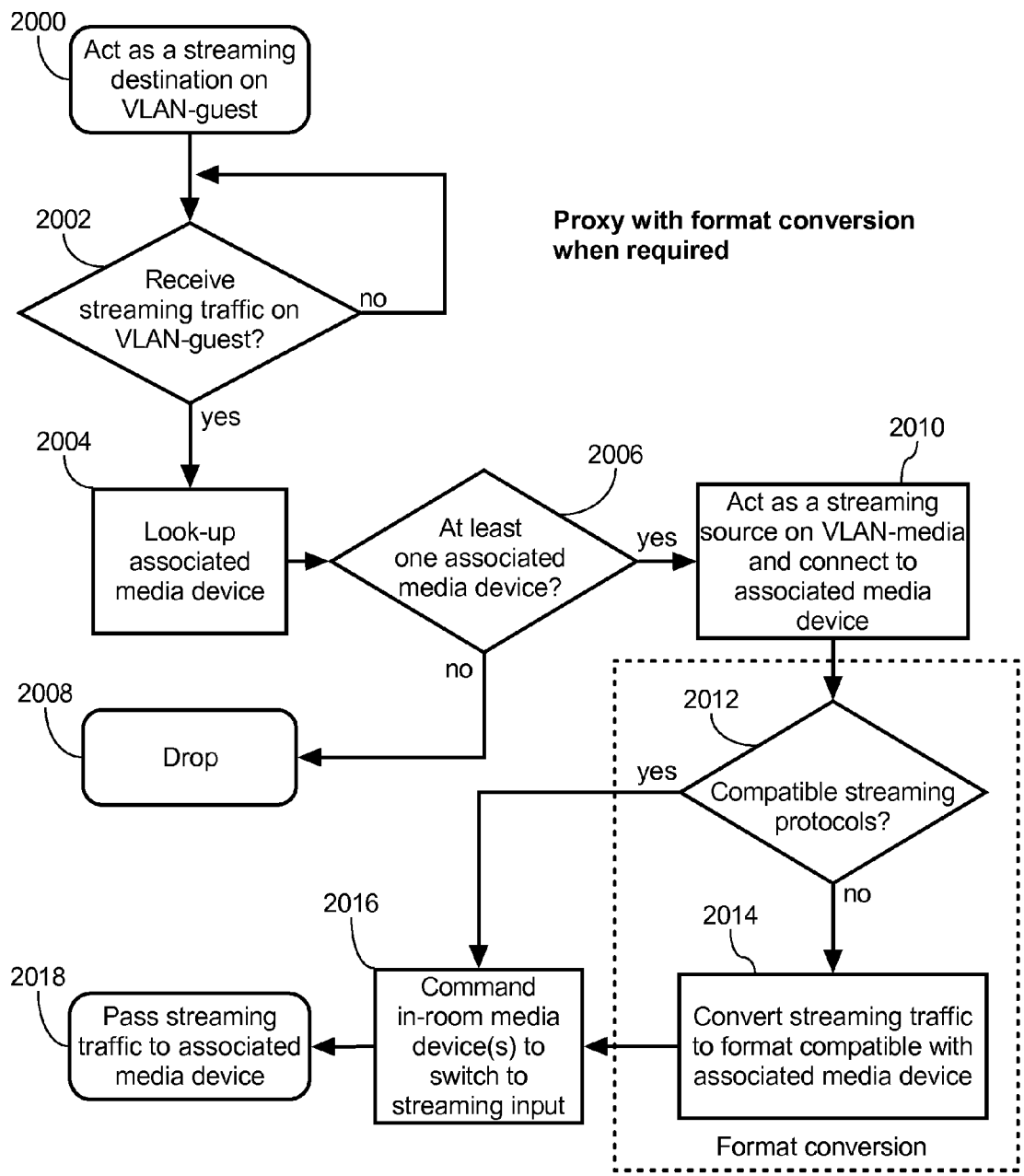
FIG. 20 illustrates a flowchart describing actions performed by the media proxy of FIG. 1 to dynamically enable a guest device supporting a network-based media sharing protocol to share media content over a computer network with a subset of the media devices connected to the computer network according to an exemplary embodiment.

FIG. 20 illustrates a flowchart describing actions performed by the media proxy 212 to dynamically enable a guest device supporting a network-based media sharing protocol to share media content over a computer network with a subset of the media devices connected to the computer network according to an exemplary embodiment. The steps of the flowchart in FIG. 20 are not restricted to the exact order shown, and, in other embodiments, shown steps may be omitted or other intermediate steps added.

At step 2000, the media proxy 212 acts as a streaming destination on VLAN-guest 114 and announces its availability to guest devices 118, 120.

At step 2002, the media proxy 212 receives streaming traffic on VLAN-guest from a particular guest device 118, 120. In one embodiment, all guest devices 118, 120 at the hotel may discover and share media content with the media proxy 212. In an alternate embodiment, only authorized guest devices 118, 120 which have logged in or otherwise been processed under step 700 according to a trigger event occurrence to activate in-room media sharing may share media content with media proxy 212. The media proxy 212 may require a password from a guest device (e.g., a passkey currently associated with a room in column 1800 of FIG. 18) before accepting a connection with the guest device.

At step 2004, the media proxy 212 looks up the in-room media device(s) associated with the guest device from which the stream is being received. This is done by querying the proxy rules 234 to find the in-room media device(s) in column 604 that are associated with the guest device's MAC address in column 600.

At step 2006, the media proxy 212 checks to see whether the incoming stream is being received from an authorized guest device 118, 120. Unauthorized guest devices will either not be listed in the proxy rules 234 at all (IP address of guest device not listed on any row in column 600) or will be listed but will have no associated in-room media devices listed in column 604. In these situations, the guest device is deemed to be unauthorized and control proceeds to step 2008; otherwise, when the guest device is listed and has at least one associated media device listed in column 604, control proceeds to step 2010.

At step 2008, the media proxy 212 drops the incoming stream such as by redirecting to a null interface. In this way, the media proxy 212 by default does not reroute the incoming stream to any of the hotel's in-room media devices 121, 122, 123, 124.

At step 2010, the media proxy 212 acts as a streaming source on VLAN-media 116 and connects to each of the associated media device(s) determined at step 2004.

At step 2012, the media proxy 212 compares the media sharing protocol of the incoming media stream from the guest device with the supported media sharing protocols of each associated media device found at step 2004. This is done by checking column 904 of the in-room media device table 236 for each associated media device. When an associated media device supports the same protocol, control proceeds to 2016 for that media device. Alternatively, when an associated media device does not support the same protocol, control proceeds to 2014 for that media device. When the guest device is associated with two or more media devices at step 2004, step 2012 may branch in multiple directions simultaneously, for example, to both convert the stream as required for some media devices (branch to step 2012) and to redirect the media stream for other media devices (branch to step 2014).

At step 2014, the media proxy 212 converts the incoming stream to a format supported by the associated media device. As previously described, this may be done by passing the stream to a decrypt/convert/re-encrypt module 504 to convert the stream into a format according to the requirements of the associated media device.

At step 2016, the media proxy 212 causes the in-room media device controller 222 to send commands to various in-room media devices as required to play the stream. For example, the in-room TV may need to have its input switched from High-Definition Multimedia Interface (HDMI) port 1 to HDMI port 2. This may be the case when the media proxy 212 is going to reroute the incoming media stream to an in-room AppleTV® device supporting the AirPlay®. The AppleTV® device is an in-room media device connected to the in-room TV using a particular HDMI port of the TV; therefore, in order to cause the TV to display the media (audio/video) outputted by the AppleTV®, the media device controller 222 causes the TV to switch to appropriate HDMI port.

At step 2018, the media proxy 212 passes the media stream to the associated media device. The media stream will have been converted (at step 2014) for associated media devices requiring different protocols. Alternatively, if conversion (at step 2014) was not required, the media proxy 212 redirects the incoming stream received at step 2002 to the associated media device.

In an exemplary embodiment, rather than converting between all possible network communication protocols, the media proxy 212 only converts between a limited number of streaming or other protocols that are desired by the hotel. A benefit of this embodiment is that the design of the media proxy 212 is simplified because it only needs to operate as an intermediary for certain network traffic, for example, only for traffic necessary to enable media content streaming in some embodiments. Likewise, instead of the gateway 210 allowing full communication between a guest device and a particular media device of the hotel, the gateway 210 may only allow certain types of communication such as required to stream media content. Other types of communication that are not necessary for streaming purposes may be actively prevented by the gateway 210 using any suitable packet filtering rules, for example. In another example, network traffic sent to other ports than the standard streaming ports may be blocked according to the application-specific streaming protocols that are supported at the hotel. This may be beneficial in some embodiments to prevent hacking attempts or other undesirable usage of the in-room media devices 121, 122, 123, 124 by malicious guests.

In some embodiments, the gateway 210 and media proxy 212 of FIG. 1 are integrated together such as on a single computer server operating as the system controller 102 positioned between the Internet 102 and the hotel LAN 112. The system controller 102 is set as the default gateway of the hospitality establishment's computer network 112. In other embodiments, the gateway 212 and/or the media proxy 212 are implemented in a computer server positioned elsewhere on the Internet 102 or the hotel LAN 112. For example, existing stand-alone gateways supporting dynamic rules may be utilized in an embodiment and the discovery helper 300 of FIG. 3 may be implemented external to the stand-alone gateway.

Although the above exemplary embodiments have primarily focused on the guest device sharing media to in-room media devices of the hotel, sharing in the other direction may also be supported where the guest's device functions as a streaming destination and an in-room media device functions as a streaming source. For example, the STB and/or TV in the guest's registered room may act as streaming devices to send media content to the guest device for playback.

A benefit of the gateway 210 allowing unicast communication between a guest device and an in-room media device is that other protocols may also take advantage of the communication feature being active in addition to or instead of streaming protocols. For example, remote control functionality, remote access functionality, display mirroring, video output, music playback, and presentation output may also take advantage of the guest device being able to communicate with the media devices over the hotel's LAN 112. Communication can be made possible between the guest device and the in-room media devices over the hotel's LAN 112 from any location within the hotel and it is not necessary that the guest device be physically connected to LAN 112 from the same location (e.g., guest room) at which the media devices are located. To alleviate problems with discovery protocols, the in-room media devices may be configured to display their unique IP (or MAC) address for users to manually configure their personal guest devices 118, 120 for unicast communication. For example, the user could select a "what is this device's IP address?" menu selection on an in-room media device.

In an exemplary embodiment, the in-room media devices of each room may be placed on a room-specific VLAN, subnet, or other network segment and then guest devices associated with that room may be added to the room-specific VLAN, subnet, or network segment. For example, before login, an unauthorized guest device may be given DHCP-provided IP address with a short expiry time (5 minutes). Once the guest device is logged in and associated with a particular room of the hotel, the DHCP server 220 automatically assigns the guest device a new IP address on the same VLAN and/or subnet of the guest's room with a longer expiry time (e.g., 24 hours for VIP access or 4 hours for regular access). In this way, certain content streaming and other protocols that only work when devices are on the same VLAN/subnet will continue to function as intended.

Figure 22:
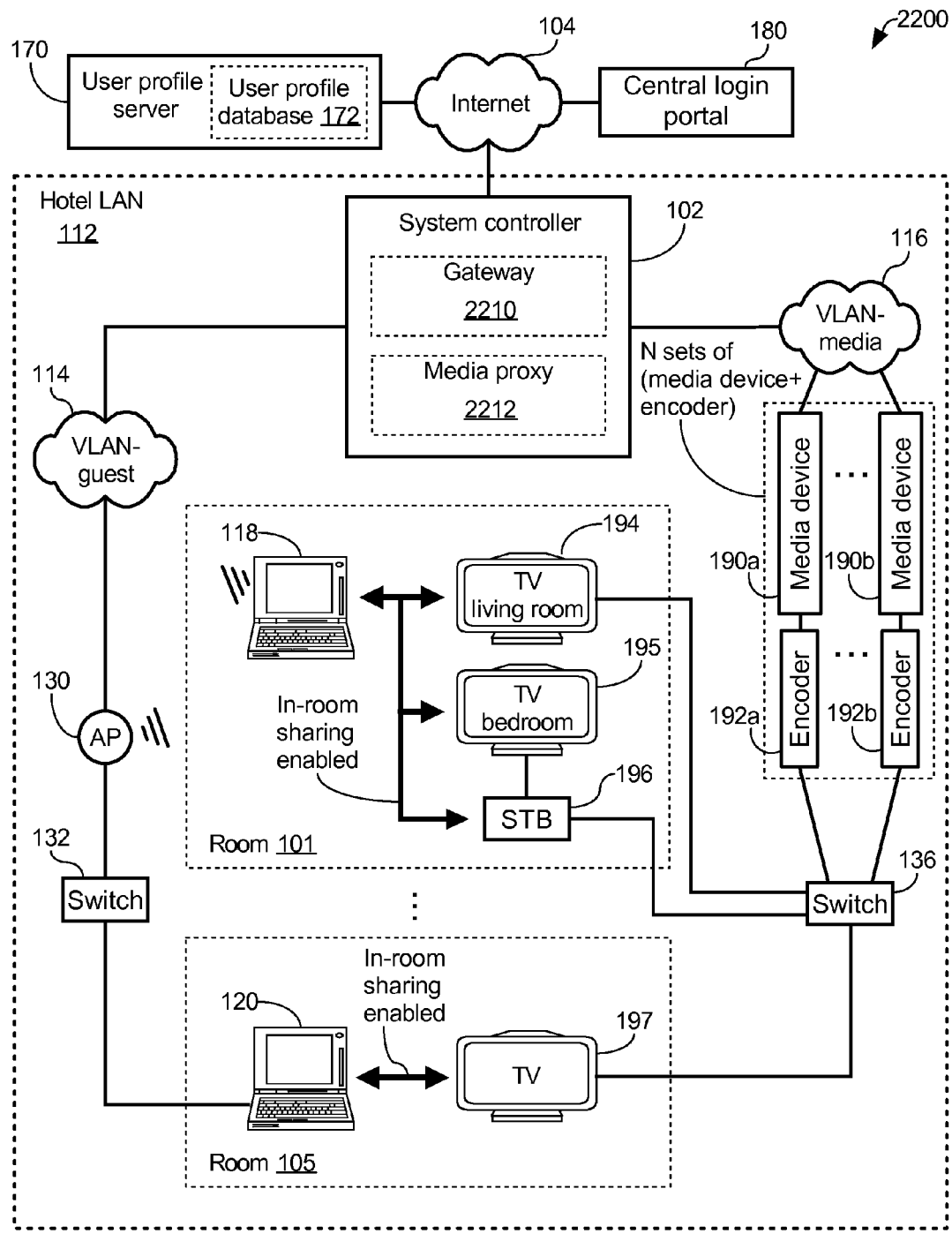
FIG. 22 shows a block diagram of a media system including a plurality of central media devices according to another exemplary embodiment of the invention.

FIG. 22 shows a block diagram of a media system 2200 including a plurality of central media devices 190 according to another exemplary embodiment of the invention. This embodiment is very similar to the previous embodiments described for FIG. 1 and many of the previously-described details of FIG. 1 are also applicable to FIG. 22 with only minor modification. One difference with FIG. 9 in comparison to FIG. 1 is that now one or more central media devices 190 supporting a network-based media sharing protocol is/are coupled to the hotel LAN 112 at a central location such as a server room. In this embodiment, a purpose of each of the central media devices 190 is to receive shared media content from guest devices 118, 120 over the hotel LAN 112 utilizing a supported network-based media sharing protocol (e.g., DLNA®, AllShare® and/or AirPlay®) and to provide a media signal corresponding to the shared media on an output port of the media device 190 such as a high-definition multimedia interface (HDMI) output port. Similar to the previous embodiments, the computer network by default prevents all of the guest devices 118, 120 from utilizing the network-based media sharing protocol to share media content with the central media devices 190.

The manufacturer's intended purpose of the output port of each media device 190 is typically to be coupled to a television or other display device such as in a residential application. However, as shown in FIG. 22, rather than coupling the output port (e.g. HDMI port) of each of the central media devices 190 directly to a single display device or STB, in this embodiment each of the media devices 190 has a corresponding encoder 192 coupled to its output port, and the encoders 192 are coupled to the hotel LAN 112. Each encoder 192 re-encodes the media signal outputted by its partner media device 190 for transmission to a selected one or more in-room output devices 194, 195, 196, 197, which are located throughout the various hotel rooms 101, 103. In this way, the various output devices 194, 195, 196, 197 located at different physical locations such as rooms 101 and 105 within a hotel are coupled to the output port of each the media devices 190 through the encoders 192 and LAN 112.

In some embodiments, each encoder 192 transmits its encoded signal on the LAN 112 to a unique multicast group destination IP address, and the system controller 102 dynamically commands certain in-room output devices 194, 195, 196 to join a multicast group and receive the encoded stream according to which room is associated with the guest device 118, 120 currently sharing media with an assigned media device 190. For example, with reference to FIG. 22, guest device 118 may share media content with an assigned central media device 190a, which has its output signal re-encoded by encoder 192a for transmission to a particular multicast destination IP address. The system controller 102 further commands the in-room media devices 194, 195, 196 in room 101 (associated with guest device 118) to receive the encoded media signal at the multicast destination IP address and play it back to the guest.

Depending on the specific encoders 192 utilized, there may also be one or more signal converters (not shown) placed between the output port of a media device 190 and its corresponding encoder 192 if the two devices 190, 192 do not support the same signal format. For example, some low-cost encoders 192 may not support HDCP (the copy protection of HDMI) and therefore an HDMI-to-component-video or HDMI-to-composite-video (i.e., digital to analog signal conversion) or another format converter may be provided intermediate to each media device 190 and its respective encoder 192, as required. In this way, the output signal can be passed from the media device 190 to the encoder 192. Furthermore, in other embodiments, rather than using encoders 192 and the hotel LAN 112 to couple the output ports of the media devices 190 to particular in-room output devices 194, 195, 196, 197, the various output ports of the central media devices may be selectively coupled to the in-room media devices 194, 195, 196, 197 under control of the system controller 102 in other manners. For example, a matrix of HDMI hardware switches or other cabling techniques may be implemented with automated switching under control of the system controller 102.

A use-case scenario of the system of FIG. 22 according to an exemplary embodiment is as follows: a guest of the hotel utilizes a guest device 118, 120 to login or otherwise authenticate with the system controller 102. This may be done by the guest sending back a passkey displayed by the system controller 102 on an in-room television 194, 195, 197 using the techniques shown above with respect to FIGS. 16-19 and 21. Other types of correlating the guest device 118, 120 with a particular hotel room 101, 103 may be employed as previously described. After the guest device 118, 120 is correlated with a particular hotel room, the guest attempts to share media content from their guest device 118, 120 using a network-based media sharing protocol such as DLNA®, AllShare® and/or AirPlay® etc. In response to detecting a media sharing attempt from a particular guest device 118, 120, the system controller 102 selects an available one of the central media devices 190 for assignment to the particular guest device 118, 120. The system controller 102 selects the assigned media device 190 to be one that is both: 1) compatible with the network-based media sharing protocol being utilized by the particular guest device 118, 120 and 2) available meaning it is not currently assigned to or being utilized by another guest device 118, 120. In order to assign the selected media device 190 to the particular guest device 118, 120 that is attempting to share media, the system controller 102 dynamically reconfigures various components on the hotel LAN 112 such as the gateway 2210 and/or the media proxy 2212 to allow the particular guest device 118, 120 to discover and share media content utilizing the network-based media sharing protocol with only the assigned media device 190. Further, to effect playback of the shared media in the guest's room 101, 103, the system controller 102 dynamically commands one or more of the in-room media output devices 194, 195, 196, 197 such as STBs and/or TVs in the hotel room associated with the particular guest device 118, 120 to join the multicast group and playback the encoded media content from the particular encoder 192 that is coupled to the media signal outputted by the assigned media device 190. In this way, the guest in the room 101, 103 can see the media that the guest device 118, 120 is currently sharing with its assigned central media device 190.

The first event occurrence that triggered the assignment of one of the central media devices 190 to a particular guest device 118, 120 in the above example was the system controller 102 receiving packets such as discovery messages indicating that the particular guest device 118, 120 is trying to share media content. A benefit of triggering the assignment upon an actual sharing request from a guest device is that this tends to maximize the availability of the central media devices 190. However, other types of first event occurrences could also be utilized in other embodiments such as the four exemplary event occurrences shown in FIGS. 11, 13, 14 and 16. For example, in some situations it may be desired to pre-assign one of the central media devices 190 to a particular VIP guest or after a payment of a reservation fee.

Likewise, at a later time in response to a second event occurrence, an assigned central media device 190 is automatically unassigned from a particular guest device 118, 120. Unassignment involves preventing the particular guest device 118, 120 from utilizing the network-based media sharing protocol to share media over the computer network 112 with the now-unassigned media device 190. For example, the components on the computer network such as the gateway 2210 and proxy 2212 may be reconfigured to remove the rules added during assignment. In this way, the unassigned media device 190 becomes available for assignment to another guest device 118, 120. Examples of second, later event occurrences to trigger the unassignment of a central media device 190 from a particular guest device 118, 120 include detecting that the guest device 118, 120 has finished sharing media content, determining that the guest device 118, 120 has exceeded a threshold amount of data transfer, detecting expiry of a time duration or other allotment of sharing for the guest device 118, 120, and/or receiving a message from a property management system (PMS) that the guest of the guest room 101, 105 associated with the particular guest device 118, 120 has checked out. Other second event occurrences may be utilized in other embodiments to meet application specific needs.

A benefit of the embodiment shown in FIG. 22 is that a hotel that already has in-room output devices 194, 195, 196, 197 such as standard TVs and STBs installed in all rooms 101, 103 can use these output devices 194, 195, 196, 197 to displayed shared media content even though the installed in-room devices 194, 195, 196, 197 do not themselves support a compatible media sharing protocol such as DLNA®, AllShare® and/or AirPlay®. Under this embodiment, it is not required for the hotel to replace the older-technology in-room output devices 194, 195, 196, 197 with newer, more expensive media devices that support the desired network-based media sharing protocol(s). The hotel only needs to install one or more centrally located media devices 190, which is/are dynamically assigned to authorized guest devices 118, 120 based on demand for media sharing. The output signal from an assigned media device 190 is automatically sent to the particular in-room output devices 194, 195, 196, 197 of the guest room associated with the guest device 118, 120 that is sharing the media.

In this embodiment, the number of centrally installed media devices 190 limits the number of guest devices 118, 120 that can concurrently share media content regardless of the number of rooms 102, 103 and in-room output devices 194, 105, 196, 197 at the hotel. Installing a sufficient number of pairs of central media devices 190 and encoders 192 is much cheaper than installing a new media device 190 such as an AppleTV® supporting a particular network-based media sharing protocol (e.g., AirPlay®) in each hotel room 101, 105. For example, ten centrally located AppleTVs® may be sufficient for a hotel having a few hundred guest rooms 101, 103 because there will typically never be more than ten guests attempting to simultaneously share media content using AirPlay®. Furthermore, by including different types of central media devices 190 such as a number of AppleTVs® and a number of Samsung® STBs, guest devices may utilize multiple types of network-based media sharing protocols such as both AirPlay® and AllShare® without requiring at least one device supporting each sharing protocol in each hotel room 101, 105. In the event that demand for a particular media sharing protocol exceeds the number of available central media devices 190 of that type, the system controller 102 automatically logs the insufficiency in a report or other message sent to the hotel administration. Hotel management may then consider increasing the number of central media devices 190 of the specified type to keep up with demand. A suitable error message may also be displayed to the guest via their guest device 118, 120 or via the in-room output devices 194, 195, 196, 197 in the guest's room 101, 105.

Figure 23:
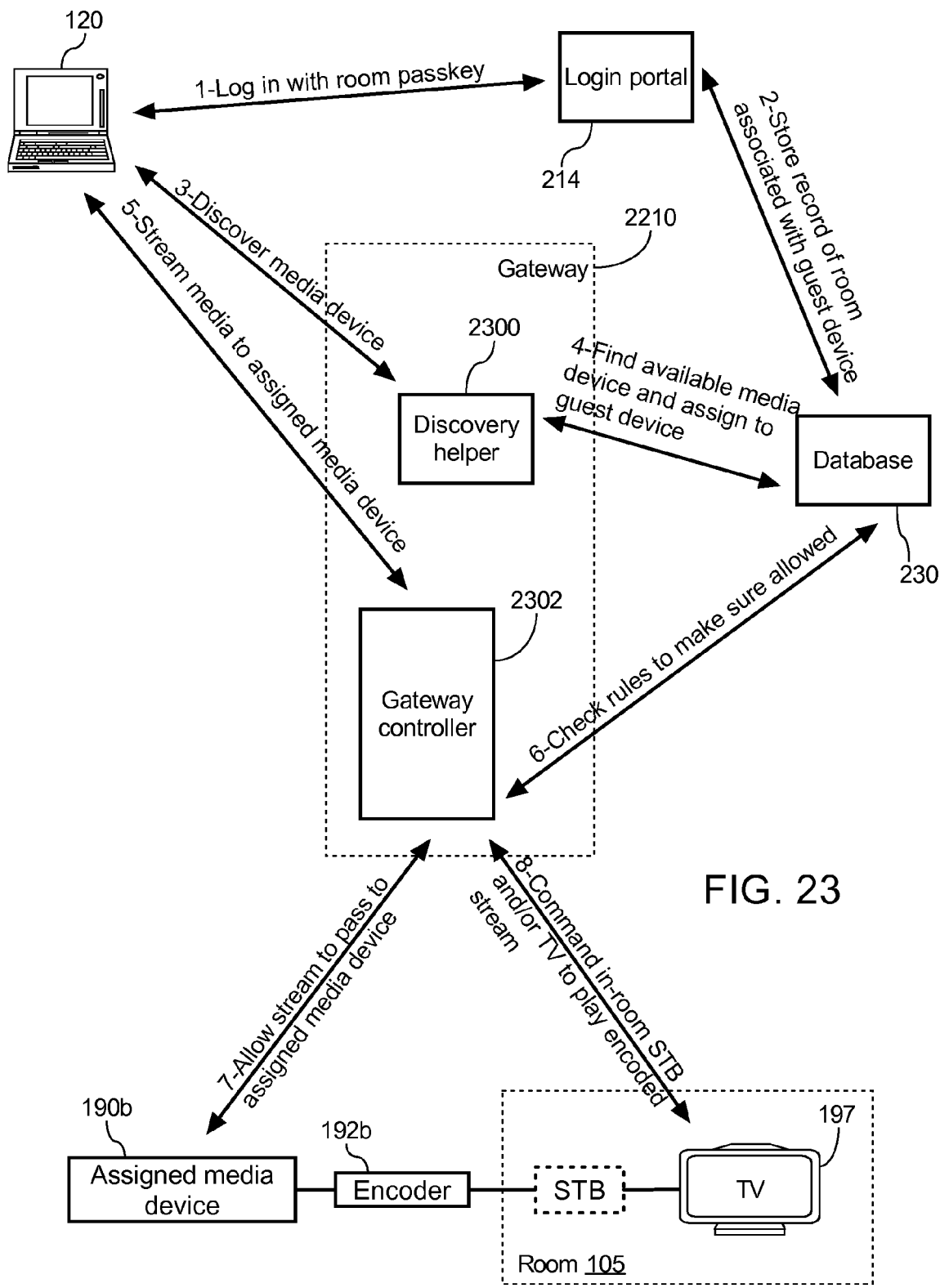
FIG. 23 illustrates how a guest device is enabled by the gateway of FIG. 22 to stream content to the in-room TV of a guest room according to an exemplary embodiment.

FIG. 23 illustrates how a guest device 120 is enabled by the gateway 2210 of FIG. 22 to stream content to the in-room TV 197 of a hotel guest room 105 according to an exemplary embodiment. In this embodiment, each of the central media devices 190 in FIG. 22 is a Samsung® STB supporting the network-based media sharing protocol of AllShare®, which is a Samsung® brand-specific implementation of DLNA®. In this embodiment, the in-room output devices 194, 195, 196, 197 (e.g. televisions and STBs, etc.) in FIG. 22 do not support the network-based media sharing protocol (i.e., AllShare®) supported by the central media devices 190. Of course, other types of media devices 190 and network-based media sharing protocols may be utilized in conjunction with the operations of the gateway 2210 in other embodiments.

In FIG. 23, the double arrow lines generally illustrate interactions between modules and devices of the system 2200 in FIG. 22. The interactions are not restricted to the exact order shown, and, in other embodiments, shown interactions may be omitted or other intermediate interactions added. The interactions in this embodiment include the following:

1. Guest device 120 triggers the activation of the in-room media sharing feature at the hotel by providing a unique room passkey (associated with only room 105) to the hotel's login portal 214 during a log in process. This passkey may have been provided to the guest by the media device controller 222 causing the in-room TV 197 to display to the guest the passkey as a "connect code" (see previously-described FIGS. 17 and 18).

2. The login portal 214 checks the passkey-to-room table 236 in the database 230 to determine which hotel room is associated with the received passkey, and stores a record mapping the guest device 120 to its associated guest room 105. In this example, the passkey received from the guest device 120 was displayed by the system controller 102 in room 105; therefore, the login portal 214 associates guest device 120 with room 105 in the database 230.

3. Guest device 120 initiates media sharing by sending a multicast discovery message looking for an available media device on LAN 112 that supports a particular network-based sharing protocol (e.g., AllShare® in this example). By using client isolation and port isolation techniques, the APs 130 and switches 132 on VLAN-guest ensure that only the system controller 102 receives the discovery message. Gateway 2210 also preferably blocks the discovery message from being passed to the central media devices 190 on VLAN-media 116. The purpose (in combination with the discover helper 2300, described next) is to avoid spamming all the central media devices 190 at the hotel with the multicast discovery query from guest device 120.

4. Discovery helper 2300 of gateway 2210 selects an available one of the central media devices 190 for assignment to the guest device 120. To select the available media device 190 for assignment, the discovery helper 2300 queries a media device table similar to table 236 in database 230 (see FIG. 9 and omit the room ID 900 column) to find which (if any) of the central media devices 190 also supports the same network-based sharing protocol as the guest device 120 is currently utilizing (e.g., AllShare® in this example). The discovery helper 2300 then determines which of these (if any) compatible media devices 190 is not currently assigned to another guest device 120 at the hotel. There may be another column (not shown) in FIG. 9 entitled "Assigned guest device" indicating the IP address or other identifier of the guest device (if any) to which each media device 190 is assigned. As a result, if guest device 120 is searching for an AllShare® compatible media device, discovery helper 2300 queries the media device table 236 to see which of the central media devices 190 supports AllShare® and is not currently assigned to another guest device. Assuming in FIG. 23 that central media device 190b is available and supports the desired protocol (i.e., AllShare®), the discovery helper 2300 selects this central media device 190b for assignment to guest device 120 and replies unicast to guest device 120 on behalf of the assigned media device 190b to provide guest device 120 with the IP address of the assigned media device 190b for future direct communications.

To allow the guest device 120 to communicate with its assigned central media device 190b, the discovery helper 2300 further reconfigures the gateway rules 232 so that gateway controller 2302 will pass network traffic packets from guest device 120 to the assigned media device 190b and vice versa. This may be done by the discovery helper 2300 clearing the MAC and/or IP address of guest device 120 for communication with the MAC and/or IP address of the assigned media device 190b so that guest device 120 is cleared for communication with only the assigned media device 190b on VLAN-media 116. In this way, the gateway 2210 will drop network traffic from guest device 120 to the central media devices 190 on VLAN-media 116 except for the assigned media device 190b. The rules needed to configure the gateway 2210 to filter network traffic in this manner are dynamically stored by the discovery helper 2300 in the gateway rules 232.

In this embodiment, the media device 190b selected by the discovery helper 2300 for assignment to the guest device 120 is one of the central media devices 190 that is not currently assigned to any other guest device 120 at the hotel. As a result, starting at the first event occurrence when the assignment occurs and ending at the second event occurrence when the un-assignment occurs, only the particular guest device 120 is enabled to utilize the network-based media sharing protocol to share media over the computer network with that particular central media device 190b. However, this is not strict requirement and a single media device 190 may also be assigned to multiple guest devices in other embodiments or situations such as when a single guest brings multiple devices to the hotel or when a single reservation for the room 101 is made for a plurality of people each with their own guest devices. In these situations, the central media device 190 would be able to communicate with multiple guest devices and it would therefore need to decide for itself which of its assigned guest devices was able to share media at any particular time. For example, AllShare® compatible media devices already have mechanisms in place to handle deciding between multiple guest devices sharing content.

5. Guest device 120 requests a connection with the IP address of its assigned media device 190b in order to begin streaming media content to media device 190b utilizing the network-based media sharing protocol (i.e., AllShare® in this example). Because the assigned media device 190b is on a different subnet and VLAN than guest device 120, all unicast traffic from guest device 120 to its assigned media device 190b is sent via gateway 2210.

6. The gateway controller 2302 of gateway 2210 receives the unicast network traffic from the source address of guest device 120 to the destination address of the assigned central media device 190b. The gateway controller 2302 checks the gateway rules 232 to determine whether traffic matching this combination of destination and source addresses is to be passed or dropped.

7. Because in this example guest device 120 and central media device 190b are authorized to communicate with each other according to the gateway rules 232, the gateway controller 2302 passes the unicast traffic received from guest device 120 for delivery on the subnet associated with VLAN-media 116. Replies from central media device 190b to guest device 120 are also passed from VLAN-media 116 to VLAN-guest 114 in a similar manner. Guest device 120 is now in direct bi-directional unicast communication with its assigned central media device 190b over hotel LAN 112 via gateway 2210, and any functions available by the network-based media streaming protocol (e.g., AllShare® in this example) supported by both guest device 120 and central media device 190b may be performed. For example, guest device 120 may share media content for playback by central media device 190b or may mirror its desktop output onto central media device 190b.

8. In order to allow the guest to see the shared media received and outputted by the central media device 190b assigned to the guest device 120, the gateway controller 2302 commands the in-room TV 197 in room 105 (and/or additionally any in-room STB or other in-room controller) to begin playing back the encoded stream as transmitted by the encoder 192b that is coupled to the output port of the assigned media device 190b. In this example, guest device 120 was associated with guest room 105 (see above-described interaction #2); therefore, the gateway controller 2302 commands the output device being TV 197 in guest room 105 to receive and playback the encoded media steam from encoder 192b, which is the encoder 192 coupled to the output port of the assigned media device 190b. Thus, in response to the guest device 120 starting to streaming media content, the encoder 192b encodes the media signal outputted by the media device 190a on the output port into an encoded media stream and transmits the encoded media stream on the computer network 112, and the system controller 102 dynamically commands an output device 197 located at the physical location (i.e., room 105) associated with the particular guest device 120 to play the encoded stream received from the encoder via the computer network. In this embodiment, the encoder 192b transmits the encoded media to a particular IP multicast group destination address and the in-room TV 197 is commanded at this step to join that particular multicast group and playback the media that is sent to the multicast destination IP address. The actual stream may be any media format supported by TV 197 such as RTSP using MPEG2 or MPEG4. As shown an intermediate STB may receive and decode the encoded stream for display on the TV 197. In an alternative embodiment, the system controller 102 may dynamically reconfigure the encoder to send the encoded stream to the destination IP address of the TV 197 such as via unicast transmissions on LAN 112.

Although not illustrated in FIG. 23, in response to a second, later event occurrence such as when guest device 120 finishes sharing media content with its assigned media device 190b, the system controller 102 un-assigns media device 190b from guest device 120 by reconfiguring the gateway rules 232. This action prevents the guest device 120 from utilizing the network-based media sharing protocol (e.g., AllShare® in this example) to share media over the computer network 112 with its previously assigned media device 190b. The system controller further commands the output device(s) such as TV 197 located within the guest room 105 associated with guest device 120 to stop playing the media corresponding to the media signal outputted by its previously assigned media device 190b. The media device 190b thereby becomes available for assignment to another guest device 118, 120 at the hotel when needed and only the output devices in that other guest's room will playback the shared media at that time.

In addition to when the guest device 120 finishes sharing media content, the assigned media device 190b may also be dynamically unassigned from the guest device 120 in response to other types of second event occurrences such as the guest associated with guest device 120 checks out of the hotel or upon expiry of a purchased time duration for media sharing privileges etc.

Figure 24:
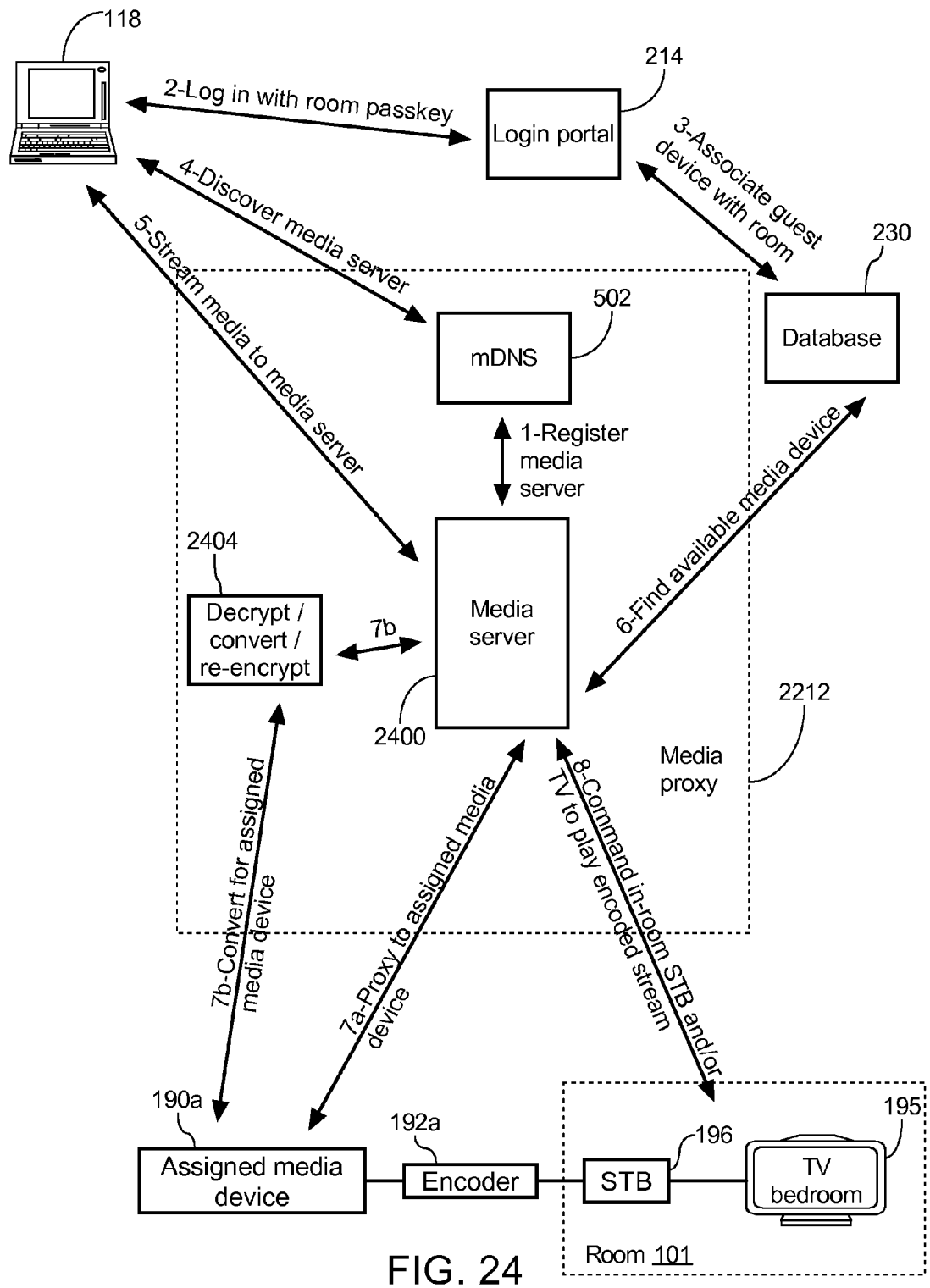
FIG. 24 illustrates how a guest device is enabled by the media proxy of FIG. 22 to stream content to the in-room TV of a guest room according to an exemplary embodiment.

FIG. 24 illustrates how a guest device 118 is enabled by the media proxy 2212 of FIG. 22 to stream content to the in-room STB 196 and TV 195 of guest room 101 according to an exemplary embodiment. In this embodiment, each of the central media devices 190 in FIG. 22 is an AppleTV® supporting the network-based media sharing protocol of AirPlay®, and the in-room output devices 194, 195, 196, 197 (e.g. televisions STBs, etc.) in FIG. 22 do not support the network-based media sharing protocol (i.e., AirPlay®) supported by the central media devices 190. Of course, other types of media devices 190 and network-based media sharing protocols may be utilized in conjunction with the operations of the media proxy 2212 in other embodiments.

In FIG. 24, the double arrow lines generally illustrate interactions between modules and devices of the system 2200 in FIG. 22. The interactions are not restricted to the exact order shown, and, in other embodiments, shown interactions may be omitted or other intermediate interactions added. The interactions in this embodiment include the following:

1. Upon system 2200 start-up or reboot, a media server 2400 within the media proxy 2212 registers itself with a multicast domain name server (mDNS) 502 on LAN 112. This step is similar to the corresponding step 1 of FIG. 5 so further description is omitted.
2. During a login process, guest device 118 provides a unique room passkey (associated with only room 101 in this example) to the hotel's login portal 214. This step is similar to the corresponding step 1 of FIG. 23 so further description is omitted.
3. The login portal 214 checks the passkey-to-room table 236 in the database 230 to determine which hotel room is associated with the received passkey, and then associates the MAC and/or IP address of guest device 118 with that room. This step is similar to the corresponding step 2 of FIG. 23 so further description is omitted.
4. Guest device 118 sends a multicast mDNS discovery message looking for an available media device that supports a particular network-based sharing protocol (e.g., AirPlay® in this example) on hotel LAN 112. The mDNS 502 receives the discovery message and replies with a multicast announcement on VLAN-guest 114 providing the address of the media server 2400 as a media device supporting the requested network-based sharing protocol. In a preferred embodiment, the multicast queries and replies are only sent on VLAN-guest 114 and do not cross over to VLAN-media 116 to avoid spamming all central media devices 190. For example, when guest device 118 multicasts an mDNS query for AirPlay®-compatible media devices, the only response guest device 118 receives is from the mDNS 502 providing the IP address of media server 2400 as an AirPlay compatible media device. Likewise, guest device 118 may also receive multicast responses that mDNS 502 sends when replying to other guest devices' mDNS queries on hotel LAN 112. However, in a preferred embodiment, client isolation and port isolation techniques are employed by APs 130 and switches 134 providing VLAN-guest 114 so that multicast transmissions by a guest device 118, 120 are only received by the system controller 101 and are not received by other guest devices 118, 120.
5. Guest device 118 opens a connection with the IP address of the media sever 2400 and beings to stream media content utilizing the network-based media sharing protocol. Again taking AirPlay® as an example, the media server 500 may be listening for AirPlay® connections on IP/UDP ports 7000 (AirPlay video), 7100 (Mirroring), 3689 (DAAP, metadata, remote control), 49152 (RAOP, music), 7010/7011 (network timing protocol), 80 (web requests), 443 (encrypted web requests), etc.
6. The media server 2400 selects an available and compatible one of the central media devices 190 for assignment to the guest device 118. To select the available media device 190 for assignment, the media server 2400 queries a media device table similar to table 236 in database 230 (see FIG. 9 and omit the room ID 900 column) to find which (if any) of the central media devices 190 also supports the same network-based sharing protocol as the guest device is currently utilizing (e.g., AirPlay® in this example). The media server 2400 then determines which of these (if any) compatible media devices 190 is not currently assigned to another guest device 118 at the hotel. Similar to as described above with reference to interaction #4 of FIG. 23, there may be another column (not shown) in FIG. 9 entitled "Assigned guest device" indicating the IP address or other identifier of the guest device (if any) to which each media device is assigned. Alternatively, proxy rules 234 such as shown in FIG. 6 where column 604 indicates assigned central media devices 190 may be utilized by the media server 2400 to check whether a particular central media device 190 is currently assigned to another guest device 120. As a result, if guest device 118 is attempting to share media with the media server 2400 using AirPlay®, media server 2400 queries the media device table 236 and/or proxy rules 234 to see which of the central media devices 190 supports AirPlay® and is not already assigned to another guest device. Assuming in FIG. 24 that central media device 190a is available and supports the desired protocol (i.e., AirPlay® in this example), the media server 2400 selects this media device 190a for assignment to guest device 118 and configures itself to reroute shared media from guest device 118 to the assigned media device 190a. The rules needed to configure the media server 2400 to reroute shared media in this manner are dynamically stored in the proxy rules 234.

In another embodiment, it may be the case that, although there are available central media devices 190, there are none that support the same network-based media sharing protocol (i.e., AirPlay® in this example) being utilized by the guest device 118. In this situation, the media server 2400 may assign a central media device 190 of a different type (e.g., AllShare®) to the guest device 118 by storing the assignment in proxy rules 234. A decrypt/convert/re-encrypt format converter 2404 (described further below) will then convert in real-time shared media in the first protocol (e.g., AirPlay®) utilized by the guest device 118 to the second protocol (e.g., AllShare®) utilized by the assigned media device 190a.

7. A—When the assigned media device 190a supports the same network-based media sharing protocol (e.g., AirPlay®) as is being utilized by guest device 118, the media server 2400 opens a connection with that media device 190a and redirects the stream received from guest device 118 to the assigned media device 190a. Any connections made by the assigned media device 190a back to the media server 2400 related to this stream are redirected back to guest device 118 in a similar manner. In this way, the media proxy 2212 operates as a transparent proxy between guest device 118 and assigned media device 190a. This interaction is shown in FIG. 24 with the double arrow line labelled "7a". In addition to rerouting a streaming connection from guest device 118 to its assigned media device 190a, the media proxy 2212 may also reroute another type of connection made from assigned media device 190a back to guest device 118. This secondary connection may be useful in some applications such as desktop mirroring as it can be utilized to keep clocks of the two devices 118, 190a in sync, for example. The media server 2400 listens for this reverse connection request from assigned media device 190a and looks up guest device 118 associated with assigned media device 190a based on the source IP of assigned media device 190a and the prior open connections on port 7000 already made. Alternatively, the media server 500 re-queries data stored in the database 230 (e.g., proxy rules 234), which associates TV 124 with guest device 120.

While acting as the transparent proxy, the media proxy 2212 may translate certain parts of packets rerouted between the guest device 118 and its assigned media device 190a due to the proxy 2212 between these devices 118, 190a. For instance IP address and TCP port translation may be performed by the media proxy 2212 as required to become a transparent proxy such that neither the guest device 118 nor the media device 190a are aware of the presence of the proxy 2212. In operation, the media proxy 2212 detects the guest device 118 requesting a connection to the media proxy 2212 on a certain port. The media proxy 2212 accepts the connection and also makes a corresponding connection request to the assigned media device 190a on the same port. Data from the guest device 118 is then rerouted by the media proxy 2212 from the guest device 118 to the assigned media device 190a via these connections. Likewise, should the media device 190a request a connection on a certain port with the media proxy 2212, the media proxy will accept the connection and then open a corresponding connection with the guest device 118 on the same port. Data is thereafter rerouted by the media proxy 2212 from the assigned media device 190a to the guest device 118 via these connections. In this way, the number of network sockets on the media proxy 2212 for a single sharing session will end up being the total number of connection requests made by both the guest device 118 and its assigned media device 190a.

Protocol specific requirements may also be met by the media proxy 2212 as required. For example, in certain situations such as desktop mirroring the Airplay® protocol expects network timing data to be passed via port 7010 on the guest device 118 and port 7011 on the central AppleTV® (i.e., assigned media device 190a). To comply with this requirement, the media proxy 2212 will ensure that it uses port 7010 for communicating timing information to/from the guest device 118 and uses source port 7011 when communicating timing information to/from the central AppleTV® (i.e., assigned media device 190a). In this way, the media proxy 2212 appears to be the AppleTV® to the guest device 118, and appears to be the guest device 118 to the AppleTV®.

7. B—Alternatively, when the assigned media device 190a does not support the same network-based media sharing protocol (e.g. AirPlay®) as is being utilized by guest device 120, the media server 500 passes the stream to a decrypt/convert/re-encrypt module 2404 to convert the shared media to be compatible with the assigned media device 190a. The converted media is thereafter sent to the assigned media device 190a by the media proxy 2212 utilizing another method or protocol compatible with assigned media device 190a. In this way, the media proxy 212 operates as a format converter between guest device 118 and its assigned central media device 190a. This interaction is shown in FIG. 24 with the double arrow lines labelled "7b".

8. In order to allow the guest to see the shared media outputted by the central media device 190a assigned to the guest device 118, the media server 2400 commands the in-room STB 196 (and/or additionally the in-room bedroom TV 195) to begin playing back the encoded stream as transmitted by the encoder 192a that is coupled to the output port of the assigned media device 190a. In this example, guest device 118 was associated with guest room 101 (see above-described interaction #2); therefore, the media server 2400 commands the output device being STB 196 in that guest room 101 to receive and playback the encoded media from encoder 192a, which is coupled to the output port of the assigned media device 190a. In this embodiment, the encoder 192a transmits the encoded media to a particular IP multicast group destination address and the in-room STB 196 is commanded at this step to join that particular multicast group and playback on TV 195 the media that is sent to the multicast destination IP address.

Similar to as described above with respect to the gateway 2210 embodiment, in response to a second, later event occurrence such as when the guest device 118 of FIG. 24 finishes sharing media content with its assigned media device 190a, the system controller 102 un-assigns media device 190a from guest device 118 by reconfiguring the proxy rules 234. In this way, the media proxy 2212 stops rerouting shared media from guest device 118 to central media device 190a. The system controller 102 further commands the in-room output device(s) such as STB 196 and TV 195 to stop playing the media corresponding to the media signal outputted by the previously assigned media device 190a. The media device 190a thereby becomes available for assignment to another guest device 118, 120 at the hotel when needed and only the output devices in that other guest's room will playback the shared media at that time.

Other interactions not shown in FIGS. 23 and 24 may also take place. For example, interaction #8 in both FIGS. 23 and 24 may be supplemented by the system controller 102 also sending commands to the assigned media device 190 (i.e., media device 190b in FIG. 23 or media device 190a in FIG. 24).

One reason to send additional commands to the assigned media device 190 is to ensure that the user interface (UI) of the assigned media device 190 is at a known state. Take for example the situation in FIG. 24 where the assigned central media device 190 is an AppleTV®. By design, an AppleTV® will automatically prompt users via an onscreen message to apply upgrades from Apple® when available. As guests in the various hotel guest rooms 101, 105 have no way to directly interact with the UI of the centrally located AppleTV® in this embodiment, the software update screen may annoy guests and/or prevent sharing of content from working properly because the user will see (via the in-room output device such as TV 195 in FIG. 24) the AppleTV® UI screen waiting for the user to confirm or deny the upgrade rather than the shared media content. To prevent this problem from occurring, upon assigning the AppleTV® to a particular guest device, the system controller 102 sends a predetermined sequence of UI commands to the assigned AppleTV® to cause the AppleTV® to: 1) return to its main menu, 2) enter the system update menu, 3) apply any pending software updates, and then 4) return to the main menu. This sequence of commands is performed before the in-room TV begins receiving the output from the encoder 192a coupled to the AppleTV®. In this way, updates will be automatically applied and the hotel guests will never see the AppleTV® software update screen.

In another example, when streaming music using AirPlay® to an AppleTV®, the AppleTV® will play the shared music while showing the album art of the playing song in a corner box of the main menu. As previously mentioned, the guests in the various guest rooms 101, 105 have no way to interact with the UI of the centrally located AppleTV® in this embodiment so showing them the main menu of the AppleTV® is not useful. To solve this problem, when a particular guest device 118, 120 begins to stream music, the system controller 102 may further send another predetermined sequence of UI commands to the assigned AppleTV® to display the album art for the streamed song full screen rather than as a small box on the main menu. In this way, the guest in the room will both hear their shared music and will see the album art of the song currently playing on the in-room TV 195. The guest will not see the main menu of the AppleTV® and will generally not even be aware that they are seeing the output of a centrally located AppleTV®.

Similar commands may also be sent in in-room media devices 121, 122, 123, 124 such as when in-room AppleTVs are utilized in the system of FIG. 1. The AppleTV may be physically hidden behind the television in the guest's room and the guest may not even be aware that they are utilizing an AppleTV while sharing media content.

The various predetermined sequences of UI commands may be sent to the AppleTV® by the system controller 102 mimicking a network-based remote control application such as the Apple® app. "Remote". The system controller 102 may send sequences of UI commands to other brands of media device 190 using brand-specific remote control protocols in a similar manner, e.g., by mimicking the Samsung® app. "AllShare Control" to control an AllShare® media device 190.

The embodiments of FIGS. 22, 23, and 24 are beneficial in the case of a typical hotel that has already made a significant investment in in-room output devices 194, 195, 196, 197 (e.g., in-room televisions and STBs etc.). The hotel may wish to allow guests to share media content utilizing one or more network-based media sharing protocol(s) such as AllShare® and AirPlay® even though the in-room output devices 194, 195, 196, 197 themselves do not support that/those protocol(s). The embodiments of FIGS. 22, 23, and 24 allow the hotel to continue to utilize the existing in-room output devices 194, 195, 196 and only require a set of N (e.g., ten) central media devices 190 and encoders 192 be installed on hotel LAN 112. This is much cheaper than installing one or more new in-room media devices such as a Samsung® STB or an AppleTV® in each hotel room 101, 105. In particular, an acceptable value of N will often be much less than the number of rooms of the hotel.

In other embodiments, a combination of some in-room media devices supporting various network-based media streaming protocols and some central media devices supporting various network-based media streaming protocols may be utilized. For example, certain VIP rooms such as the presidential suite may include an in-room AppleTV® whereas standard rooms may not. Guests who authenticate their guest device 118, 120 to become associated with the VIP room will be able to share media content using AirPlay® with the in-room AppleTV® via the media proxy 212 and interactions shown in FIG. 5, for example. Alternatively, guests who authenticate their guest device 118, 120 to become associated with a standard room will be able to share media content using AirPlay® with an available central media device 190 (e.g., a central AppleTV®) via the media proxy 2212 and interactions shown in FIG. 24, for example. As a result, guests of VIP rooms may always share content using AirPlay® for in-room playback, whereas guests of standard rooms must rely upon on a central media device 190 being available at the time they attempt to share content, which may not always be the case during times of heavy utilization by other guests.

Many of the previously described figures relating to in-room media devices supporting network-based media sharing protocols are also applicable to the centrally located media devices 190. For example, FIG. 20 can be modified for usage with central media devices 190 by changing steps 2004 and 2006 to become "Select a compatible and available central media device 190 for assignment to the guest device." In the following steps, the "associated media device" is now the centrally assigned media device 190. Likewise, step 2016 can be changed to become "Command in-room output devices to begin playing encoded media from assigned central media device." In this way, the guest in the guest room will see playback of shared media outputted by the assigned central media device 190.

When a hotel room 101 includes multiple output devices such as room 101 including living room TV 194, bedroom TV 195 and STB 196, the guest can select which of these in-room output devices 194, 195, 196 will be utilized for playback of media from the assigned media device 190. For example, a guest of room 101 may select the target output device 194, 195, 196 either at a webpage provided by the login portal 214 or on an application running on guest device 118. In some embodiments, the guest will only be able to select from the output device(s) 194, 195, 196 which are available within the guest's assigned room 101 and will be unable to select other output devices 197 in another unrelated guest room 105. Selection of target output device made by the guest affects the output devices that are commanded to playback the shared media at interaction #8 of FIGS. 23 and 24. For example, if the guest operating guest device 118 in FIG. 24 has selected the bedroom TV 195, interaction #8 will involve commanding the STB 196 to playback the encoded media from encoder 192a on the bedroom TV 195; alternatively, if the guest has selected the living room TV 194, interaction #8 in FIG. 24 will involve commanding the STB 196 to playback the encoded media from encoder 192a on the living room TV 194.

Examples of advantages of different embodiments of the invention include the following:
  Allowing guests of a hospitality establishment to stream content to in-room media devices using AirPlay®/

DLNA®/AllShare® and/or other residential media streaming protocols in the same way the guest can stream content to media devices in their home.

Ensuring security because only authorized guest devices associated with guests of a particular room are able to connect to and communicate with media devices within that room.

Dynamically controlling the subset of which media devices within the hotel are streamable for each guest device. For example, a guest's device may be dynamically authorized to stream to any TV in several rooms when that user has booked all the rooms. This may be useful when a bride and groom staying in the hotel have their laptop computer enabled to stream content such as video from the wedding ceremony to the media devices of all rooms of the wedding party. All rooms of the wedding party may be associated with each as a single guest area such as the "Wedding party group". A hotel interface may allow hotel staff to add and remove rooms from this group for different wedding parties. Other dynamic groups of rooms may be defined in a similar manner.

Another advantage enabled by the invention is that it may be utilized to drive sales of Internet bandwidth upgrades by guests of a hospitality establishment. For example, hotel guests may wish to share content from Netflix®, Hulu® other Internet-based streaming websites that is playing on the guest's device 118, 120. In other words, the guest may wish to access the Internet-based streaming website on the guest's device 118, 120 and share the output with the hotel's media device for playback on the large screen TV in the guest's hotel room. In this situation, rather than storing the content to be played, the guest device 118, 120 may play the content from a remote source located on the Internet and simultaneously share the played content to a hotel media device using a network-based media sharing protocol such as AirPlay®. In order to stream the content from the Internet-based streaming service, the guest device 118, 120 will require a larger amount of Internet bandwidth than is typically provided in a complimentary Internet package many hotels provide to guest devices 118, 120. Therefore, many guests will be interested in purchasing from the hotel an upgraded Internet access (e.g., premium high speed Internet access) package in order to take advantage of the guest's person streaming service account for viewing on the in-room TV at the hotel. Charges for in-room bandwidth upgrades provide an additional revenue stream to the hotel.

In an exemplary embodiment, the system controller 102 dynamically enables a guest device to communicate with in-room media devices of the room associated with a guest of the hotel while the guest is authorized to utilize that room, and then dynamically de-enables (i.e., prevents) the guest device from communicating with those in-room devices when the guest is no longer authorized to utilize the room.

In exemplary embodiment, the system controller 102 dynamically enables a guest device to utilize a particular network-based media sharing protocol to share media content with in-room media devices of the room associated with a guest of the hotel while the guest is authorized to utilize that room, and then dynamically de-enables (i.e., prevents) the guest device from utilizing the particular network-based media sharing protocol to share media content with those in-room devices when the guest is no longer authorized to utilize the room.

Rather than rooms of a hotel, the invention may also be applied to other locations and guest areas of hospitality establishments. For example, media devices in front of different seats of an airliner, or media devices in different cabins of a cruise ship may be defined as being associated with these guest areas (seats/cabins). In these applications, the guest's device is dynamically enabled to share media content with only the media devices of the guest areas authorized for use by or otherwise linked to the guest.

In an exemplary embodiment, a media system includes a computer network, a plurality of media devices coupled to the computer network, and a system controller coupled to the computer network. The computer network allows a guest device supporting a network-based media sharing protocol to be coupled thereto. The computer network by default prevents the guest device from utilizing the network-based media sharing protocol to share media content with the media devices. The system controller selects a subset of the media devices for which media sharing is to be enabled for the guest device, the subset including at least one of the media devices but not all of the media devices. The system controller dynamically reconfigures components of the computer network in response to an event occurrence to enable the guest device to utilize the network-based media sharing protocol to share media over the computer network with only the subset of the media devices.

In another exemplary embodiment, a media system includes a computer network, a media device supporting a network-based media sharing protocol, a plurality of output devices located at a plurality of physical locations within a hospitality establishment, and a system controller. In response to a first event, the system controller assigns the media device to a particular guest device by reconfiguring one or more components of the computer network to enable the particular guest device to utilize the network-based media sharing protocol to share media over the computer network with the media device, and commands an output device located at a physical location associated with the particular guest device to play media corresponding to the media signal outputted by the media device on the output port. In response to a second event, the system controller un-assigns the media device from the particular guest device and commands the output device to stop playing the media.

In the above description, the exemplary user indication of "guest" refers to current guests in the hotel, people who are attending a conference or meeting in the hotel, staff members at the hotel, or any other person or user who may need or want to share media or otherwise enable communicate between a guest device and media devices of a hospitality media system. Future guests that have reservations, potential future guests that don't yet have reservations, and other users may also be given access. For example, a demonstration of the technology may be available in the hotel lobby and all users would be able to utilize their own guest device to 1) to stream content to a media device installed in the lobby in order to try out system 100; or 2) stream content to a central media device 190 for playback on an output device (e.g., TV) installed in the lobby in order to try out system 2200. Additionally, it is not necessary that the users bring their own guest device to hotel. In another configuration, a guest device 118, 120 may be provided to the user by the hotel.

Although the invention has been described in connection with preferred embodiments, it should be understood that various modifications, additions and alterations may be made to the invention by one skilled in the art. For example, although the above-description has focused on hotels and activating the communication feature for media streaming purposes, the present invention is equally applicable to any hospitality related location or service wishing to allow guest devices to communicate and/or share media with only a subset of all media devices. Examples of hospitality establishments include but not limited to hotels, motels, resorts, hospitals, apartment/townhouse complexes, restaurants, retirement centers, cruise ships, busses, airlines, airports, shopping centers, passenger trains, libraries, coffee shops, hotspots, etc. In addition to the above described hospitality examples, the invention is applicable outside the hospitality industry such as with home or corporate users. For example, a guest device from a presenter at a corporation may be dynamically enabled to communicate over the company's computer network with a projector in an assigned meeting room, for example.

The above-described modules may be implemented by software executed by one or more processors operating pursuant to instructions stored on a tangible, non-transitory computer-readable medium such as a storage device to perform the above-described functions of any or all aspects of the system controller 102. Examples of the tangible, non-transitory computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network such as the Internet 102. The processors may be included in a general-purpose or specific-purpose computer that becomes the system controller 102 or any of the above-described modules as a result of executing the instructions.

In other embodiments, rather than being software modules executed by one or more processors, the modules may be implemented as hardware modules configured to perform the above-described functions of the system controller 102. Examples of hardware modules include combinations of logic gates, integrated circuits, field programmable gate arrays, and application specific integrated circuits, and other analog and digital circuit designs.

Functions of single modules may also be separated into multiple units, or the functions of multiple modules may be combined into a single unit.

Unless otherwise specified, features described may be implemented in hardware or software according to different design requirements. In addition to a dedicated physical computing device, the word "server" also includes a service daemon on a single computer, virtual computer, or shared physical computer or computers, for example. All combinations and permutations of the above described features and embodiments may be utilized in conjunction with the invention.

What is claimed is:

1. A media system comprising:
a media device supporting a network-based media sharing protocol coupled to a computer network and having an output port, the media device for receiving shared media content over the computer network utilizing the network-based media sharing protocol, and for providing a media signal corresponding to the shared media content on the output port for playback by another device;
an encoder coupled to the output port of the media device, wherein the encoder encodes the media signal outputted by the media device on the output port into an encoded media stream and transmits the encoded media stream on the computer network;
a plurality of output devices located at a plurality of different physical locations and coupled to the encoder via the computer network, wherein each of the output devices is capable of receiving and playing the encoded media stream, but the output devices are all operable such that they do not play the encoded media stream unless receiving a command to do so via the computer network;
a media proxy available on the computer network; and
a system controller;
wherein the computer network allows a plurality of guest devices each supporting the network-based media sharing protocol to be coupled thereto;
the computer network is operable to by default prevent all of the guest devices from utilizing the network-based media sharing protocol to share media content with the media device;
the computer network is operable to allow the guest devices to discover and attempt to share media with the media proxy utilizing the network-based media sharing protocol;
the media proxy is operable to by default not reroute any media streams shared by the guest devices to the media device;
the system controller is operable to, in response to a first event occurrence, assign the media device to a particular guest device by dynamically reconfiguring the media proxy to cause the media proxy to act as a transparent proxy between the guest device and the media device in order to reroute a media stream shared by the particular guest device utilizing the network-based media sharing protocol to the media device and thereby allow the particular guest device to share media with the media device over the computer network utilizing the network-based media sharing protocol, and the system controller is operable to send a first command via the computer network to an output device located at a physical location associated with the particular guest device, the first command causing the output device at the physical location associated with the particular guest device to play the encoded media stream received from the encoder via the computer network;
the system controller is operable to, in response to a second, later event occurrence, un-assign the media device from the particular guest device by reconfiguring the media proxy to stop rerouting the media stream from the particular guest device to the media device, and the system controller is operable to send a second command via the computer network to the output device located at the physical location associated with the particular guest device, the second command causing the output device at the physical location associated with the particular guest device to stop playing the encoded media stream;
the system controller is operable to only assign the media device to one of the quest devices at a time such that, starting at the first event occurrence and ending at the second event occurrence, only the particular guest device is enabled to utilize the network-based media sharing protocol to share media over the computer network with the media device;
the particular guest device is operated by a guest of a hospitality establishment; and
the output device located at the physical location associated with the particular guest device is an audio-visual entertainment device located at a guest area of the hospitality establishment, the guest area currently assigned to the guest.

2. The media system of claim 1, further comprising:
a plurality of media devices supporting the network-based media sharing protocol coupled to the computer network;

wherein the system controller is operable to select an available one of the plurality of media devices as the media device to assign to the particular guest device in response to the first event occurrence; and the available media device selected by the system controller for assignment to the particular guest device is one of the media devices that is not currently assigned to any other guest device.

3. The media system of claim 1, wherein:

the first event occurrence corresponds to the system controller detecting that the particular guest device is attempting to share media content utilizing the network-based media sharing protocol during a period of time when the media device is not assigned to any other guest device; and the second event occurrence corresponds to the system controller detecting that the particular guest device has finished sharing media content utilizing the network-based media sharing protocol during a period of time when the media device is assigned to the particular guest device.

4. A method of sharing media content in a media system, the method comprising:

allowing a plurality of guest devices each supporting a network-based media sharing protocol to be coupled to a computer network;

by default, preventing all of the guest devices from utilizing the network-based media sharing protocol to share media content with a media device coupled to the computer network;

wherein the media device supports receiving shared media content over the computer network utilizing the network-based media sharing protocol and providing a media signal corresponding to the shared media content on an output port of the media device for playback by another device;

providing a media proxy available on the computer network;

allowing the guest devices to discover and attempt to share media with the media proxy utilizing the network-based media sharing protocol over the computer network;

by default, not rerouting any media streams shared by the guest devices and received by the media proxy to the media device;

in response to a first event occurrence, assigning the media device to a particular guest device by dynamically reconfiguring the media proxy to cause the media proxy to act as a transparent proxy between the guest device and the media device in order to reroute a media stream shared by the particular guest device utilizing the network-based media sharing protocol to the media device and thereby allow the particular guest device to share media with the media device over the computer network utilizing the network-based media sharing protocol;

encoding the media signal outputted by the media device on the output port into an encoded media stream and transmitting the encoded media stream on the computer network;

in response to the first event occurrence, sending a first command via the computer network to an output device located at a physical location associated with the particular guest device, the first command causing the output device at the physical location associated with the particular guest device to play the encoded media stream received from the encoder via the computer network;

wherein the media system includes a plurality of output devices respectively located at a plurality of different physical locations and coupled to the encoder via the computer network, each of the output devices is capable of receiving and playing the encoded media stream, but the output devices are operable such that they do not play the encoded media stream unless receiving a command to do so via the computer network;

in response to a second, later event occurrence, un-assigning the media device from the particular guest device by dynamically reconfiguring the media proxy to stop rerouting the media stream from the particular guest device to the media device;

in response to the second event occurrence, sending a second command via the computer network to the output device located at the physical location associated with the particular guest device, the second command causing the output device at the physical location associated with the particular guest device to stop playing the encoded media stream; and only assigning the media device to one of the quest devices at a time such that, starting at the first event occurrence and ending at the second event occurrence, only the particular guest device is enabled to utilize the network-based media sharing protocol to share media over the computer network with the media device;

wherein the particular guest device is operated by a guest of a hospitality establishment; and the output device located at the physical location associated with the particular guest device is an audio-visual entertainment device located at a guest area of the hospitality establishment, the guest area currently assigned to the guest.

5. The method of claim 4, wherein:

the media system includes a plurality of media devices supporting the network-based media sharing protocol coupled to the computer network; and the method further comprises selecting an available one of the plurality of media devices that is not currently assigned to any other guest device as the media device to assign to the particular guest device in response to the first event occurrence.

6. The method of claim 4, wherein the hospitality establishment is a lodging establishment and the guest area is a specific guest room of the lodging establishment.

7. The method of claim 4, further comprising:

receiving information over the computer network from the particular guest device; and determining the physical location associated with the particular guest device according to the information received from the particular guest device.

8. A non-transitory computer-readable medium comprising computer executable instructions that when executed by one or more computers cause the one or more computers to perform the method of claim 4.

9. The media system of claim 1, wherein the particular guest device shares internal media content pre-stored on the particular guest device with the media device utilizing the network-based media sharing protocol.

10. The media system of claim 1, wherein the particular guest device streams external media content from a remote source accessed over the computer network and simultaneously shares the external media content with the media device utilizing the network-based media sharing protocol.

11. The method of claim 4, wherein the particular guest device shares internal media content pre-stored on the particular guest device with the media device utilizing the network-based media sharing protocol.

12. The method of claim 4, wherein the particular guest device streams external media content from a remote source accessed over the computer network and simultaneously shares the external media content with the media device utilizing the network-based media sharing protocol.

13. An apparatus comprising:
a memory storing software;
a network interface coupled to a computer network; and
one or more processors coupled to the memory and the network interface;
wherein, by the one or more processors executing the software loaded from the memory, the one or more processors are configured to:
send to a plurality of guest devices on the computer network an announcement indicating availability of a media proxy on the computer network;
receive from the guest devices attempts to share media with the media proxy utilizing a network-based media sharing protocol over the computer network;
by default, not reroute any media streams shared by the guest devices and received by the media proxy to a media device supporting the network-based media sharing protocol, wherein the media device is coupled to the computer network but is not directly accessible by the guest devices; the media device for receiving shared media content over the computer network utilizing the network-based media sharing protocol and providing a media signal corresponding to the shared media content on an output port of the media device for playback by another device;
in response to a first event occurrence, assign the media device to a particular guest device by dynamically reconfiguring the media proxy to cause the media proxy to act as a transparent proxy between the guest device and the media device in order to reroute a media stream shared by the particular guest device utilizing the network-based media sharing protocol to the media device and thereby allow the particular guest device to share media with the media device over the computer network utilizing the network-based media sharing protocol;
in response to the first event occurrence, send a first command via the computer network to an output device located at a physical location associated with the particular guest device, the first command causing the output device at the physical location associated with the particular guest device to play an encoded media stream corresponding to the media signal outputted by the media device; wherein the encoded media stream is transmitted on the computer network by an encoder coupled to the output port of the media device, and there are a plurality of output devices respectively located at a plurality of different physical locations coupled to the computer network, each of the output devices is capable of receiving and playing the encoded media stream, but the output devices are operable such that they do not play the encoded media stream unless receiving a command to do so via the computer network;
in response to a second, later event occurrence, un-assign the media device from the particular guest device by dynamically reconfiguring the media proxy to stop rerouting the media stream from the particular guest device to the media device;
in response to the second event occurrence, send a second command via the computer network to the output device located at the physical location associated with the particular guest device, the second command causing the output device at the physical location associated with the particular guest device to stop playing the encoded media stream; and
only assign the media device to one of the quest devices at a time such that, starting at the first event occurrence and ending at the second event occurrence, only the particular guest device is enabled to utilize the network-based media sharing protocol to share media over the computer network with the media device;
wherein the particular guest device is operated by a guest of a hospitality establishment; and
the output device located at the physical location associated with the particular guest device is an audio-visual entertainment device located at a guest area of the hospitality establishment, the guest area currently assigned to the guest.

14. The apparatus of claim 13, wherein the particular guest device shares internal media content pre-stored on the particular guest device with the media device utilizing the network-based media sharing protocol.

15. The apparatus of claim 13, wherein the particular guest device streams external media content from a remote source accessed over the computer network and simultaneously shares the external media content with the media device utilizing the network-based media sharing protocol.

16. The apparatus of claim 13, wherein:
there are a plurality of media devices supporting the network-based media sharing protocol coupled to the computer network; and
the software executed by the one or more processors further configures the one or more processors to select an available one of the plurality of media devices that is not currently assigned to any other guest device as the media device to assign to the particular guest device in response to the first event occurrence.

17. The apparatus of claim 13, wherein the software executed by the one or more processors further configures the one or more processors to:
receive information over the computer network from the particular guest device; and
determine the physical location associated with the particular guest device according to the information received from the particular guest device.

18. The method of claim 4, wherein the first event occurrence corresponds to detecting that the particular guest device is attempting to share media content utilizing the network-based media sharing protocol during a period of time when the media device is not assigned to any other guest device.

19. The apparatus of claim 13, wherein the first event occurrence corresponds to the one or more processors detecting that the particular guest device is attempting to share media content utilizing the network-based media sharing protocol during a period of time when the media device is not assigned to any other guest device.

20. The apparatus of claim 13, wherein the second event occurrence corresponds to the one or more processors detecting that the particular guest device has finished sharing media content utilizing the network-based media sharing protocol during a period of time when the media device is assigned to the particular guest device.

* * * * *